United States Patent
Bangalore Prabhakar et al.

(10) Patent No.: US 12,248,788 B2
(45) Date of Patent: Mar. 11, 2025

(54) DISTRIBUTED SHARED MEMORY

(71) Applicant: NVIDIA Corporation, Santa Clara, CA (US)

(72) Inventors: Prakash Bangalore Prabhakar, San Jose, CA (US); Gentaro Hirota, San Jose, CA (US); Ronny Krashinsky, Portola Valley, CA (US); Ze Long, San Jose, CA (US); Brian Pharris, Cary, NC (US); Rajballav Dash, San Jose, CA (US); Jeff Tuckey, Saratoga, CA (US); Jerome F. Duluk, Jr., Palo Alto, CA (US); Lacky Shah, Los Altos Hills, CA (US); Luke Durant, San Jose, CA (US); Jack Choquette, Palo Alto, CA (US); Eric Werness, San Jose, CA (US); Naman Govil, Sunnyvale, CA (US); Manan Patel, San Jose, CA (US); Shayani Deb, Seattle, WA (US); Sandeep Navada, San Jose, CA (US); John Edmondson, Arlington, MA (US); Greg Palmer, Cedar Park, TX (US); Wish Gandhi, Sunnyvale, CA (US); Ravi Manyam, San Ramon, CA (US); Apoorv Parle, San Jose, CA (US); Olivier Giroux, Santa Clara, CA (US); Shirish Gadre, Fremont, CA (US); Steve Heinrich, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/691,690

(22) Filed: Mar. 10, 2022

(65) Prior Publication Data
US 2023/0289189 A1      Sep. 14, 2023

(51) Int. Cl.
G06F 9/30      (2018.01)
G06F 9/38      (2018.01)
(Continued)

(52) U.S. Cl.
CPC ............ *G06F 9/3851* (2013.01); *G06F 9/522* (2013.01); *G06F 9/544* (2013.01); *G06F 13/1663* (2013.01); *G06T 1/60* (2013.01)

(58) Field of Classification Search
CPC ........ G06F 9/3851; G06F 9/522; G06F 9/544; G06F 13/1663; G06T 1/60
See application file for complete search history.

(56) References Cited

U.S. PATENT DOCUMENTS 7,447,873 B1    11/2008   Nordquist
7,506,134 B1    3/2009    Juffa et al.
(Continued)

OTHER PUBLICATIONS

"CUDA C++ Best Practices Guide", Release 12.6, https://docs.nvidia.com/cuda/cuda-c-best-practices-guide/index.html (Jul. 23, 2024).
(Continued)

*Primary Examiner* — Corey S Faherty
(74) *Attorney, Agent, or Firm* — Nixon & Vanderhye P.C.

(57) ABSTRACT

Distributed shared memory (DSMEM) comprises blocks of memory that are distributed or scattered across a processor (such as a GPU). Threads executing on a processing core local to one memory block are able to access a memory block local to a different processing core. In one embodiment, shared access to these DSMEM allocations distributed across a collection of processing cores is implemented by communications between the processing cores. Such distributed shared memory provides very low latency memory access for processing cores located in proximity to the memory blocks, and also provides a way for more distant processing cores to also access the memory blocks in a manner and using interconnects that do not interfere with the
(Continued)

processing cores' access to main or global memory such as hacked by an L2 cache. Such distributed shared memory supports cooperative parallelism and strong scaling across multiple processing cores by permitting data sharing and communications previously possible only within the same processing core.

24 Claims, 37 Drawing Sheets

(51) Int. Cl.
  *G06F 9/52* (2006.01)
  *G06F 9/54* (2006.01)
  *G06F 13/16* (2006.01)
  *G06T 1/60* (2006.01)

(56) References Cited

U.S. PATENT DOCUMENTS

| | | | |
|---|---|---|---|
| 7,761,688 B1 * | 7/2010 | Park | G06F 9/3867 712/214 |
| 7,788,468 B1 | 8/2010 | Nickolls et al. | |
| 7,836,118 B1 | 11/2010 | Juffa et al. | |
| 7,937,567 B1 | 5/2011 | Nickolls et al. | |
| 8,112,614 B2 | 2/2012 | Nickolls et al. | |
| 8,997,103 B2 | 3/2015 | Gadre et al. | |
| 9,223,578 B2 | 12/2015 | Nickolls et al. | |
| 9,324,175 B2 | 4/2016 | Bolz et al. | |
| 9,513,975 B2 | 12/2016 | Jones et al. | |
| 9,928,109 B2 | 3/2018 | Durant | |
| 10,217,183 B2 | 2/2019 | Palmer et al. | |
| 10,817,338 B2 | 10/2020 | Duluk, Jr. et al. | |
| 10,909,033 B1 | 2/2021 | Fang et al. | |
| 10,977,037 B2 | 4/2021 | Tirumala et al. | |
| 2012/0131309 A1 * | 5/2012 | Johnson | G06F 8/40 712/E9.004 |
| 2014/0122809 A1 | 5/2014 | Robertson et al. | |
| 2015/0178879 A1 | 6/2015 | Palmer et al. | |
| 2015/0339126 A1 * | 11/2015 | Bonanno | G06F 9/3844 712/239 |
| 2020/0043123 A1 | 2/2020 | Dash et al. | |
| 2020/0293367 A1 * | 9/2020 | Andrei | G06F 9/4881 |
| 2021/0124582 A1 | 4/2021 | Kerr et al. | |
| 2022/0058053 A1 * | 2/2022 | Andrei | G06F 9/544 |
| 2023/0289190 A1 | 9/2023 | Parle et al. | |
| 2023/0289211 A1 | 9/2023 | Hirota et al. | |
| 2023/0289242 A1 | 9/2023 | Guo et al. | |
| 2023/0315655 A1 | 10/2023 | Choquette et al. | |

OTHER PUBLICATIONS https://hpc-wiki.info/hpc/Scaling_tests (last edited on Jul. 19, 2024).
Lindholm et al, "NVIDIA Tesla: A Unified Graphics and Computing Architecture," IEEE Micro (2008).
"PTX ISA" CUDA, Release 8.5, https://docs.nvidia.com/cuda/parallel-thread-execution/index.html (Jul. 23, 2024).
Choquette et al, "Volta: Performance and Programmability", IEEE Micro (vol. 38, Issue: 2, Mar./Apr. 2018), DOI: 10.1109/MM.2018.022071134.
"Cooperative Groups: Flexible CUDA Thread Programming", https://developer.nvidia.com/blog/cooperative-groups/ (Oct. 4, 2017).
"CUDA 9 Features Revealed: Volta, Cooperative Groups and More", https://developer.nvidia.com/blog/cuda-9-features-revealed/ (May 11, 2017).
Bob Crovella et al., "Cooperative Groups" (Sep. 17, 2020), https://vimeo.com/461821629.
Zhang et al, A Study of Single and Multi-device Synchronization Methods in NVIDIA GPUs, (arXiv:2004.05371v1 [cs.DC] Apr. 11, 2020).
Lustig et al, "A Formal Analysis of the NVIDIA PTX Memory Consistency Model", Proceedings of the Twenty-Fourth International Conference on Architectural Support for Programming Languages and Operating Systems, pp. 257-270 (Apr. 2019) https://doi.org/10.1145/3297858.3304043.
Weber et al, "Toward a Multi-GPU Implementation of the Modular Integer GCD Algorithm Extended Abstract" ICPP Aug. 13-16, 2018, Eugene, OR USA (ACM 2018).
Jog et al, "OWL: Cooperative Thread Array Aware Scheduling Techniques for Improving GPGPU Performance" (ASPLOS'13, Mar. 16-20, 2013, Houston, Texas, USA).
Parallel Thread Execution ISA: Application Guide (NVidia v5.0 Jun. 2017).
Lal et al, "A Quantitative Study of Locality in GPU Caches", in: Orailoglu et al (eds), Embedded Computer Systems: Architectures, Modeling, and Simulation, (SAMOS 2020), Lecture Notes in Computer Science, vol. 12471. Springer, Cham. https://doi.org/10.1007/978-3-030-60939-9_16.
Adinets, "CUDA Dynamic Parallelism API and Principles" https://developer.nvidia.com/blog/cuda-dynamic-parallelism-api-principles/ (May 20, 2014).
Breshears, The Art of Concurrency: A Thread Monkey's Guide to Writing Parallel Applications (O'Reilly 2009).
Rajwar et al, "Speculative lock elision: enabling highly concurrent multithreaded execution," Proceedings of the 34th ACM/IEEE International Symposium on Microarchitecture MICRO-34 (Dec. 1-5, 2001).

\* cited by examiner

Prior Art GPU Hardware Partitions

Prior Art GPU Hardware With
Graphics Processing Clusters

Prior Art uGPU Partitions

Strong Scaling

Example Prior Art CTA Hierarchy

Prior Art Hierarchy
Mapping Onto GPU Hardware Partitions

New Hierarchy

Prior Art Hierarchy

New Grid Types

12(1). Legacy Grid
12(2). GPC_CGAs
12(3). GPU_CGAs
12(4). GPU_CGAs of GPC_CGAs

Example: CTAC
(X, Y, Z) = (7, 3, 0)
CgaCtaId = 4

DISTRIBUTED SHARED MEMORY

CROSS-REFERENCES TO RELATED APPLICATIONS

This application is related to the following commonly-assigned copending US patent applications, the entire contents of each of which is incorporated herein by reference for all purposes:

U.S. application Ser. No. 17/691,621 filed Mar. 10, 2022, titled "Cooperative Group Arrays";

U.S. application Ser. No. 17/691,276 filed Mar. 10, 2022, titled "Method And Apparatus For Efficient Access To Multidimensional Data Structures And/Or Other Large Data Blocks";

U.S. application Ser. No. 17/691,759 filed Mar. 10, 2022, titled "Virtualizing Hardware Processing Resources in a Processor";

U.S. application Ser. No. 17/691,288 filed Mar. 10, 2022, titled "Programmatically Controlled Data Multicasting Across Multiple Compute Engines";

U.S. application Ser. No. 17/691,296 filed Mar. 10, 2022, titled "Hardware Accelerated Synchronization With Asynchronous Transaction Support";

U.S. application Ser. No. 17/691,303 filed Mar. 10, 2022, titled "Fast Data Synchronization In Processors And Memory";

U.S. application Ser. No. 17/691,406 filed Mar. 10, 2022, titled "Efficient Matrix Multiply and Add with a Group of Warps";

U.S. application Ser. No. 17/691,872 filed Mar. 10, 2022, titled "Techniques for Scalable Load Balancing of Thread Groups in a Processor";

U.S. application Ser. No. 17/691,808 filed Mar. 10, 2022, titled "Flexible Migration of Executing Software Between Processing Components Without Need For Hardware Reset"; and U.S. application Ser. No. 17/691,422 filed Mar. 10, 2022, titled "Method And Apparatus For Efficient Access To Multidimensional Data Structures And/Or Other Large Data Blocks".

STATEMENT REGARDING FEDERALLY SPONSORED RESEARCH OR DEVELOPMENT

None.

BACKGROUND & SUMMARY

Users want deep learning and high performance computing (HPC) compute programs to continue to scale as graphics processing unit (GPU) technology improves and the number of processing core units increases per chip with each generation. What is desired is a faster time to solution for a single application, not scaling only by running N independent applications.

FIG. 1A shows example deep learning (DL) networks comprising long chains of sequentially-dependent compute-intensive layers. Each layer is calculated using operations such as e.g., multiplying input activations against a matrix of weights to produce output activations. The layers are typically parallelized across a GPU or cluster of GPUs by dividing the work into output activation tiles each representing the work one processing core will process.

Due to the potentially massive number of computations deep learning requires, faster is usually the goal. And it makes intuitive sense that performing many computations in parallel will speed up processing as compared to performing all those computations serially. In fact, the amount of performance benefit an application will realize by running on a given GPU implementation typically depends entirely on the extent to which it can be parallelized. But there are different approaches to parallelism.

Conceptually, to speed up a process, one might have each parallel processor perform more work or one might instead keep the amount of work on each parallel processor constant and add more processors. Consider an effort to repave a highway several miles long. You as the project manager want the repaving job done in the shortest amount of time in order to minimize traffic disruption. It is obvious that the road repaving project will complete more quickly if you have several crews working in parallel on different parts of the road. But which approach will get the job done more quickly—asking each road crew to do more work, or adding more crews each doing the same amount of work? It turns out that the answer depends on the nature of the work and the resources used to support the work.

Computer scientists refer to the first approach as "weak scaling" and the second approach as "strong scaling." The weak scaling example of FIG. 1B shows the activation tile each processing core runs growing in size, signifying that each processing core does more work. The strong scaling example of FIG. 1C meanwhile keeps the amount of work each processing core performs constant (a fixed size network is indicated by a fixed tile size) and increases the number of processing cores operating in parallel (as indicated by the ellipsis). An application that exhibits linear strong scaling has a speedup equal to the number of processors used. See https://docs.nvidia.com/cuda/cuda-c-best-practices-guide/index.html; https://hpc-wiki.info/hpc/Scaling_tests. For some applications such as DL training, the problem size will generally remain constant and hence only strong scaling is applicable.

Users of such applications thus typically want strong scaling, which means a single application can achieve higher performance without having to change its workload—for instance, by increasing its batch size to create more inherent parallelism. Users also expect increased speed performance when running existing (e.g., recompiled) applications on new, more capable GPU platforms offering more parallel processors. As detailed below, GPU development has met or even exceeded the expectations of the marketplace in terms of more parallel processors and more coordination/cooperation between increased numbers of parallel execution threads running on those parallel processors—but further performance improvements to achieve strong scaling are still needed.

Increased GPU Computation Parallelism and Complexity

Over the years, GPU hardware has become increasingly more complex and capable to achieve increased parallelism. For example, FIG. 2A shows an older GPU architecture providing a streaming execution model with 16 streaming multiprocessors ("SMs") in clusters (GPCs) of four SMs each, with each SM representing a substantial portion of the GPU real estate. In contrast, the FIG. 2B illustration of the semiconductor substrate layout of a more recent GPU shows a dramatic increase in parallel computation ability including a very large number of (e.g., 128 or more) SMs each representing only a small portion of the GPU semiconductor substrate real estate—with both math computation hardware and number of parallel processing cores within each SM also growing over time.

FIG. 2C shows an example architectural diagram of a modern SM including advanced compute hardware capabilities comprising many parallel math cores including multiple tensor cores in addition to texture processing units. For example, as of this writing, the 2017 NVIDIA Volta GV100 SM is partitioned into four processing blocks, each with 16 FP32 Cores, 8 FP64 Cores, 16 INT32 Cores, two mixed-precision Tensor Cores for deep learning matrix arithmetic, an L0 instruction cache, one warp scheduler, one dispatch unit, and a 64 KB Register File—and future GPU designs are likely to continue this trend. Such increased compute parallelism enables dramatic decreases in compute processing time.

Meanwhile, FIGS. 3 and 4 illustrate that modern GPUs may provide a variety of different hardware partitions and hierarchies. In these examples, SMs within a GPU may themselves be grouped into larger functional units. For example, Graphics Processing Clusters (GPCs) of a GPU may comprise plural Texture Processing Clusters (TPCs) and an additional array of Streaming Multiprocessors (SMs) (e.g., for compute capabilities) along with other supporting hardware such as ray tracing units for real time ray tracing acceleration. Each SM in turn may be partitioned into plural independent processing blocks, each with one or several different kinds of cores (e.g., FP32, INT32, Tensor, etc.), a warp scheduler, a dispatch unit, and a local register file as reflected in FIG. 2C.

FIGS. 5 and 5A show how some GPU implementations (e.g., NVIDIA Ampere) may enable plural partitions that operate as micro GPUs such as μGPU0 and μGPU1, where each micro GPU includes a portion of the processing resources of the overall GPU. When the GPU is partitioned into two or more separate smaller μGPUs for access by different clients, resources—including the physical memory devices 165 such as local L2 cache memories—are also typically partitioned. For example, in one design, a first half of the physical memory devices 165 coupled to uGPU0 may correspond to a first set of memory partition locations and a second half of the physical memory devices 165 coupled to uGPU1 may correspond to a second set of memory partition locations. Performance resources within the GPU are also partitioned according to the two or more separate smaller processor partitions. The resources may include level two cache (L2) resources 170 and processing resources 160. One embodiment of such a Multi-Instance GPU ("MIG") feature allows the GPU to be securely partitioned into many separate GPU Instances for CUDA ("Compute Unified Device Architecture") applications, providing multiple users with separate GPU resources to accelerate their respective applications.

For more information on such prior GPU hardware and how it has advanced, see for example U.S. Pat. Nos. 8,112,614; 7,506,134; 7,836,118; 7,788,468; U.S. Ser. No. 10/909,033; US20140122809; Lindholm et al, "NVIDIA Tesla: A Unified Graphics and Computing Architecture," IEEE Micro (2008); https://docs.nvidia.com/cuda/parallel-thread-execution/index.html (retrieved 2021); Choquette et al, "Volta: Performance and Programmability", IEEE Micro (Volume: 38, Issue: 2, March/April 2018), DOI: 10.1109/MM.2018.022071134.

Cooperative Groups API Software Implementation

To take advantage of increased parallelism offered by modern GPUs, NVIDIA in CUDA Version 9 introduced a software-based "Cooperative Groups" API for defining and synchronizing groups of threads in a CUDA program to allow kernels to dynamically organize groups of threads. See e.g., https://developer.nvidia.com/blog/cooperative-groups/ (retrieved 2021); https://developer.nvidia.com/blog/cuda-9-features-revealed/(retrieved 2021); Bob Crovella et al, "Cooperative Groups" (09/17/2020), https://vimeo.com/461821629; US2020/0043123.

Before Cooperative Groups API, both execution control (i.e., thread synchronization) and inter-thread communication were generally limited to the level of a thread block (also called a "cooperative thread array" or "CTA") executing on one SM. The Cooperative Groups API extended the CUDA programming model to describe synchronization patterns both within and across a grid (see FIG. 8 discussed below) or across multiple grids and thus potentially (depending on hardware platform) spanning across devices or multiple devices.

The Cooperative Groups API provides CUDA device code APIs for defining, partitioning, and synchronizing groups of threads—where "groups" are programmable and can extend across thread blocks. The Cooperative Groups API also provides host-side APIs to launch grids whose threads are all scheduled by software-based scheduling to be launched concurrently. These Cooperative Groups API primitives enable additional patterns of cooperative parallelism within CUDA, including producer-consumer parallelism and global synchronization across an entire thread grid or even across multiple GPUs, without requiring hardware changes to the underlying GPU platforms. For example, the Cooperative Groups API provides a grid-wide (and thus often device-wide) synchronization barrier ("grid.sync( )") that can be used to prevent threads within the grid group from proceeding beyond the barrier until all threads in the defined grid group have reached that barrier. Such device-wide synchronization is based on the concept of a grid group ("grid_group") defining a set of threads within the same grid, scheduled by software to be resident on the device and schedulable on that device in such a way that each thread in the grid group can make forward progress. Thread groups could range in size from a few threads (smaller than a warp) to a whole thread block, to all thread blocks in a grid launch, to grids spanning multiple GPUs. Newer GPU platforms such as NVIDIA Pascal and Volta GPUs enable grid-wide and multi-GPU synchronizing groups, and Volta's independent thread scheduling enables significantly more flexible selection and partitioning of thread groups at arbitrary cross-warp and sub-warp granularities.

The Cooperative Groups API thus provided for cooperative/collaborative threads across or even beyond a grid, but had certain limitations. For example, Cooperative Groups API used software rather than hardware to provide concurrent execution. Without concurrency guarantees on the hardware level, additional API calls were typically necessary to assess GPU occupancy in order to predict whether a grid group could launch—and determining SM occupancy was thus in many cases left up to the software application. Additionally, while certain hardware support for system-wide synchronization/memory barriers were provided on some platforms, high performance mechanisms for efficiently sharing data bandwidth across thread blocks running on different SMs and thus across a device or devices were lacking. As one significant example, the inability to leverage data reads efficiently across multiple SMs often would result in redundant data retrievals—creating performance bottlenecks in which data bandwidth could not keep up with computation bandwidth. Because the Cooperative Groups API was software based, it could not solve these challenges on the hardware level. See e.g., Zhang et al, A Study of Single and Multi-device Synchronization Methods in NVIDIA GPUs, (arXiv:2004.05371v1 [cs.DC] 11 Apr. 2020); Lustig et al, "A Formal Analysis of the NVIDIA PTX Memory Consistency Model", Proceedings of the Twenty-Fourth International Conference on Architectural Support for Programming Languages and Operating Systems, Pages 257-270 (April 2019) https://doi.org/10.1145/3297858.3304043; Weber et al, "Toward a Multi-GPU Implementation of the Modular Integer GCD Algorithm Extended Abstract" ICPP 2018, August 13-16, Eugene, OR USA (ACM 2018); Jog et al, "OWL: Cooperative Thread Array Aware Scheduling Techniques for Improving GPGPU Performance" (ASPLOS'13, March 16-20, 2013, Houston, Texas, USA).

Prior "Shared Memory"

In certain prior GPU architectures, each SM included a local, on-chip read/write memory that was private to and considered part of the SM and could be shared among the multiplicity of threads executing on the SM. For example, the SM's shared memory could contain a register file and/or a scratchpad memory and/or a memory that could be allocated as "shared memory" or L1 cache memory. Any Compute thread or warp executing on the SM could access this "shared memory" using instructions such as LDS (Load From shared memory), STS (Store to shared memory), or ATOMS (perform an atomic memory access to shared memory). See e.g., US20210124582.

Using these instructions, a compute thread executing on an SM could exchange data with another compute thread executing on the same or different processing core of the same SM. However, there was no mechanism for a compute thread executing on an SM to directly exchange data with another compute thread executing on a different SM. Rather, if a thread executing on one SM wanted to exchange data with a thread executing on a different SM, both threads needed to make use of global memory such as the L2 cache memory. For example, a thread executing on one SM could write data to main memory for a thread executing on another SM to read. Sharing data between CTAs running on different SMs was thus possible, but only through the next level of the memory hierarchy—namely the L2 cache memory—that is also used for accessing main off-chip memory. Such global memory accesses were expensive in terms of resources and also took up bandwidth that could otherwise be used to retrieve data from main (off-chip) memory. Nevertheless, since all cores and executing threads of an SM had access to a local memory private to the SM, this prior arrangement worked well so long as most of the data sharing was confined to threads of the same CTA—which definitionally all execute on the same SM. This scenario was sort of like permitting all members of the same household to share a library book amongst themselves but then requiring the book to be returned to the library in order to share the book with a neighbor.

Data Bandwidth Has Not Kept Up with Processing Bandwidth

While it has been possible to increase the math throughput for each generation of new GPU hardware, it is becoming increasingly more difficult to feed the SMs or other collection or cluster of processing core(s) (e.g., tensor cores) in new GPU hardware with enough data to maintain strong scaling. FIG. 6 compares math bandwidth (number of multiply-add calculations per clock per SM) for different types of math calculations (e.g., tensor floating point 32-bit precision, floating point 16 precision, "brain" floating point 16-bit precision, integer 8-bit precision, integer 4-bit precision, and binary) for various different GPU generations and also for different data presentations (sparse and dense). The left-hand side of FIG. 6 shows how theoretical math compute bandwidth has increased exponentially as GPU computation hardware capability increased (e.g., by adding massively parallel SMs with tensor or other cores to the GPU). Meanwhile though, the right-hand side of FIG. 6 shows that a corresponding data bandwidth requirement to keep the GPU computation hardware supplied with data has not kept pace.

Experience has shown that memory bandwidth and interconnect bandwidth (e.g., from the memory system into the SMs) do not scale as well as processing bandwidth. The FIG. 7 flowchart of basic data flows within a GPU system (i.e., from interconnects to system DRAM memory to L2 cache memory to shared memory in L1 cache to math compute processors within SMs) to support tensor core and other math calculations demonstrates that to achieve strong scaling, it is necessary to improve speeds & feeds and efficiency across all levels (end to end) of the compute and memory hierarchy.

Various techniques such as memory management improvements, caching improvements, etc. have been tried and implemented to increase data bandwidth. However, adding more data bandwidth via wires costs area and power. Adding more caches costs area and power. What is needed is a way to harness more parallelism inherent in the algorithm(s) while more efficiently using the processing cores and cache/interconnect hierarchies that are available today and in the future—without requiring radical overhauling and complicating of the memory access/management hierarchy. What is needed also is a new hardware model that exploits low latency local memory to enable memory sharing and direct communications between groups of processing cores or SMs.

BRIEF DESCRIPTION OF THE DRAWINGS

FIG. 15C-2 shows an example non-limiting flowchart of GPU hardware-implemented operational steps including speculative launch of CGAs to provide hardware-based concurrency guarantees.

FIG. 21A-1 shows an example non-limiting streaming multiprocessor architecture within the context of the FIG. 21A block diagram.

DETAILED DESCRIPTION OF EXAMPLE NON-LIMITING EMBODIMENTS

Figure 1A:
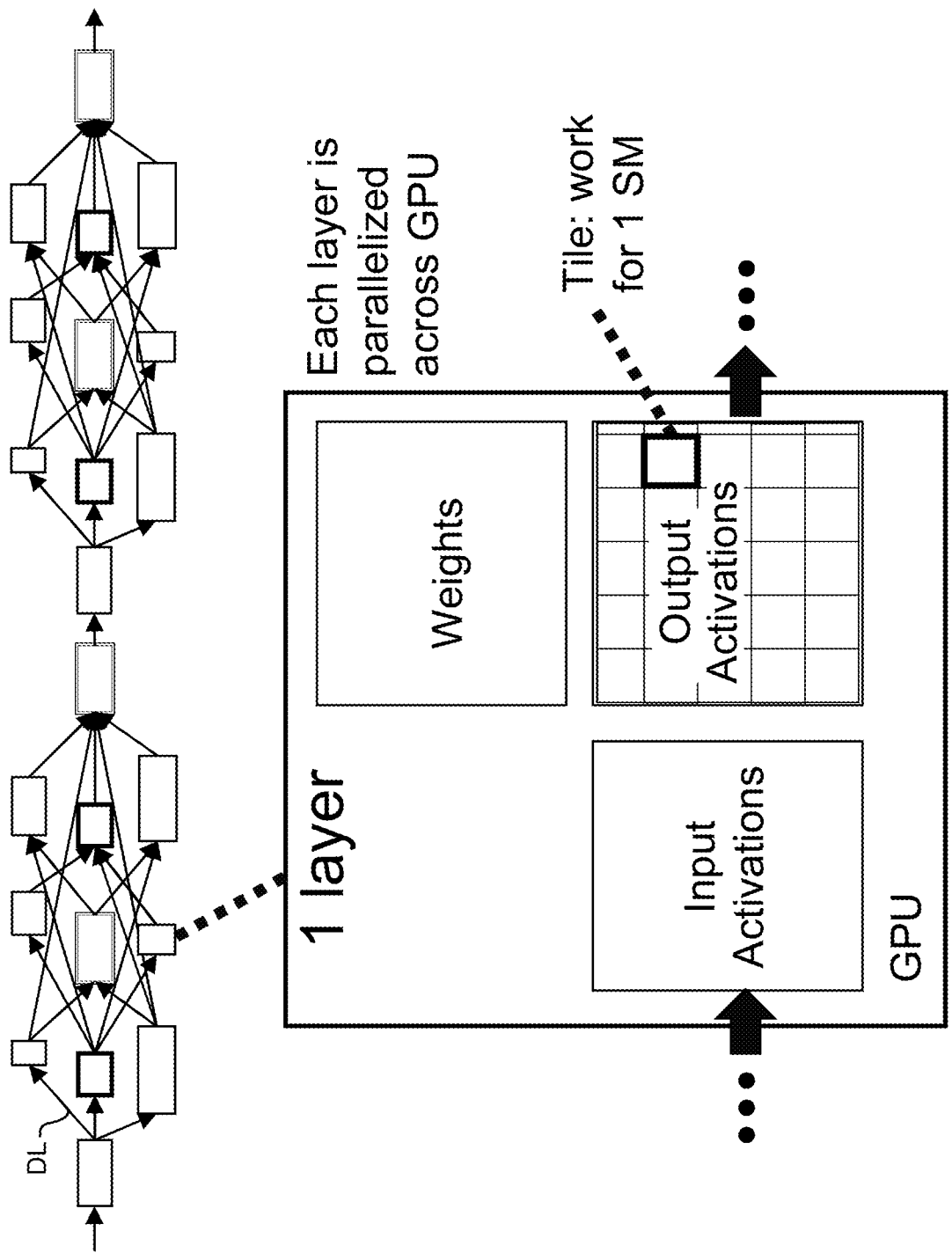
FIG. 1A shows an example application running on a GPU.
Figure 1C:
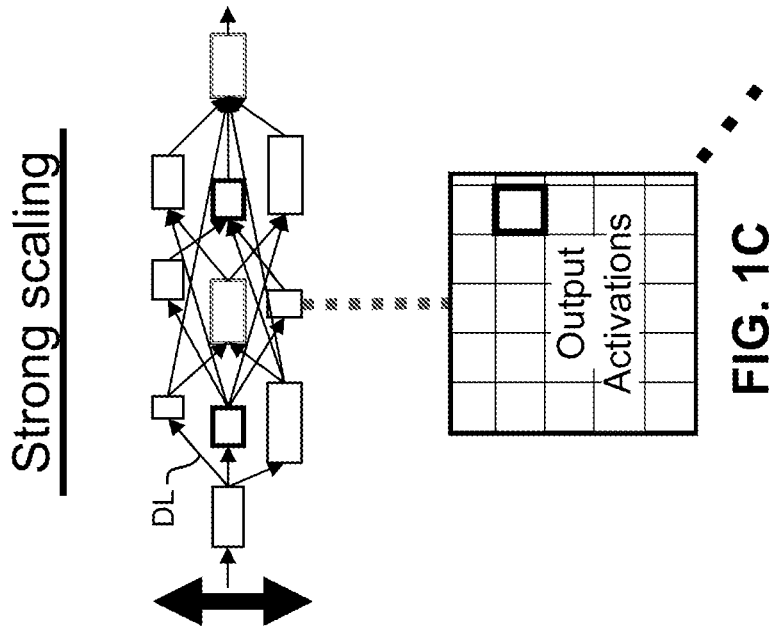
FIG. 1C shows a strong scaling deep learning scenario.
Figure 1B:
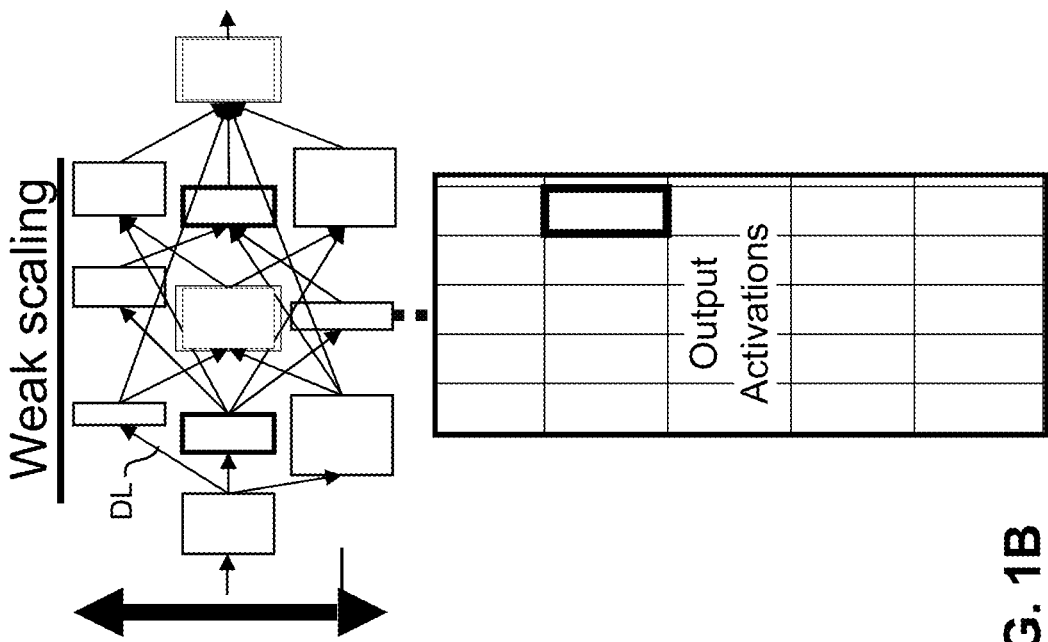
FIG. 1B shows a weak scaling deep learning scenario.

A new programming and hardware execution model is desired that would allow tighter coordination and cooperation at levels larger than a single SM or other collection or cluster of processing core(s). New hardware-based mechanisms and hardware execution controls are needed to control the placement of data and execution resources, to guarantee execution concurrency and allow efficient data sharing and synchronization at a level greater than an SM—while avoiding the need to overhaul basic in-place memory interconnect and caching technology.

The technology herein provides a new programming/execution model and associated hardware support that enables distribution of concurrent applications across plural SMs with associated data sharing and synchronization in order to more flexibly and efficiently exploit data locality and data re-use across different hierarchical levels of GPU hardware organization and partitioning. No longer is concurrent cooperative execution and associated efficient data bandwidth support restricted to a confined set of hardware processors such as within a single SM—the new technology expands such concurrent cooperative execution across any desired hardware domain and supports such concurrent cooperative execution with hardware-based concurrency guarantees, data sharing, synchronization and other mechanisms.

Consistent with and supporting these goals, the present technology introduces a new type of shared memory: distributed shared memory (DSMEM). Such DSMEM comprises blocks of memory that are distributed across a multiplicity of SMs, and which enable threads executing on one SM to access a memory block within or associated with a different SM. See FIGS. 16A and 16B. In one embodiment, the DSMEM is implemented as memory allocations that are local to and operatively associated with the various SMs. Shared access to these DSMEM allocations distributed across a collection or cluster of SMs is implemented by communications between SMs. Such shared memory thus supports cooperative parallelism and strong scaling across multiple SMs by permitting data sharing and communications previously possible only across the same SM.

Such higher performance programming model as mentioned above allows the CTAs within an array of thread group such as a "Cooperative Group Array" (CGA) (see below) to directly access the shared memory that is allocated within each SM at CTA creation. This is called distributed shared memory (DSMEM) since a segment of the logical shared memory address space is located physically "within" each SM. DSMEM can be used for data sharing or synchronization between the threads in the entire CGA. Direct SM-to-SM communication is supported for reads, writes and atomics. The lower latency of SM-to-SM communication compared to global memory access to L2 cache or frame buffer (FB) memory allows an application to more easily strongly scale across the N SMs in the CGA.

As an example, DSMEM can be used to accelerate Split-K parallel reductions in deep learning applications. Without DSMEM, the split-K reduction must be performed in the L2 cache. With DSMEM, split-K reductions are much faster due to the ability of one SM to write directly into another SM's shared memory.

As a second example, the math throughput of the SM when doing the inner loop of GEMM kernels has become so high that synchronization is required every 64-256 clock cycles across all the CTAs in the CGA. The low latency SM2SM network built for DSMEM communication allows these synchronizations to no longer be the limiter for the computation.

The CGAs described herein guarantee all CTAs in the CGAs are co-resident on the machine. In one embodiment, hardware speculatively launches the CGA to ensure it will fit on available processing resources before actually launching the CGA. This hardware-based concurrency guarantee means it is possible to share resources that are within an SM, an example being distributed shared memory (DSMEM). With the software-based Cooperative Groups API, only global memory is available for sharing. Hardware changes were required to expose DSMEM from every SM in the CGA and the CUDA programming model was extended to match. Sharing DSMEM allows for faster synchronization, multi-cast to reduce data traffic from global memory, and having some deep learning (DL) parameter data closer to the processing elements in each SM rather than having to refetch them from memory. DSMEM is exposed to the programmer, who can move data into this closer memory as required to optimize algorithm performance. Making DSMEM accessible from any SM that is part of the same CGA is a hardware improvement of CGAs that allows strong scaling.

Further improvements include several new hardware capabilities such as:
- Direct SM to SM communication to all the CTA's shared memory that are part of the same CGA
    - DSMEM supports read/write/atomic instructions
    - Segmented addressing based on CTA_id_within_CGA
    - CGA_id allocation and recycling protocols
    - CAM structure to allow DSMEM addressing from remote SMs
    - A new low-latency SM2SM communication network in GPCARB
    - DSMEM coalesced write acks and optimized Membar handling
- Hardware barriers to synchronize DSMEM usage at CGA creation and during CGA context switching
    - Using a hardware barrier to ensure DSMEM is available in all CTAs of a CGA before any CTA references it.
    - Using a hardware barrier to ensure all CTAs in CGA have completed all DSMEM accesses before the SM state is saved for a context switch, and all DSMEM has been restored by a context restore before new DSMEM accesses are allowed.
- CGA/CTA exit and error handling protocols with DSMEM.

The ability to access DSMEM from any CTA in the GPC_CGA enables several other features such as:
- DSMEM supports programmatic multicast and the TMA unit.
- DSMEM supports fast data exchange between SMs.

Background: CUDA Cooperative Thread Array (CTA) Programming Model

Programmers in CUDA describe their computations as grids of parallel thread blocks called "cooperative thread arrays" or CTAs. In this context, a CTA is an array of threads that execute a kernel concurrently or in parallel. Prior CUDA programming models use the CTA as the fundamental building block of parallelism for GPU software (SW). In one such model, a CTA can have up to 1024 threads and all threads are guaranteed to launch and execute simultaneously on the same SM. In such model, because one SM runs all threads in the CTA, the threads can take advantage of the shared memory resources within and/or connected to the SM to share data, synchronize, communicate, etc. between threads—assuring data locality and data re-use across the concurrently-executing threads.

Prior CTA Grid Hierarchy

Because many applications require more than 1024 threads (i.e., multiple CTAs), an original CUDA programming model for compute applications was based on a "grid"—an array of CTAs, where each CTA was generally launched onto the least loaded SM in the GPU. There was a maximum number of threads that a CTA could contain. However, CTAs that executed the same kernel could be batched together into a grid of CTAs, so that the total number of threads that could be launched in a single kernel invocation was very large. This came at the expense of reduced thread communication and synchronization, because threads in different CTAs could not communicate and synchronize with each other. Multiple CTAs might execute concurrently and in parallel, or they might execute sequentially, depending on the platform and platform loading.

Each CTA had a unique CTA identifier ("ctaid") within a grid of CTAs. Each grid of CTAs had a 1D, 2D, or 3D shape specified by a parameter called nctaid. Each grid also had a unique temporal grid identifier ("gridid"). Threads were able to read and use these values through predefined, read-only special registers such as "% tid", "% ntid", "% ctaid", "% nctaid", and "% gridid". See e.g., Parallel Thread Execution ISA: Application Guide (NVidia v5.0 June 2017).

Figure 8:
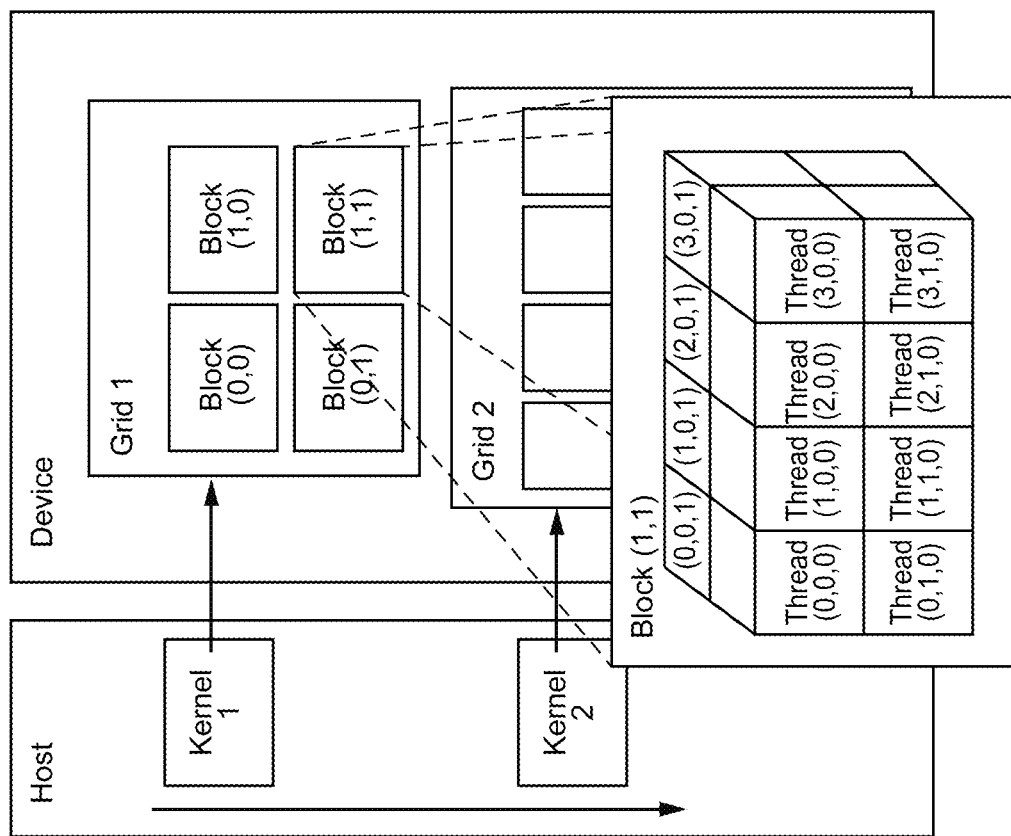
FIG. 8 shows an example prior art grid of CTAs.
Figure 9:
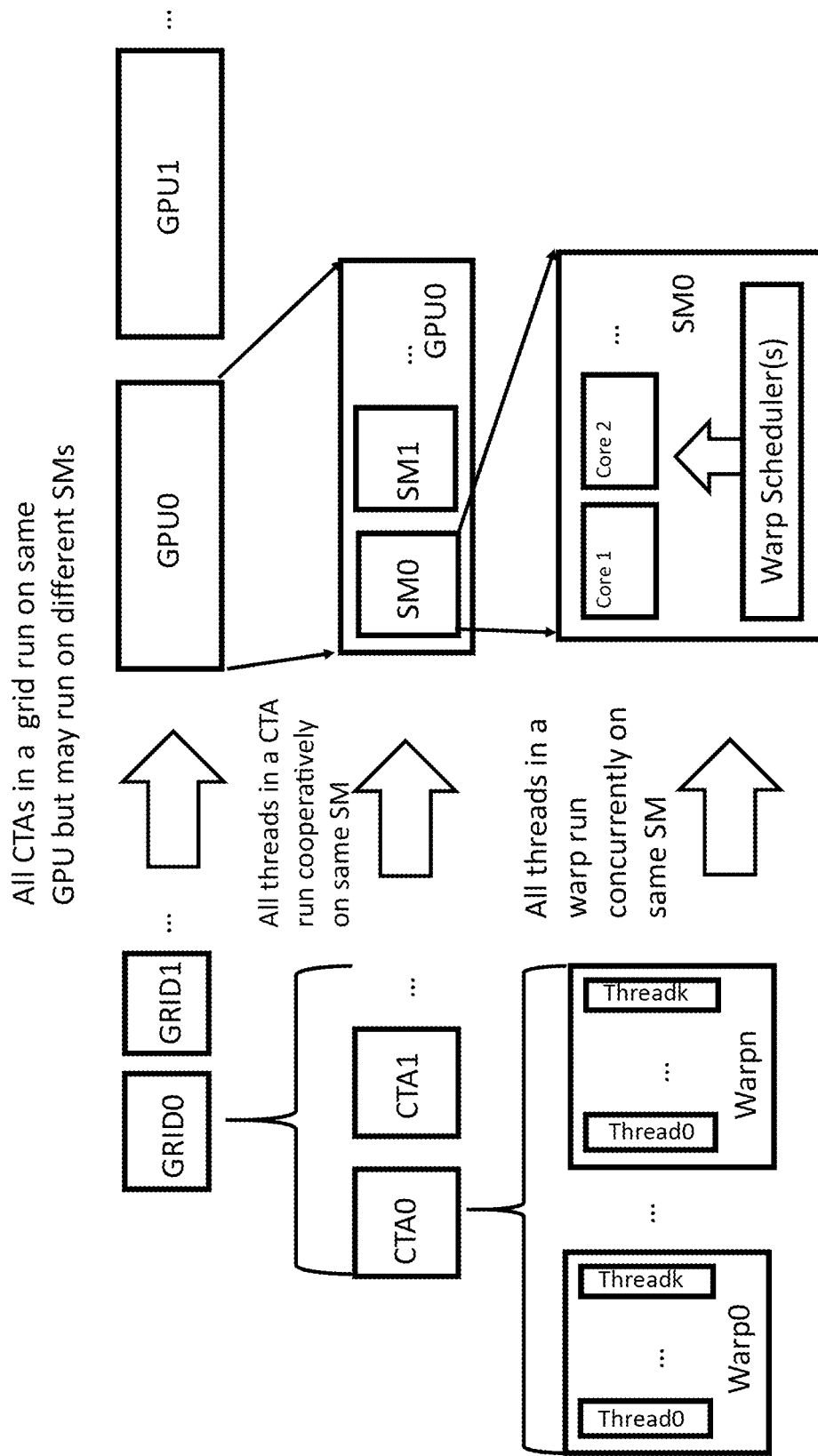
FIG. 9 shows an example of how the prior art grids of CTAs maps onto GPU hardware partitions.
Figure 11A:
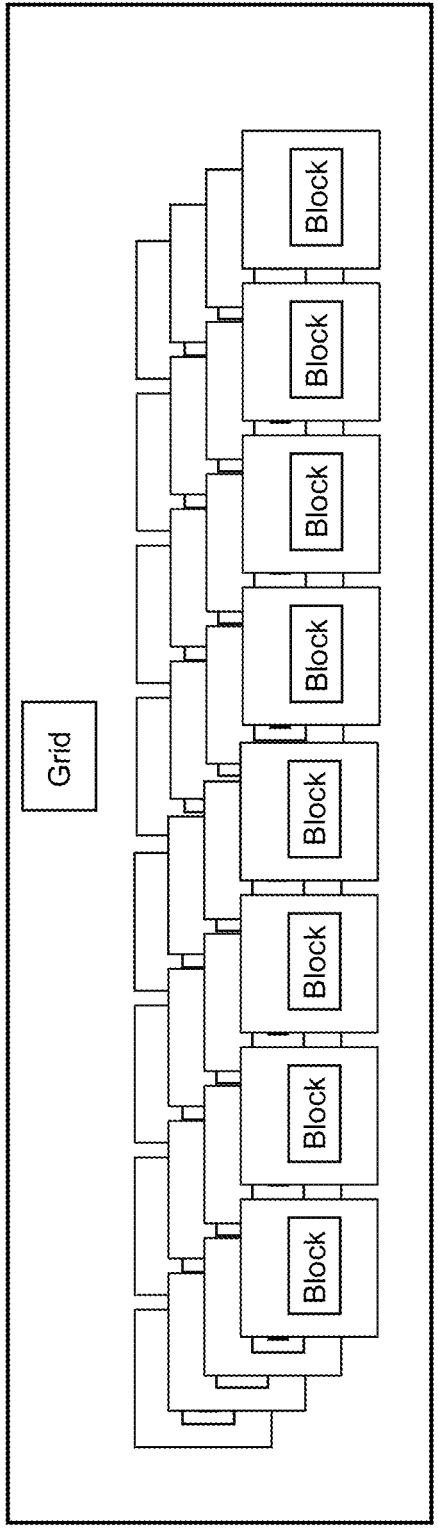
FIG. 11A shows an example prior art grid of CTAs.

FIGS. 8 and 11A show an example hierarchy in which a grid comprises plural CTAs. In such model, each thread of the CTA was allocated its own resources such as private memory, and synchronization typically occurred on the thread level. Each SM scheduled concurrent execution of a number of (e.g., 32 or other programmable/platform-dependent value) threads grouped together as "warps" (using a textile analogy). A "warp" is a maximal subset of threads from a single CTA, such that the threads executed the same instructions on the same SM at the same time. Generally, a warp executed in a SIMD fashion on an SM, i.e., all threads in the warp shared the same instruction stream and execute together in lockstep (this is sometimes referred to as single-instruction multiple-threads, or SIMT). Meanwhile, as shown in FIG. 9, an SM's warp scheduler scheduled all warps in a CTA for concurrent launch on the SM to guarantee that all threads in a CTA executed concurrently. In modern GPUs, an SM has parallel compute execution capacity that meets or exceeds the maximum number of threads in a CTA—meaning that the entire CTA (or in some GPUs, plural CTAs) can always launch concurrently on the same SM.

Figure 2A:
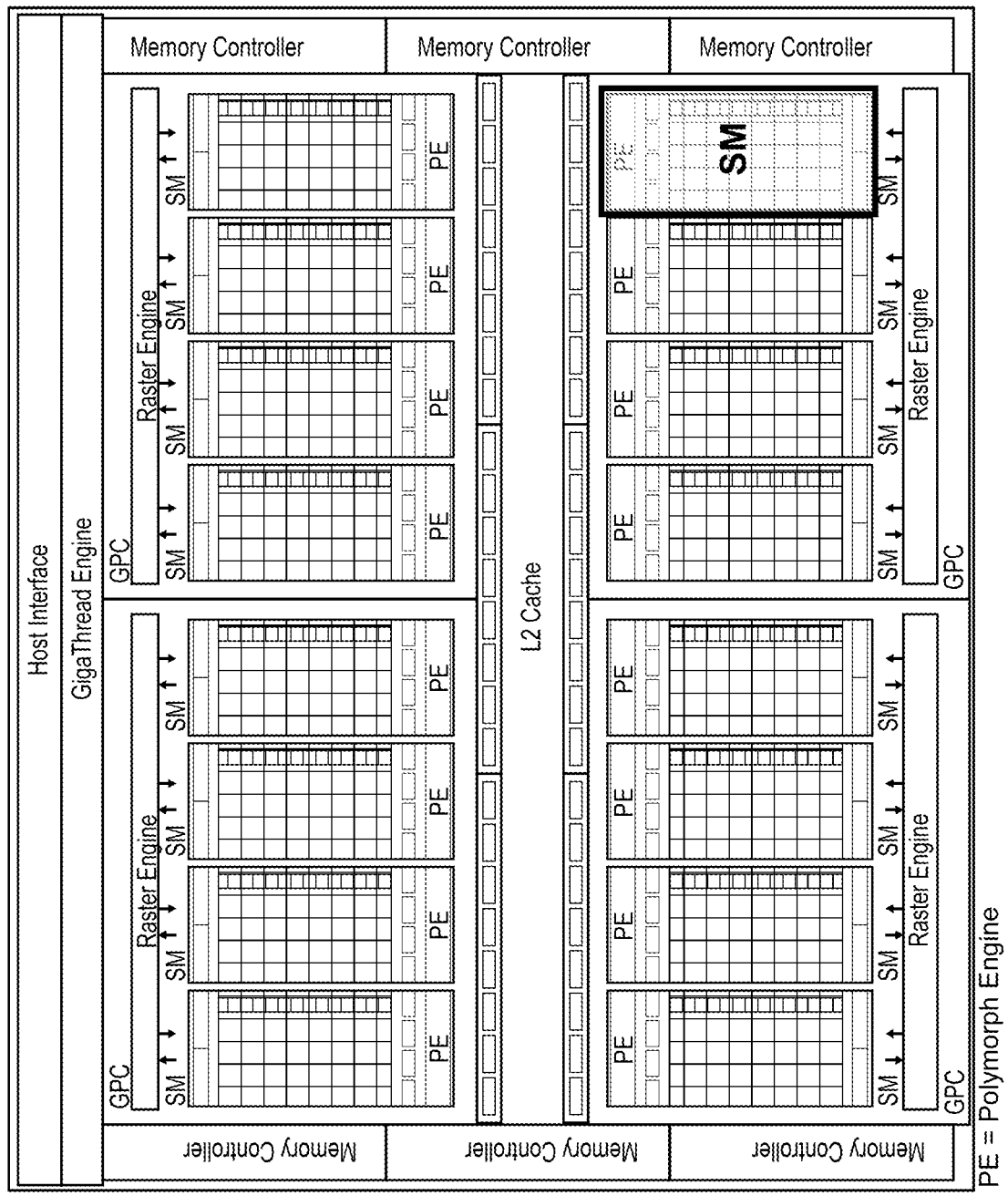
FIGS. 2A and 2B illustrate increased GPU hardware parallelism.
Figure 2B:
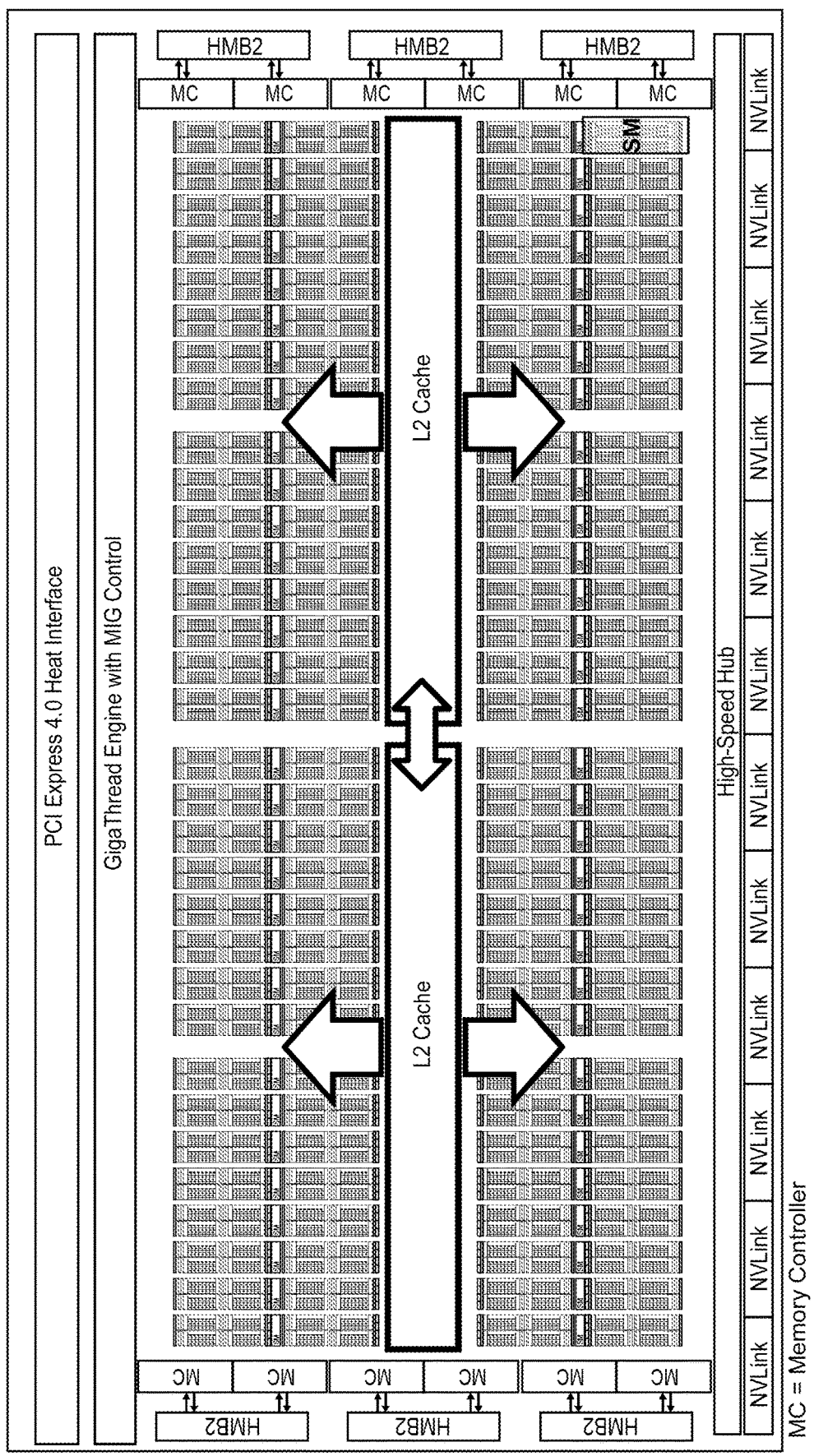
Figure 2C:
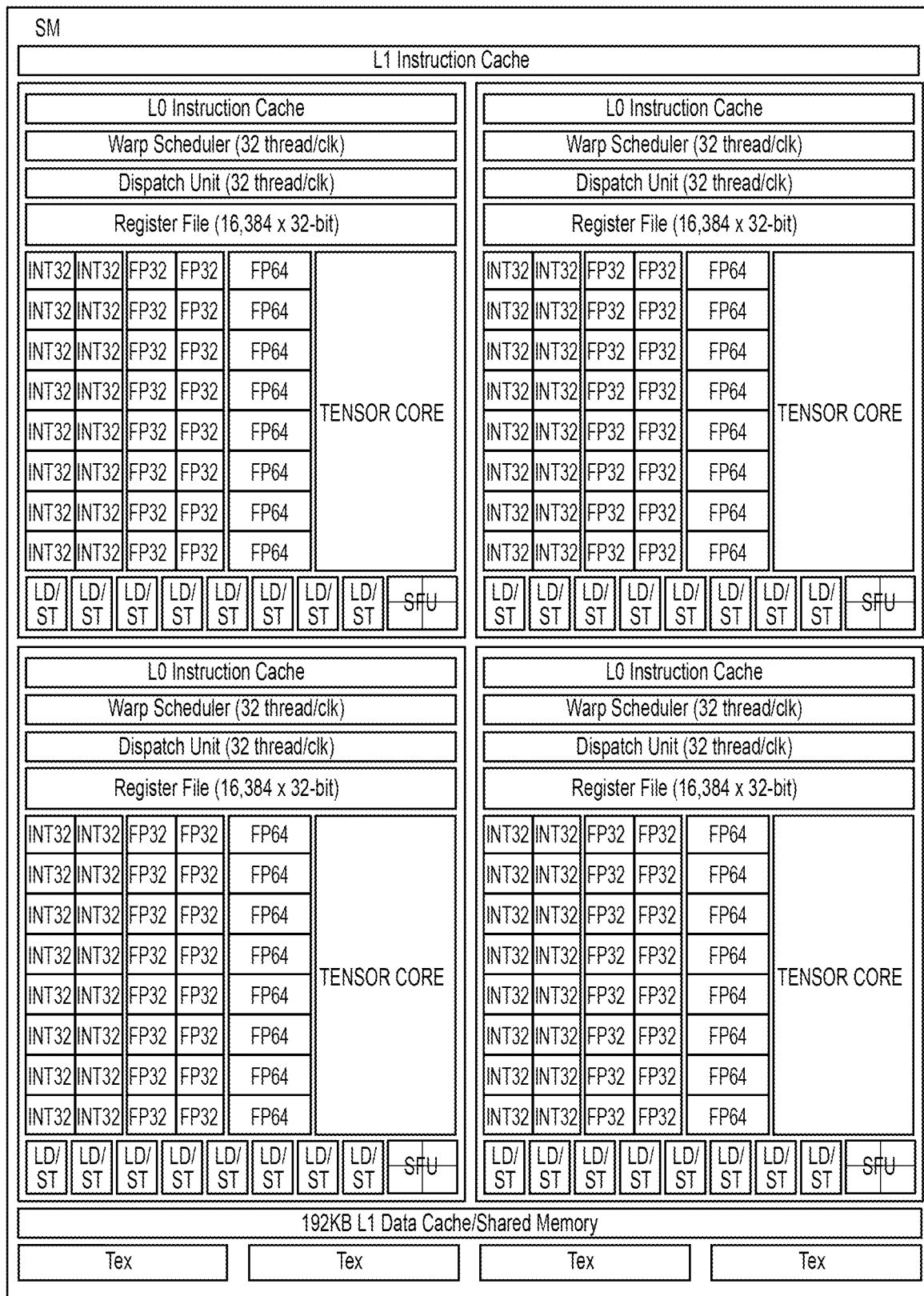
FIG. 2C is a block architectural diagram of a recent streaming multiprocessor within a GPU.

In the context of FIG. 9 and/or FIG. 2C, an SM or "streaming multiprocessor" means a processor architected as described in U.S. Pat. No. 7,447,873 to Nordquist including improvements thereto and advancements thereof, and as implemented for example in many generations of NVIDIA GPUs. For example, an SM may comprise a plurality of processing engines or cores configured to concurrently execute a plurality of threads arranged in a plurality of single-instruction, multiple-data (SIMD) groups (e.g., warps) or single-instruction, multiple-thread (SIMT), wherein each of the threads in a same one of the SIMD or SIMT groups executes a same data processing program comprising a sequence of instructions on a different input object, and different threads in the same one of the SIMD or SIMT group are executed using different ones of the processing engines or cores. An SM may typically also provide (a) a local register file having plural lanes, wherein each processing engine or core is configured to access a different subset of the lanes; and instruction issue logic configured to select one of the SIMD or SIMT groups and to issue one of the instructions of the same data processing program to each of the plurality of processing engines in parallel, wherein each processing engine executes the same instruction in parallel with each other processing engine using the subset of the local register file lanes accessible thereto. An SM typically further includes core interface logic configured to initiate execution of one or more SIMD or SIMT groups. As shown in FIG. 2C, such SMs have been constructed to provide fast local shared memory enabling data sharing/reuse and synchronization between all threads of a CTA executing on the SM.

In such SM-based programming models, a CTA declares some amount of shared memory local to the SM on which the CTA runs. This shared memory exists for the lifetime of the CTA and is visible to all the threads in the CTA. Threads within a CTA can communicate with each other through this shared memory for both data sharing and synchronization.

Shader instructions (e.g., "_syncthreads( )") exist to do barrier synchronization across all threads in a CTA. For example, to coordinate the execution of threads within the CTA, one can use barrier instructions to specify synchronization points where threads wait until all other threads in the CTA have arrived. See e.g., USP10977037; Parallel Thread Execution ISA (June 2017).

Inasmuch as a single CTA executing on a single SM is the fundamental unit of parallelism for software in the prior model, the GPU hardware did not guarantee any cooperation at a higher level (e.g., the Grid level) across CTAs. As FIG. 9 shows, all CTAs in a grid run on the same GPU, share the same kernel and can communicate via global memory. The CTAs of a Grid may execute all at the same time on the GPU hardware, or they may run sequentially—depending on the size of the GPU and the load caused by this Grid or other Grids. By executing these CTAs independently on different SMs potentially at different times, it was not possible to share operations (e.g., memory data retrieval, synchronization, etc.) efficiently between them. And even if they did execute concurrently (such as under the Cooperative Groups API), they may not have been able to efficiently share memory or data bandwidth to provide tight cooperative coupling across the group. For example, if a grid was launched in several groups of plural CTAs, it would be legal from a hardware standpoint for the machine to run those CTAs non-concurrently—causing deadlock if an algorithm needed both or all CTAs to run concurrently and pass information back and forth.

Increased GPU Parallelism/Complexity Cries Out For a New Approach

The CTA programming model has served developers well, providing data locality and data re-use at the SM level, for many years and many generations of GPUs. However, as discussed above, over time GPUs have become much larger, for example containing over 100 SMs per GPU, and the interconnect to L2 cache and the memory system is no longer a flat crossbar but is hierarchical and reflective of hierarchical hardware domain levels (e.g., GPU, uGPU, GPC, etc.). In such more advanced GPUs, mechanisms defining the SM as the basic unit of data locality are often too small of a granularity. To maximize performance and scalability, what is needed is a new programming/execution model that allows software to control locality and concurrency at a unit much larger than a single SM (which is now <1% of the GPU) while still maintaining the ability to share data and synchronize across all threads like a CTA. An application should be able to control data locality and data re-use to minimize latency. This is especially true for Deep Learning and HPC applications that want to do strong scaling (see above) by creating a cooperating set of threads across large sections of GPU hardware.

Cooperative Group Arrays

The example non-limiting technology herein introduces a new level(s) of hierarchy—"Cooperative Group Arrays" (CGAs)—and an associated new programming/execution model and supporting hardware implementation. The present embodiments further provide a new programming model for Grids based on the new CGA hierarchy.

In one embodiment, a CGA is a collection of CTAs where hardware guarantees that all CTAs of the CGA are launched to the same hardware organization level the CGA specifies or is associated with. This spatial affinity between CGAs and hardware domains or partitions provides certain advantages, as discussed in detail below. The hardware is configured to make sure there are enough processing resources in the target hardware level to launch all CTAs of the CGA before launching any.

Figure 11B:
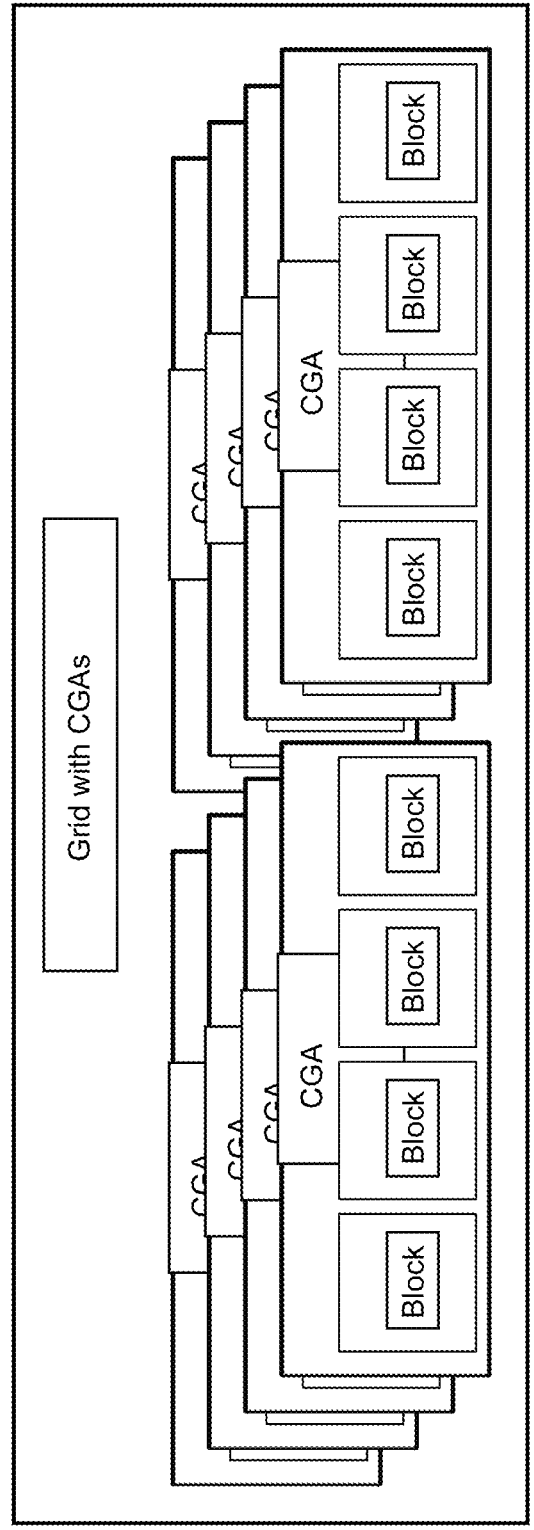
FIG. 11B shows an example new CGA hierarchy that group CTAs into CGAs.

As FIG. 11B shows, the construct of "grid" is expanded to be an array of CGAs. Each CGA is an array of CTAs (see FIG. 12, 12A discussion below). Such CGAs provide co-scheduling, e.g., control over where CTAs are placed/executed in the GPU, relative to the memory required by an application and relative to each other. The CTAs in a CGA are not required to run on the same SM, nor are they required to run on SMs that are neighbors of one another or that are physically next to or close to one another. But in one embodiment, the CTAs in a CGA can be launched concurrently on plural SMs that are in the same hardware domain and thus are connected to the processing system to be able to interact and/or communicate in certain ways (for example, connected to the same part of the system memory hierarchy, able to communicate with one another, coupled to one another in other ways, etc.). This enables applications to see more data locality, reduced latency, and better synchronization between all the threads in tightly cooperating CTAs.

For example, in one embodiment, CGAs let an application take advantage of the hierarchical nature of the interconnect and caching subsystem in modern GPUs and make it easier to scale as chips grow in the future. By exploiting spatial locality, CGAs allow more efficient communication and lower latency data movement. GPU hardware improvements guarantee that threads of plural CTAs the new CGA hierarchical level(s) define will run concurrently for desired spatial localities, by allowing CGAs to control where on the machine the concurrent CTA threads will run relative to one another.

In one embodiment, each CGA is composed of CTAs that hardware guarantees will launch and execute simultaneously/concurrently. The CTAs in a CGA may—and in the general case will—execute on different (and possibly many different) SMs within the GPU. Even though the CTAs execute on different SMs, the GPU hardware/system nevertheless provides a cross-SM guarantee that the CTAs in a CGA will be scheduled to launch concurrently. The GPU hardware/system also provides efficient mechanisms by which the concurrently-launched CTAs can communicate with one another. This allows an application to explicitly share data between the CTAs in a CGA and also enables synchronization between the various threads of the CTAs in the CGA.

In example embodiments, the various threads within the CGA can read/write from common shared memory—enabling any thread in the CGA to share data with any other thread in the CGA. Sharing data between CTAs in the CGA saves interconnect and memory bandwidth which is often the performance limiter for an application. CGAs thus increase GPU performance. As explained above, in prior programming models it was generally not possible to directly share data between two CTAs because there was no guarantee that both CTAs would be running simultaneously in the same relevant hardware domain. Without CGAs, if two CTAs needed to share the same data, they generally would each have to fetch it from memory—using twice the bandwidth. This is like two parents each going to the store to buy milk. In contrast, effectively exploiting data locality is known to be important to GPU performance. See e.g., Lal et al, "A Quantitative Study of Locality in GPU Caches", in: Orailoglu et al (eds), Embedded Computer Systems: Architectures, Modeling, and Simulation, (SAMOS 2020), Lecture Notes in Computer Science, vol 12471. Springer, Cham. https://doi.org/10.1007/978-3-030-60939-9_16

Now, using the concurrent execution and additional shared memory supported by hardware, it is possible to directly share data between threads of one CTA and threads of another CTA—enabling dependencies across CTAs that can bridge hardware (e.g., cross-SM) partitions.

Because CGAs guarantee all their CTAs execute concurrently with a known spatial relationship, other hardware optimizations are possible such as:

Multicasting data returned from memory to multiple SMs (CTAs) to save interconnect bandwidth Direct SM-to-SM communication for lower latency data sharing and improved synchronization between producer and consumer threads in the CGA Hardware barriers for synchronizing execution across all (or any) threads in a CGA and more (see copending commonly-assigned patent applications listed above).

As discussed above, example embodiments offer distributed shared memory (DSMEM). DSMEM is enabled and provided by new hardware support that removes the constraint that only thread blocks executing on an SM can read, write, or otherwise access memory local to the SM. In one example embodiment, DSMEM is shared between CTAs that are executing on the same GPC—that is, they are part of the same GPC-CGA and are thus guaranteed by hardware to run concurrently on the same GPC.

These features provide higher performance by amplifying memory and interconnect bandwidth, reducing memory latency, and reducing the overhead of thread-to-thread communication and synchronization. Thus, all of these features ultimately lead to strong scaling of the application.

New Levels of Hierarchy—CGAs

In example embodiments, a CGA is made up of plural CTAs—that is, plural collections or bundles of threads structured to execute cooperatively. Each such collection or bundle of threads provides all of the advantages and structure that have long been provided by prior CTAs—such as for example running on the same SM. However, the additional overlay the CGA provides defines where and when the CTAs will run, and in particular, guarantees that all CTAs of a CGA will run concurrently within a common hardware domain that provides dynamic sharing of data, messaging and synchronization between the CTAs.

Example embodiments support different types/levels of CGAs directed to different GPU hardware domains, partitions or other organization levels. Specifically, a CGA can define or specify the hardware domain on which all CTAs in the CGA shall run. By way of analogy, just as local high school sports teams might compete in local divisions, regions, or statewide, a CGA could require the CTAs it references to all run on the same portion (GPC and/or µGPU) of a GPU, on the same GPU, on the same cluster of GPUs, etc.

Figure 3:
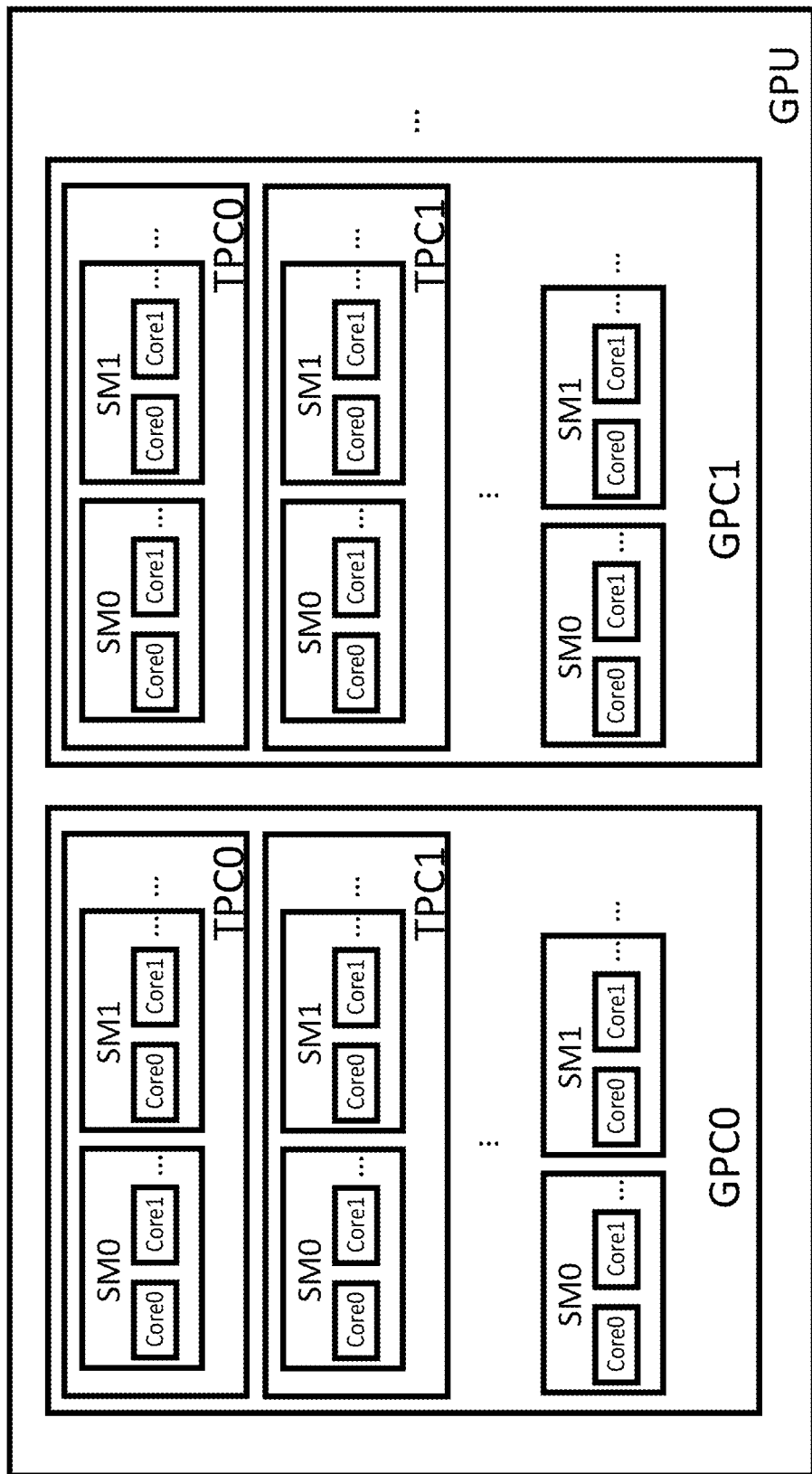
FIG. 3 shows example prior art GPU hardware partitions.
Figure 4:
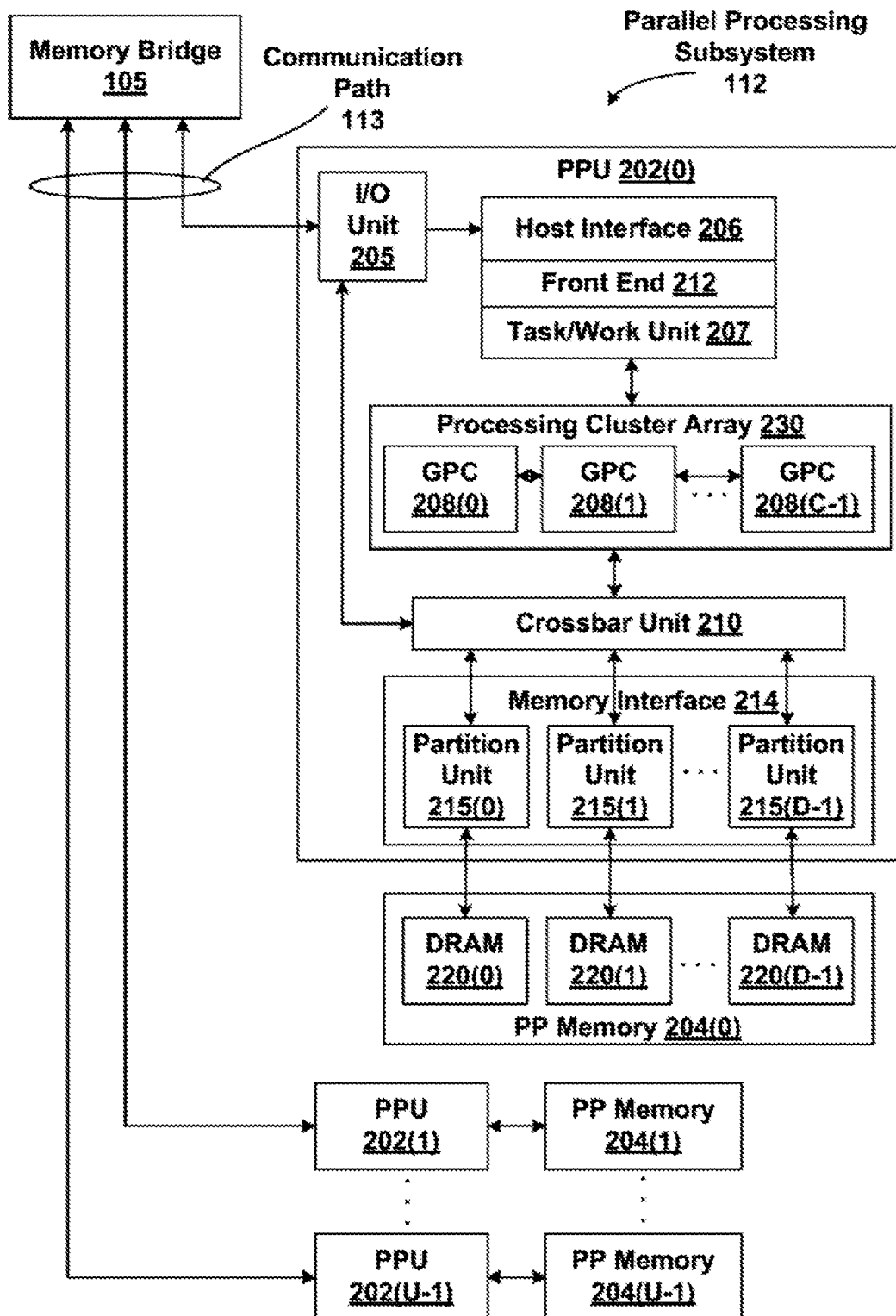
FIG. 4 shows an example prior art GPU hardware with graphics processing clusters.
Figure 10B:
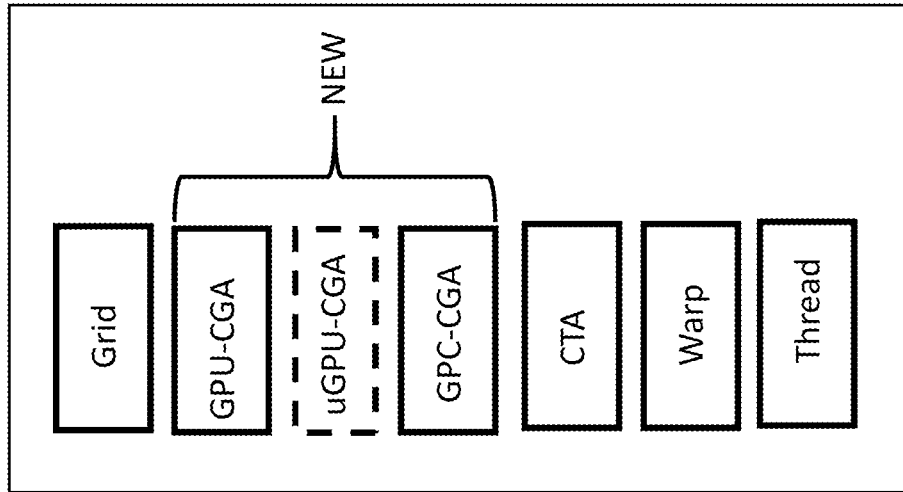
FIG. 10B illustrates an example new CGA hierarchy.
Figure 10A:
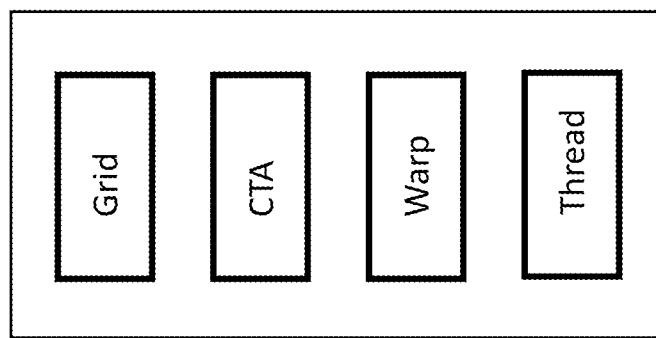
FIG. 10A illustrates an example prior art grid of CTAs.

In example embodiments, the hierarchies the CGAs define/specify, are tied to or otherwise reflect GPU hardware partitions reflective of memory access and/or communications capabilities, in order to provide desired resource and data re-use and data locality. For example, just as a GPU may comprise plural GPCs as FIGS. 3 and 4 show, a GPU_CGA may be made up of plural GPC_CGAs. FIG. 10B shows an example CGA hierarchy providing additional nested hierarchy levels reflective of different hardware domains:

GPU CGAs
µGPU-CGAs
GPC_CGAs.

In example non-limiting embodiments, hardware guarantees concurrent launch of all of the CTAs within a certain CGA onto SMs that are part of a hardware domain specified by a hardware domain specifier associated with that certain CGA, for example:

all the CTAs for a GPU_CGA are launched onto SMs that are part of the same GPU;

all the CTAs for a µGPU_CGA are launched onto SMs that are part of the same µGPU;

all the CTAs for a GPC_CGA are launched onto SMs that are part of the same GPC.

Figure 5:
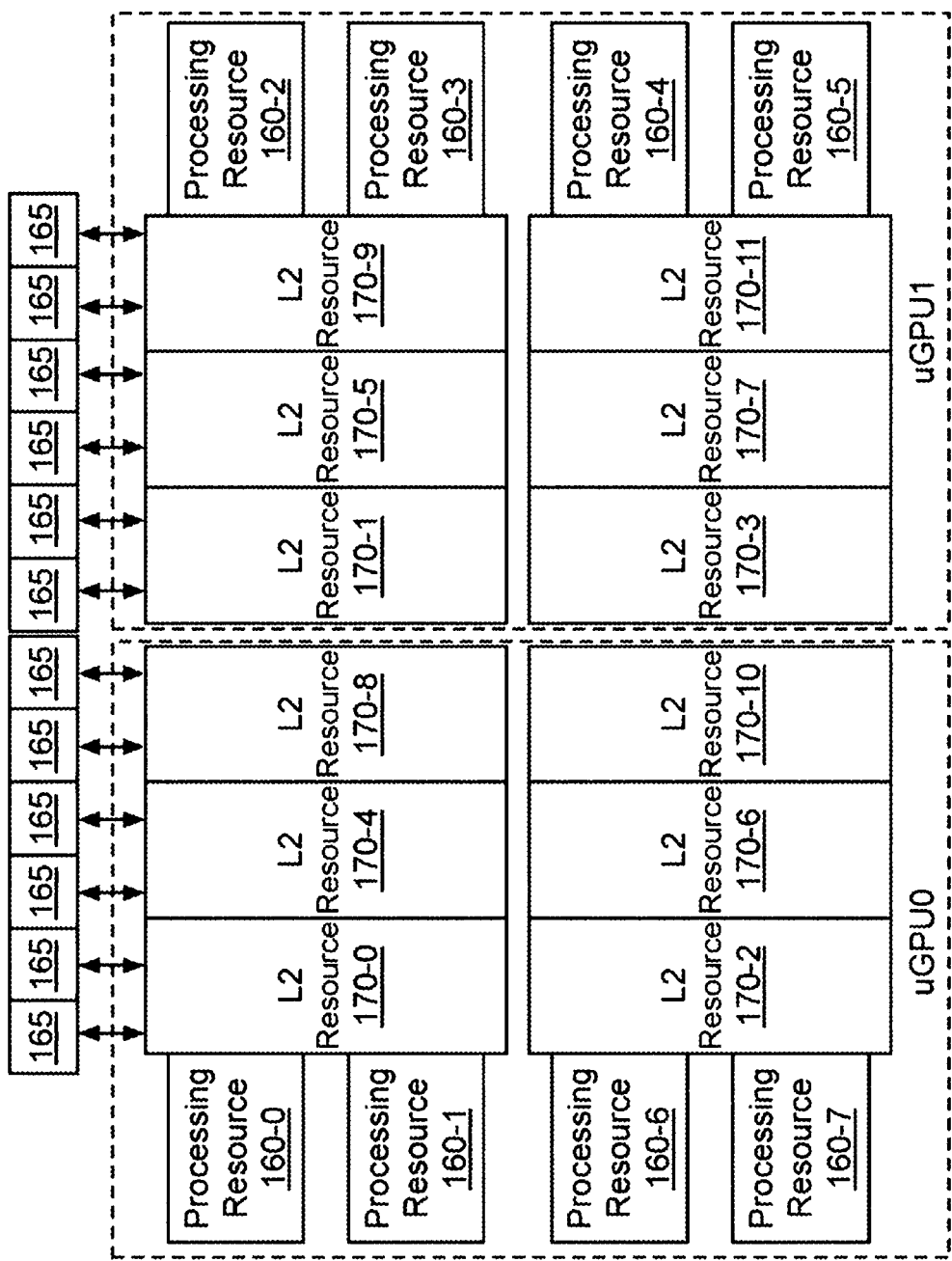
FIG. 5 shows example prior art μGPU partitions.
Figure 5A:
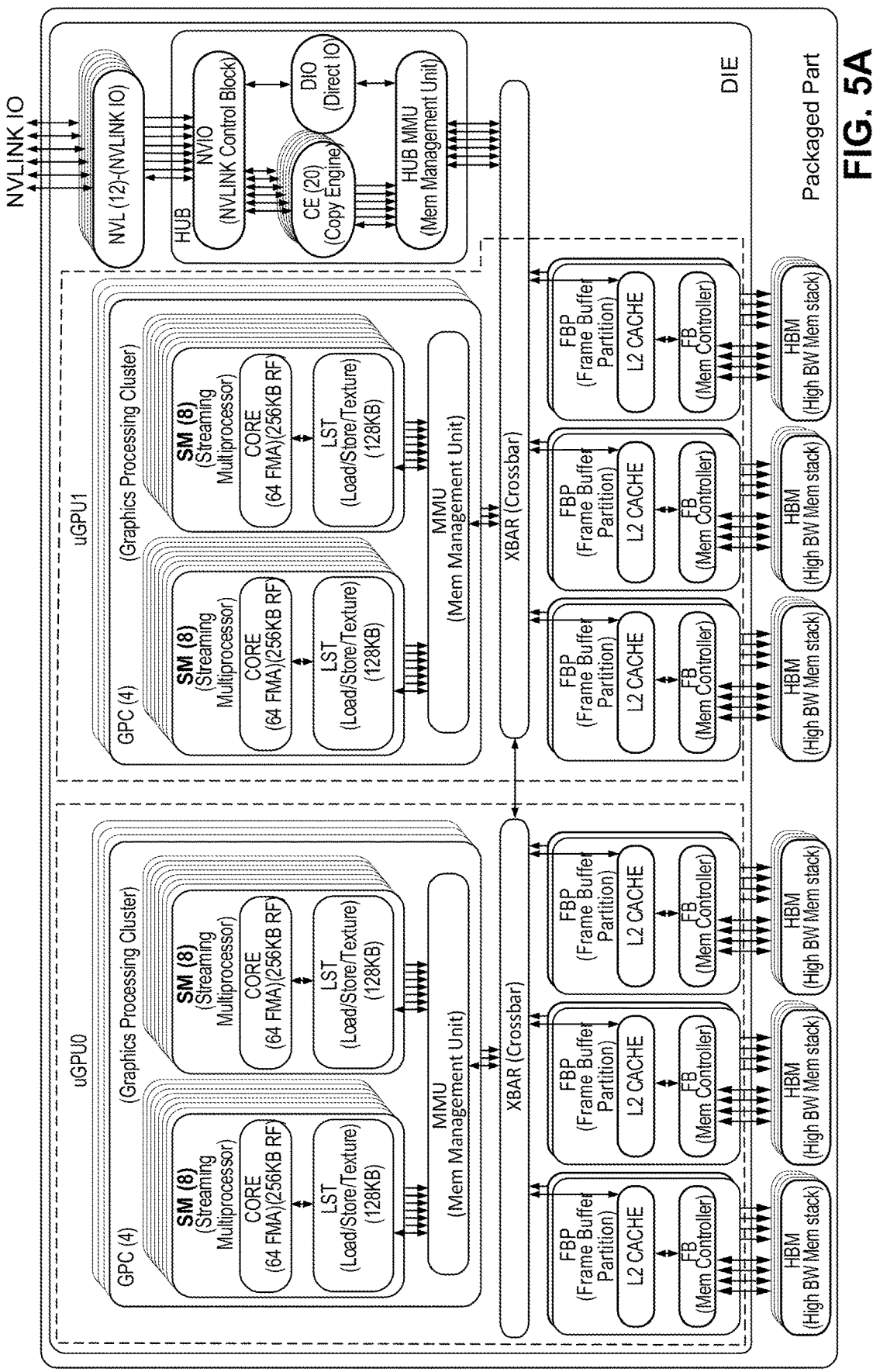
FIG. 5A is a block architectural diagram of a recent GPU architecture including streaming multiprocessors and associated interconnects partitioned in to different μGPU partitions.
Figure 6:
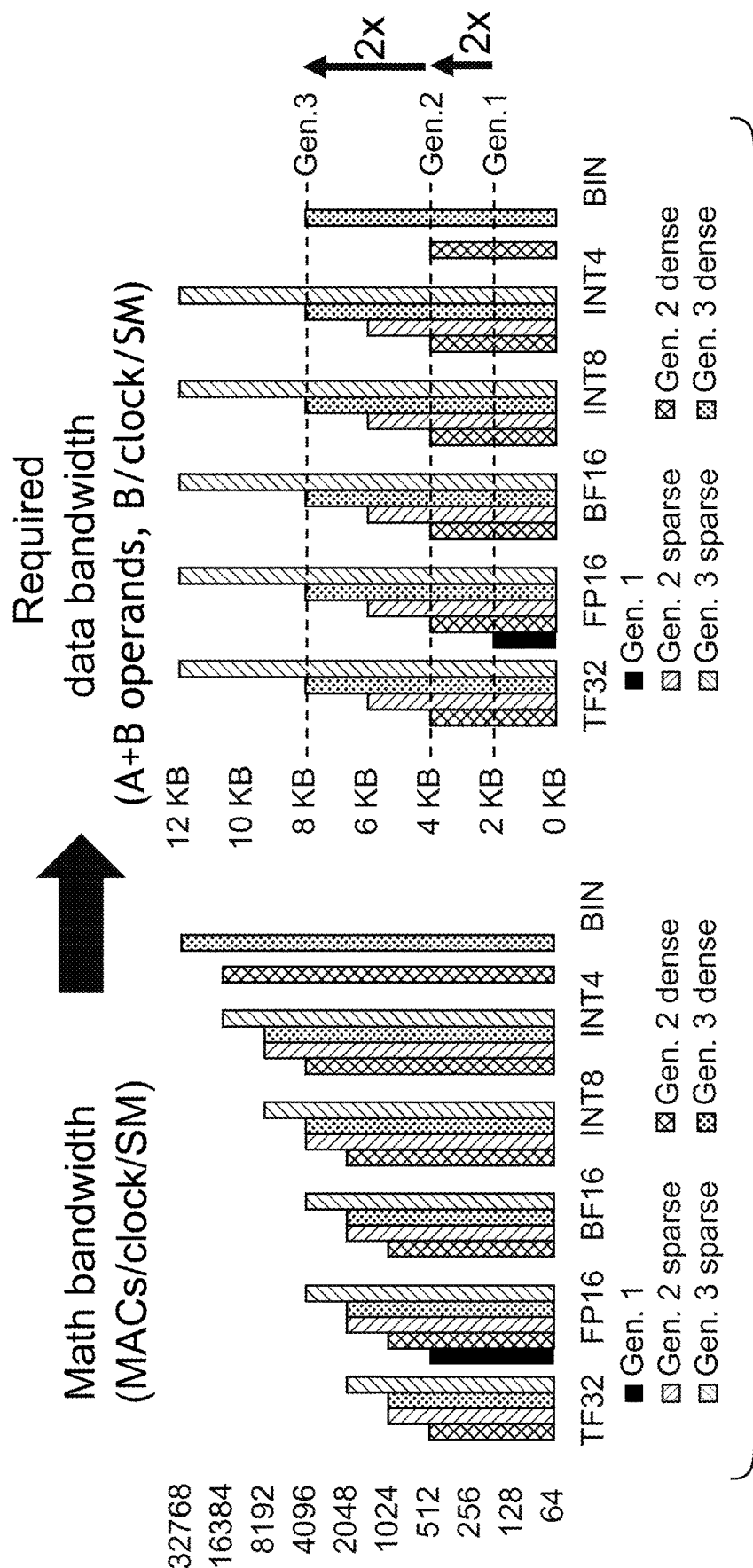
FIG. 6 shows example increased math throughput and associated data bandwidths for different GPU generations.

In more detail, some embodiments of CGAs also support µGPU partitions such as shown in FIGS. 5, 5A and provide several new capabilities and hardware guarantees such as:

CGAs provide new levels of hierarchy for threads between the Grid (kernel) level and CTA level GPC_CGAs place all CTAs within the same GPC µGPU_CGAs place all the CTAs within SMs of the same µGPU, which in some implementations matches the memory interconnect hierarchy within large GPUs GPU_CGAs place all CTAs within the same GPU ABC_CGAs place all CTAs within the ABC hardware domain where "ABC" is any GPU hardware domain, organization or hierarchy within or across the GPU architecture(s).

These example levels (Grid, GPU_CGA, µGPU_CGA, GPC_CGA, and CTA—see FIG. 10B)) can be nested to further control the placement of SM resources at each level. For example, a GPU_CGA can be made up of µGPU_CGAs, which is made of GPC_CGAs, which is made of CTAs. Such nesting can support conventional dynamic parallelism for each and all levels of the hierarchy. See e.g., https://developer.nvidia.com/blog/cuda-dynamic-parallelism-api-principles/

Hardware Guarantees Concurrent Execution of CTAs

In example embodiments, all CTAs in a CGA are co-scheduled. This means the GPU hardware will not permit any CTAs in a CGA to launch unless/until there is room on the GPU (or other hardware partition greater than an SM with which the CGA has hardware affinity) for all the CTAs in the CGA to launch. This hardware guarantee allows software to count on the fact that all the threads in the CGA will be executing simultaneously, so that things like barrier synchronization and data sharing across all the threads are possible. No single CTA in a CGA can be stuck indefinitely waiting to launch—in one embodiment, either the whole CGA is launched or none of it.

In example embodiments, each CGA has a (at least one) hardware barrier allocated to it, and all the CTAs in a CGA may reference that CGA hardware barrier(s). See above-identified US patent application Ser. No. 17/691,296 filed Mar. 10, 2022 entitled "Hardware Accelerated Synchronization Mechanism With Asynchronous Transaction Support (20-SH-0601US01; 6610-98).

In one example arrangement, hardware maintains a count of the number of running CTAs in the CGA (i.e. CTAs that have not exited), and software may perform barrier synchronization across all threads in all running CTAs in the CGA. This hardware barrier is useful for example to bootstrap all the CTAs and confirm they have all been launched.

Example Cooperative Group Array Grids

Figure 12:
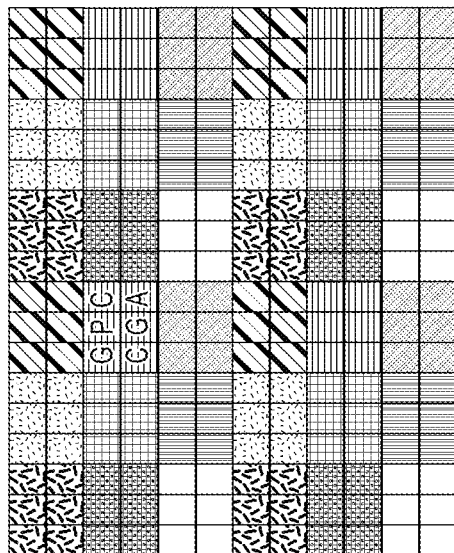
FIGS. 12, 12A show example CGA grid arrangements.
Figure 12:
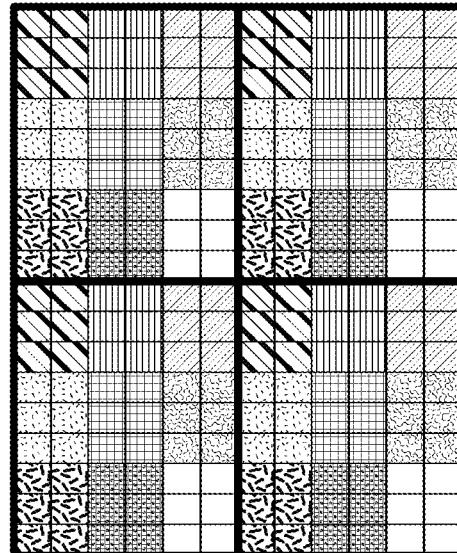
Figure 12:
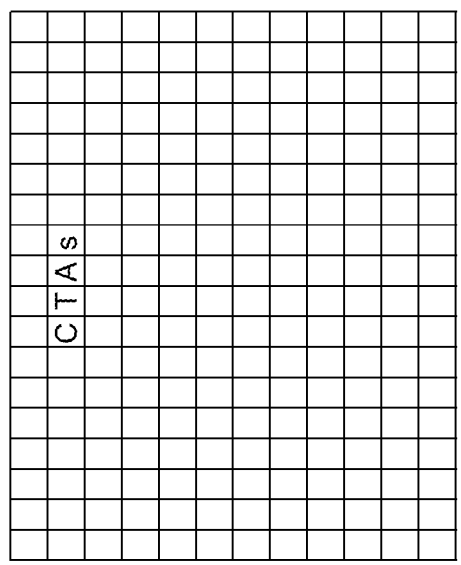
Figure 12:
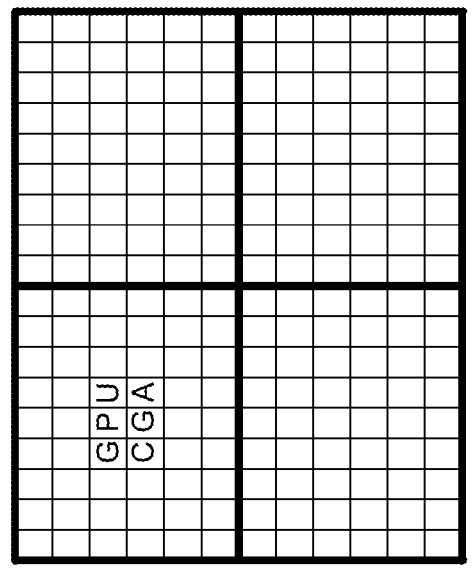
Figure 12A:
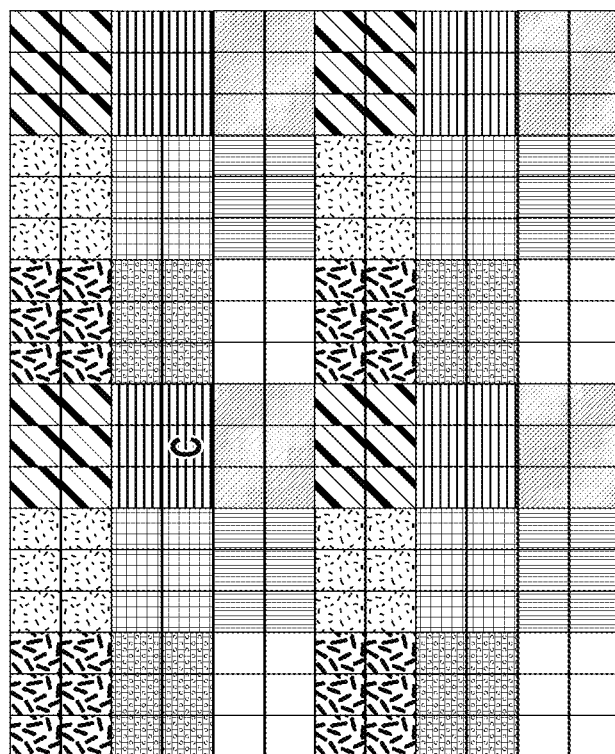

With the addition of CGAs, there are now many more possible Grid types examples of which are shown in FIGS. 12, 12A, with each grid type specifying or otherwise being associated with a particular hardware domain or affinity:

FIG. 12(1): Grid of CTAs ("GRID_CTA")—This is a legacy grid. In an embodiment, this grid represents a three-dimensional grid (X×Y×Z) of CTAs. An example dimension for the grid could for example be 18×12×1 CTAs.

FIG. 12(2): GPC_CGA Grid of CTAs ("GRID_GPC_CGA")—a three-dimensional grid of CTAs for each GPC_CGA are launched together and always placed on the same GPC. Thus, the hardware domain this type of grid specifies is "GPC". The commonly-patterned adjacent squares in the grid constitute CGA that will be scheduled to run at the same time. Thus, the six CTAs marked "G P C C G A" will all be launched together on the same GPC, and none will launch until they can all be launched together. An example grid dimension is 6×6×1 GPC CGAs, with each GPC CGA having dimensions of 3×2×1 CTAs. In one example, a GPC_CGA supports SM-to-SM communication, CGA linear memory in global memory, and a hardware-based CGA barrier.

FIG. 12(3): Grid of GPU_CGAs of CTAs ("GRID_GPU_CGA")—This is a grid where the CTAs for each GPU_CGA are launched together and always placed on the same GPU. Thus, the hardware domain specified by this type of grid is "GPU." In some environments, plural GPUs can be configured as clusters of GPUs; in such case, the FIG. 12(3) grid forces all CTAs of a GPU_CGA to run on a common GPU. This grid is meant as a replacement for CUDA's Cooperative Group API feature, but with coscheduling now guaranteed by hardware. Example grid dimensions are 2×2×1 GPU CGAs, each GPU CGA sub-grid comprising 9×6×1 CTAs.

FIG. 12(4): Grid of GPU_CGAs of GPC_CGAs of CTAs ("GRID_GPU_GPC_CGA")—This is a grid with two levels of CGA hierarchy. The GPU_CGAs have the capabilities described in FIG. 12(3) and the GPC_CGAs have the capabilities described in FIG. 12(2). Thus, this type of grid specifies two nested hardware levels: GPU and GPC. This example for example allows a developer to schedule a GPU CGA to run on a single GPU, and each GPC CGA within that GPU CGA to run on the same GPC within that GPU. Example grid size is 2×2×1 GPU CGAs, each GPU CGA sub-grid comprising 3×3×1 GPC CGAs, each GPC CGA sub-sub-grid comprising 3×2×1 CTAs.

CTA Allocation and Tracking

Example hardware implementations provide a new S2R register in each SM that helps to track CTAs within a CGA (i.e., to allow a CTA to determine which CTA within a CGA it is). For example, a new S2R is used to specify the 1-dimensional CGA_CTA_id within the GPC_CGA (the X,Y,Z coordinates of a CTA may still be numbered in terms of the overall grid, ignoring any CGAs). In one embodiment, the SM implements S2R (Special Register to Register) operations to return a linear CTA ID within CGA. In particular, an additional hardware-based multi-bit identifier called gpc_local_cga_id (the number of bits used may depend on the number of simultaneously active CGAs that are supported) is used to identify the CGA within the namespace of the GPC and to track the number of active CTAs for that CGA. As will be explained below, this same value gpc_local_cga_id is used to index distributed shared local memory. Gpc_local_cga_id may also be used to reference barriers and other inter-CTA communications mechanisms (see below).

The S2R register described above enables the shader software to read the gpc_local_cga_id for this thread. The Gpc_local_cga_id is allocated on every GPC_CGA launch to local GPC, and is broadcast across the relevant hardware domain upon CGA launch. It is tracked during the lifetime of the CGA and will be freed when the last thread group in the CGA completes. In one embodiment, hardware allocates a unique gpc_local_cga_id whenever it sees the first packet of a GPC CGA launch (see below), and then tracks all active GPC CGAs within its local GPC. The hardware recycles the gpc_local_cga_id whenever it receives shared memory flush indications for all the CTAs in the GPC CGA. The hardware maintains a free list or free vector of available gpc_local_cga_id's, and stalls CGA launches if it runs out of gpc_local_cga_id's.

In the example shown in FIG. 12A, the CTA labeled "C" needs to be able to tell (learn) which CTA it is within the six-CTA CGA once assigned by hardware (i.e., each cooperative thread array is now part of an ordered cooperative group array). Knowing the dimensions of the whole grid and the dimensions of the various locality grid hierarchies discussed above, it is possible to convert the coordinates of the CTA within the whole grid to the coordinates of that CTA within its CGA. In example embodiments, each Grid or CGA is defined in term of the next level in the hierarchy using 3 dimensional coordinates. Each CTA exposes its CTA id (X,Y,Z) to software in the shader via hardware registers as discussed above. For GPC_CGAs, the new S2R hardware register may be used to determine or discover the 1-dimensional CGA_CTA_id within the GPC_CGA that is preset by the launch procedures. In one embodiment, this CGA_CTA_id may be used directly for a shared memory index (this is useful when addressing shared memory, since each segment of shared memory may be referenced using its corresponding CGA_CTA_id).

The FIG. 12A example is for CTA #C within a grid containing GPC_CGAs, with the coordinate for the CTA within the whole grid being (7, 3, 0) but the CGA_CTA_id within the GPC_CGA being the one-dimensional coordinate CgaCtaId=4. The programming model based on a 3D coordinate within the whole grid is thus maintained, while providing an additional coordinate for the CTA within its CGA.

Hardware-Based CGA Launch Guarantee

Figure 7:
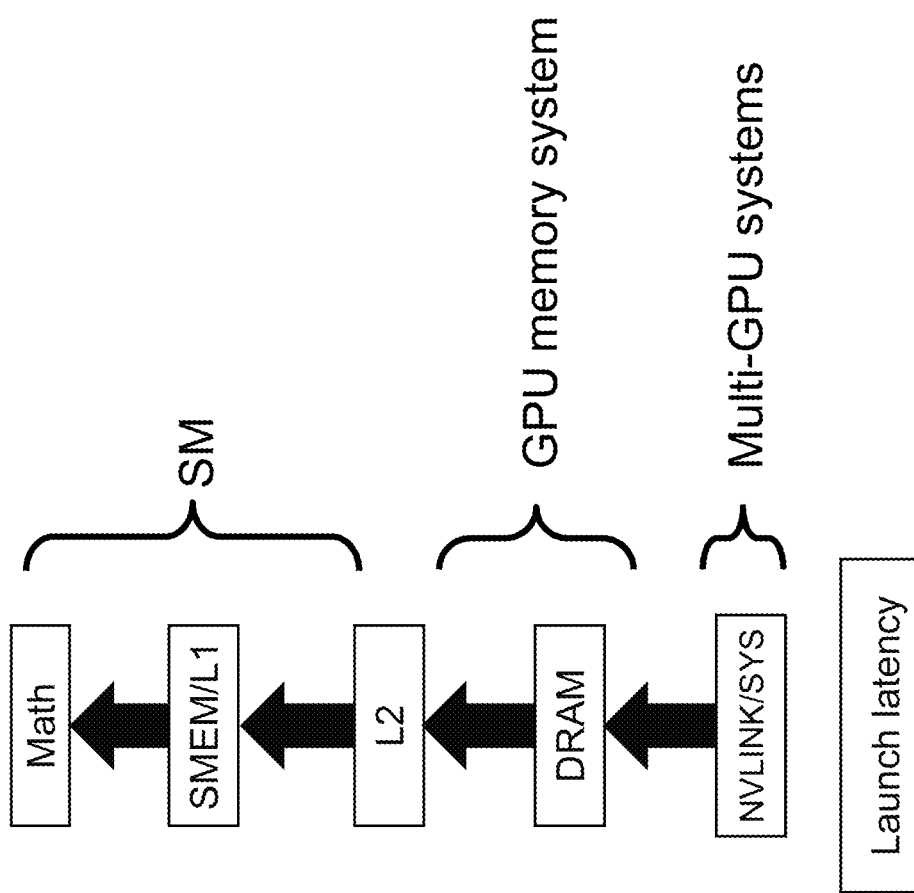
FIG. 7 shows example need to improve speeds & feeds and efficiency across all levels of compute and memory hierarchy to achieve strong scaling.

In an embodiment(s) shown in FIGS. 15A, 15B, 15C-1 & 15C-2, a main compute work distributor ("CWD") hardware circuit 420 is used to launch CGAs on the GPU while providing a hardware-based guarantee that all CTAs of a CGA can be launched at the same time. See for example 20200043123 and in particular FIG. 7 and associated description for more information on an example GPU CWD and MPC for scheduling work. In an embodiment herein, the CWD 420 comprises registers, combinatorial logic and a hardware statement machine. Its functionality is expanded/enhanced to provide a speculative CGA launch capability to confirm that resources are available to launch all CTAs in a CGA. If all CTAs of a CGA cannot be launched at the same time, then the CWD 420 does not launch any of the CTAs of the CGA, but instead waits until sufficient resources of the relevant GPU hardware domain become available so that all CTAs of the CGA can be launched so they run concurrently. In example embodiments, the CWD 420 supports nesting of multiple levels of CGAs (e.g., multiple GPC-CGAs within a GPU-CGA) using a multi-level work distribution architecture to provide CGA launch on associated hardware affinity/domain.

Figure 15A:
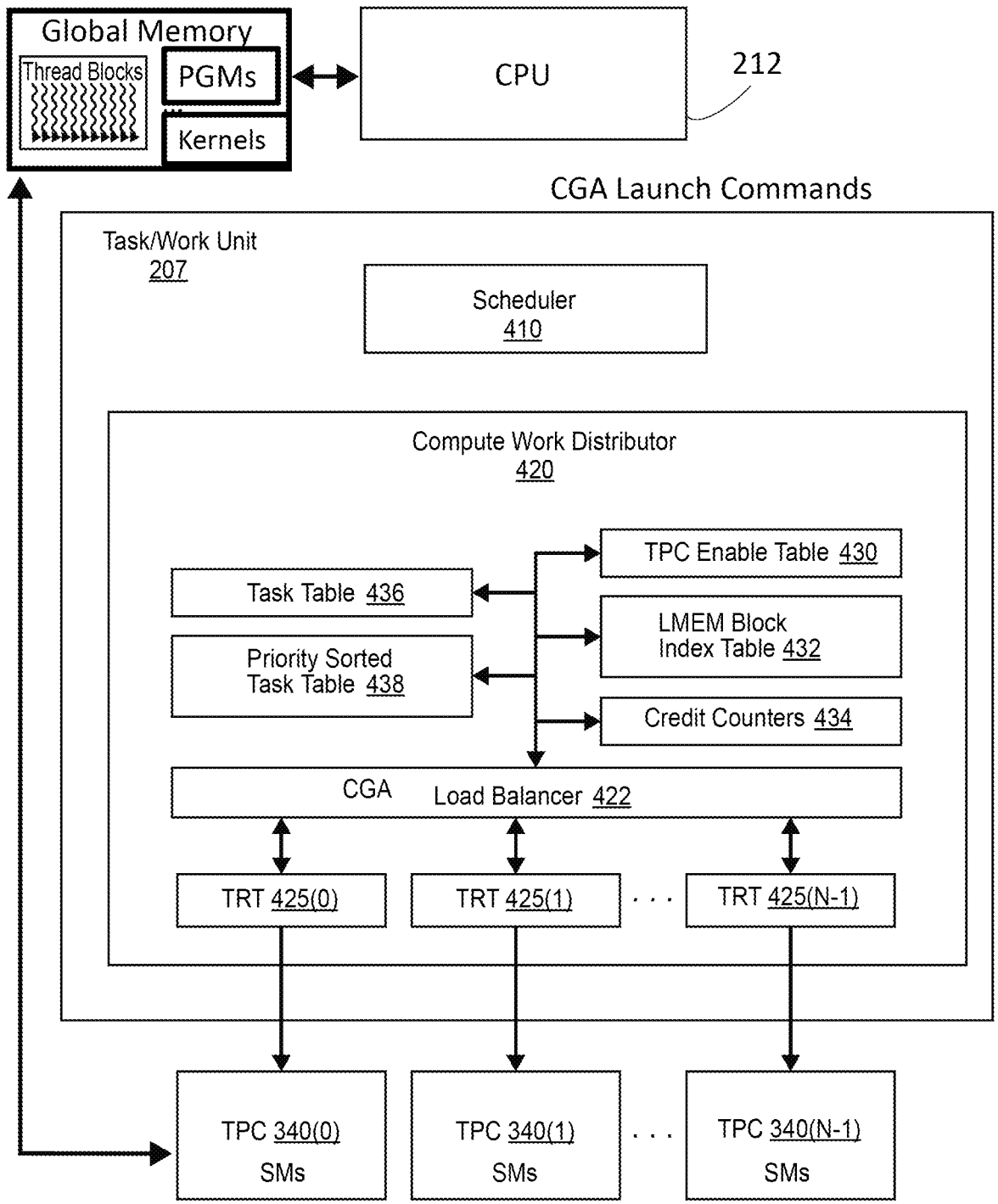
FIG. 15A shows an example compute work distributor circuit block diagram.

In more detail, CWD 420 shown in FIG. 15A launches the CTAs in a CGA after determining, using a speculative execution technique, that all CTAs of the CGA can fit on the hardware resources available in the specified hardware domain. In this way, CWD 420 in one example mode makes sure there are enough resources across all GPCs or other relevant hardware domain for all CTAs of the CGA before launching any. In one embodiment, the algorithm to launch CTAs of a CGA can borrow some techniques from legacy (non CGA) grid launch while first confirming that all CTAs of a CGA can be launched in a way that ensures they will run simultaneously.

FIG. 15A shows the basic architecture of CWD 420, which includes a load balancer 422, resource trackers (TRTs) 425(0), 425(1), . . . 425(N–a1), a TPC enable table 430, a local memory (LMEM) block index table 432, credit counters 434, a task table 436, and a priority-sorted task table 438. Each of the TRTs 425(0), 425(1), . . . 425(N–1) communicates with a corresponding TPC 340(0), 340(1), . . . 340(N–1). For more detail concerning legacy operation of these structures, see e.g., U.S. Pat. No. 10,817,338; US20200043123; US20150178879; and U.S. Pat. No. 10,217,183. In example embodiments, functionality of these and other structures is enhanced in example embodiments along the following lines:

| Function/Operation | Units Enhanced |
| --- | --- |
| Distributed CTA rasterization | M-Pipe Controllers (MPCs) instead of CWD |
| New launch packets for legacy grids/queues and CGAs | Compute Work Distributor (CWD), GPM, MPC, SM |
| Wider Bundles in compute pipe & new QMD format | Compute Pipe, CWD, GPM, MPC, SM |
| Parallel load balancer for CGAs | CWD |
| CTA complete bandwidth improvements | GPM, SMCARB |
| CGA tracking and barriers | CWD, GPM, MPC, SM |
| CGA completions and DSMEM flush | GPM, MPC, SM |
| New S2R registers | SM |
| Error handling for SM2SM traffic | SM |
| New GPC/TPC numbering | CWD, GPM, MPC, SM, CTXSW |
| Compute Instruction Level Preemption changes | MPC, SM, Trap handler |

In one embodiment, CWD 420 receives tasks from a CPU 212 that is cooperating with the GPU for various processes executing on the CPU 212. In example embodiments, each compute task to be performed by the GPU may correspond to a CGA (although non-CGA tasks may also be accommodated). Each process or application executing on the CPU 212 can issues such tasks. For example, the CPU 212 can execute one or more programs stored in non-transitory memory such as global memory to generate CGA launch commands that command the GPU to launch CGA grids.

In operation, CPU 212 executes a driver program (see FIG. 15C-2) that generates "grid launch" (and other) commands for the GPU. The grid launch command has associated state parameters that define a grid of CGAs to be executed by the GPU. In one embodiment, the state parameters include size parameters that specify the number of CGAs in the grid, the number of CTAs in each CGA, and the number of threads in each CTA (see FIG. 15C-2, block 552, 554).

If the thread identifiers are multidimensional (e.g., 2-D, or 3-D), the size of the CTA in each dimension is specified; thus, the size might be specified as n0 for a CTA with 1-D thread IDs or as n0=d0*d1*d2 for a CTA with 3-D thread IDs. Similarly, if the CTA or CGA identifiers are multidimensional, the size of the grid in each dimension is specified. The state parameters also identify the CTA program to be executed by each thread, a source location (e.g., an array) in global memory (see FIG. 15) for input data for the grid and a destination location (e.g., an array) in global memory for output data produced by the grid. See for example U.S. Pat. Nos. 7,937,567; 9,513,975; and 9,928,109 for background on how the CPU can launch grids using for example a thread-oriented programming environment such as the CUDA™ programming environment from NVIDIA™. The CPU 212 also arranges for the threads to be executed by the SMs to be stored e.g., in global memory such that direct memory access hardware of the GPU can retrieve the threads through the system's memory management unit (MMU) for the SMs to execute (see FIG. 15)

Example CGA Launch Command

In example embodiments, a launch command from the CPU 212 to CWD 420 may specify a CGA grid, which includes an enumeration of the various dimensions of the composite thread blocks and CGAs. As one example, a CGA grid launch command could specify to run 10240 CGAs, where each CGA is 8 CTAs, where each CTA has 256 threads, where each thread has (needs) 64 registers, and where each CTA allocates 128 KB of shared memory, etc. These numbers are encoded into a launch command like {10240, 8, 256, 64, 128}, and that is the information which the hardware work distributor CWD 420 processes when launching threads or CTAs on SMs. The CPU 212 sends such launch commands to a scheduler 410 within the GPU (FIG. 15C-2, block 558). In another embodiment, the SMs can issue these commands to CWD 420, i.e., tasks described as being performed by CPU 212 can also be done by the SMs.

Using the above technique, the application program can launch many small CGAs in a GPC or other hardware partition but the number diminishes as the size of the CGA grows. At a certain point (depending on the hardware platform), no CGA can fit in the GPC or other hardware partition anymore, which may compromise code portability. If one assumes that every platform has at least one GPC with 4 TPCs, the maximum CGA size that guarantees compatibility across future architectures is 8 CTAs. A given application program could dynamically adjust CGA size based on querying the platform to determine the number of CGAs that can run concurrently in the GPU as a function of 1) CTA resource requirements and 2) number of CTAs per CGA.

GPU CGA Scheduling & Launch

In example embodiments, a scheduler 410 within the GPU receives tasks from the CPU 212 and sends them to the CWD 420 (FIG. 15C-1, blocks 502, 504). The CWD 420 queries and launches CTAs from multiple CGAs. In one embodiment, it works on one CGA at a time. For each CGA, CWD 420 speculatively launches all of the CTAs in the CGA, incrementing the "launch" registers to store the speculative launch. If all free slots in SMs or other processors in the hardware domain are exhausted before all CTAs of the CGA are speculatively launched, the CWD 420 terminates the launch and may try again later. If, in contrast, there are sufficient free slots for all CTAs in the CGA, the CWD 420 generates sm_masks from the "launch" registers accumulated in the speculative launch process (this sm_masks data structure stores reservation information for the number of CTAs to be run on each SM in the relevant hardware domain for the CGA launch), and moves on to a next CGA. The hardware allocates a CGA sequential number and attaches it to each sm_mask. It also attaches an end_of CGA bit to the last one to prevent interleaving of sm_masks from different CGAs.

Example CGA Launch Packet

Based on a successful speculative launch, CWD 420 sends launch packets such as the following to the GPCs (SMs). Such launch packets may for example include the following fields:

| | |
|---|---|
| cwd2pdb_grid_cga_launch_sm_mask | // launch GPC CGA CTAs |
| task_id | // task identifier |
| vgpc_id | // virtual GPC ID, which may be based on the number of non-floorswept TPCs that exist per GPC |
| sm_mask | // bitmask of SMs; each bit signifies a CTA launch to a corresponding SM; also includes a GPU CGA sequential number as discussed above |
| sm_mask1, sm_mask2. . . . | // further SM bitmask(s) if more than one CTA of the specified CGA is assigned to run on the same SM |
| num_ctas | // # of 1's in sm_mask i.e. CTAs first least significant bit with "1" in sm_mask corresponds to first CTA of GPC CGA and most significant bit with "1" in sm_mask corresponds to last CTA of GPC CGA |
| last_gpu_cga | // last packet of GPU CGA |

CWD 420 may provide multiple iterative waves of sm_masks to map all CTAs in the CGA to SMs such that the CGA can launch. Once the SM masks are ready, the above launch packet is used to broadcast them (with the associated CGA ID) to all SM work schedulers of the GPU. In one embodiment, the CPU 212 attaches a GPU CGA sequential number to the launch command it sends to the GPU. This sequential number is prepended to the sm_masks generated for each GPC CGA and is used to map an sm_mask of every GPC CGA to the GPU CGA (it may also be used by any reorder unit before sending masks to the M-Pipe Controllers (MPCs) within individual SMs).

Broadcasting the launch packets to all SMs allows all MPCs within SMs to observe the entire sequence of CGA/CTA launches. By observing the stream of CGAs and CTAs, every SM's MPC (to which the grid is currently assigned) is able to carry out rasterization redundantly and independently. Also broadcast are lmem_blk_idx packets which carry lmem_blk_idx (see LMEM block index table 432 of FIG. 15A) from CWD 420 to the SMs.

Multi-Level Unified Work Distributor

Figure 15B:
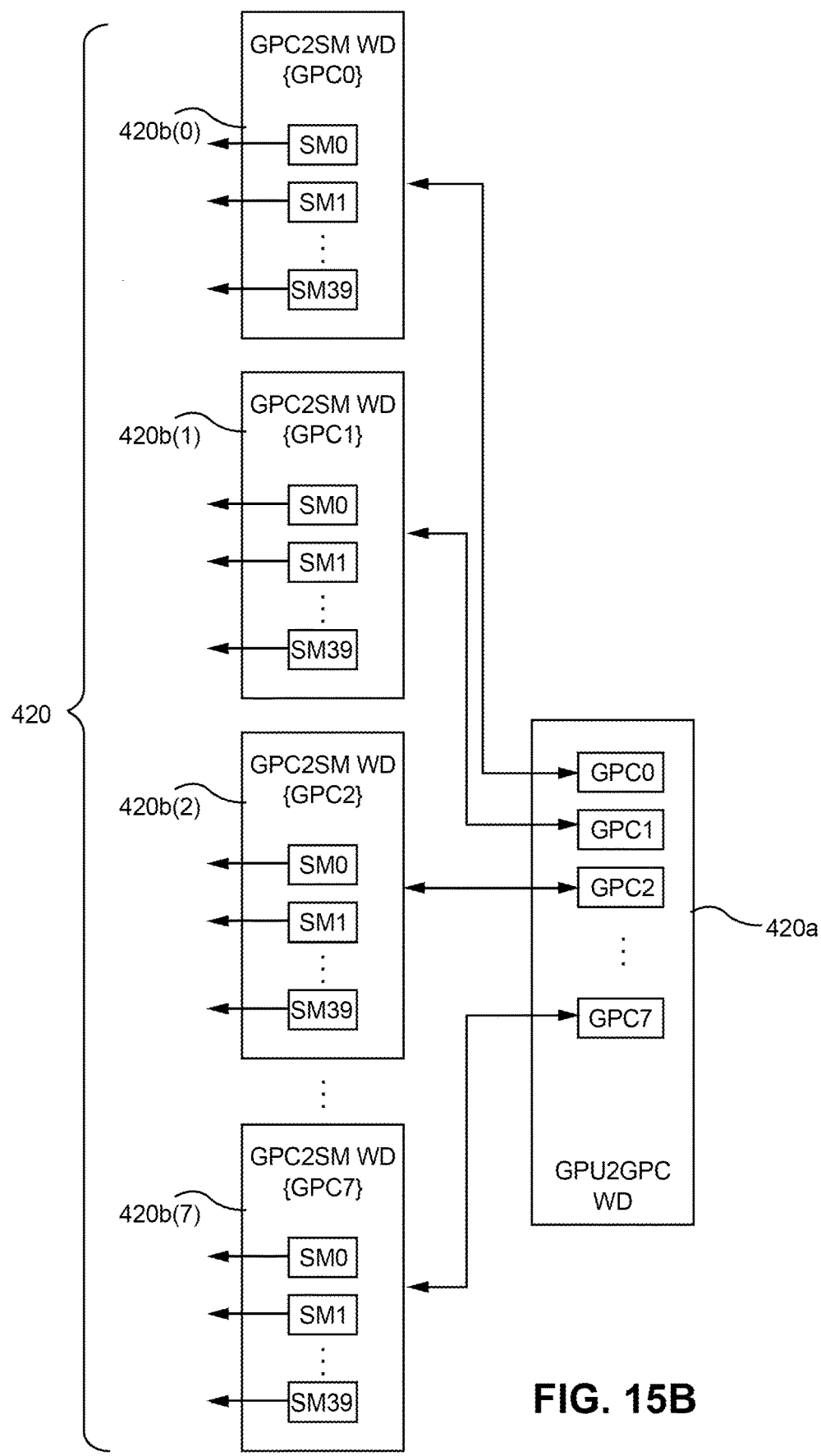
FIG. 15B shows hardware work distributors used to distribute CTAs to SMs within a specified hardware partition.
Figures 1, 15C:
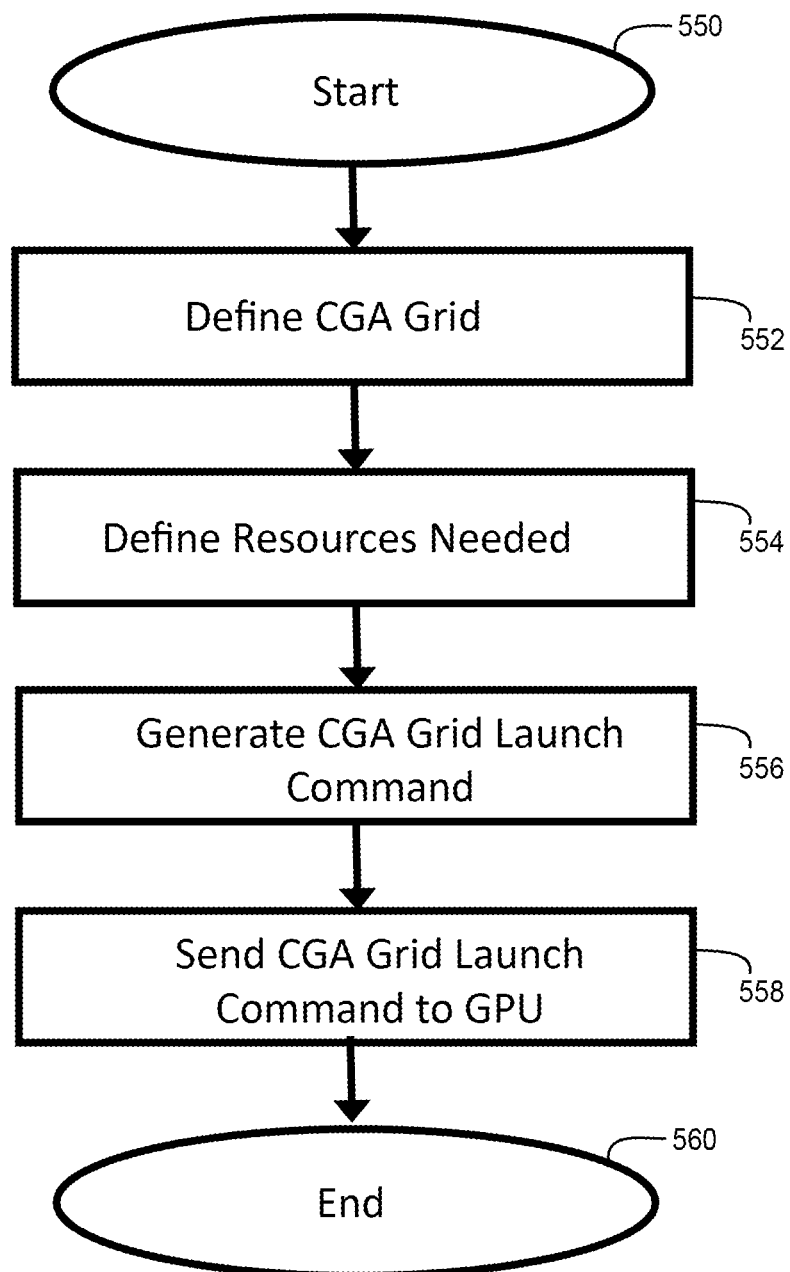
FIG. 15C-1 shows an example non-limiting flowchart of operational steps performed by a CPU to generate a CGA launch command and send the launch command to the GPU.
Figures 2, 15C:
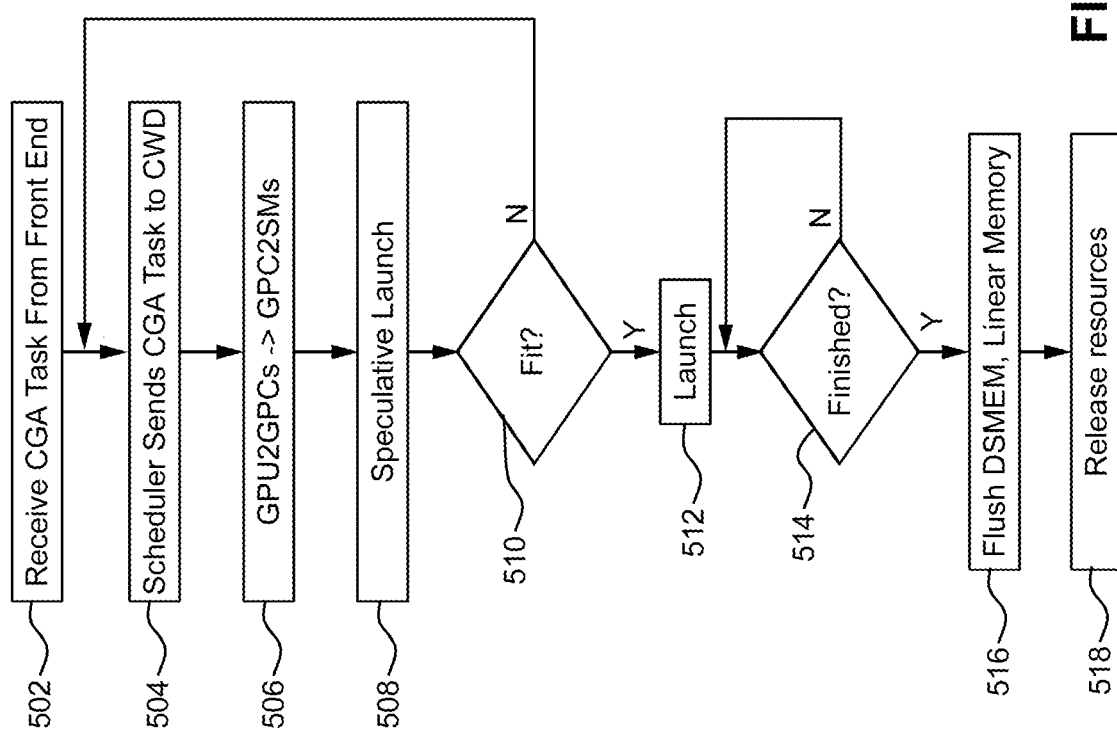

FIG. 15B shows that in one embodiment, the CWD 420 comprises several levels of work distributors (WDs) to distribute CGA work. For example in the case of GPU CGAs made up of GPC CGAs, CWD 420 may implement two levels of work distributors:
- a GPU2GPC work distributor 420*a*
- a plurality of GPC2SM work distributors 420*b*(0), 420*b*(1), 420*b*(2), . . . .

The first level 420*a* distributes GPC CGAs across GPCs. The second level (GPC-to-SM work distributors 420*b*) distributes CTAs to SMs within the GPCs.

Another level that precedes or is higher than the GPU-to-GPC level may be used to distribute μGPU CGAs to μGPUs (in one embodiment when there is μGPU, a GPU is made up of μGPUs, μGPUs are made up of GPCs, and GPCs are made up of TPCs or SMs). In particular, the GPU2GPC WD 420*a* distributes the potentially numerous (1 or more) constituent GPC CGAs of a GPU CGA to corresponding GPC2SM work distributors (FIG. 15C-2, block 506). The GPC2SM work distributors 420*b* each distribute the CTAs of a GPC CGAs to SMs within the GPC (using for example a load balance mode or multi-cast mode, as described below). The unified work distributor (UWD) 420*a*/420*b* of FIG. 15B guarantees that all GPC CGAs in a GPU CGA can be launched together and that all CTAs in each GPC CGAs can be launched together.

In other embodiments supporting deeper nesting of CGAs, this UWD can be expanded to any number of levels needed. In more detail, the CWD 420 in one embodiment may include or activate a hierarchical three-level unified work distributor (UWD) for CGA grids that require such functionality:
- The GPU2SM Work Distributor (GPU2SM WD) handles CTAs and GPU CGAs made up of CTAs.
- The GPU2GPC Work Distributor (GPU2GPC WD) orchestrates the load balancing of GPC CGAs and GPU CGAs made up of GPC CGAs. It talks to the lowest level of work distributor—GPC2SM WD
- The GPC2SM Work Distributor (GPC2SM WD) handles the actual load balancing for GPC CGAs. There are N GPC2SM WDs in the UWD, one for each virtual GPC in the GPU.

The UWD in one embodiment is thus aware of the GPC/TPC hierarchy in order to facilitate the spatial affinity of CGAs (e.g. all CTAs from a GPC CGA are to be launched on the same GPC). However in one embodiment, the UWD does not perform rasterization of CTA grid coordinates; rather, this function (which in previous implementations of some GPUs was performed by CWD) is moved to the SMs (and in particular, to the MPCs within the SM) as synchronized by a state synchronization operation.

Example CWD 420 Speculative Launch Process

In an embodiment, the UWD 420*a*, 420*b* performs the following processes in response to receipt of a CGA launch command from CPU 212:

I. Speculative Launch of a CGA (FIG. 15C-2, block 508)
Phase 1:

The first step is a state snapshot: read the remaining number of GPU CGAs from task table 436 (FIG. 15A), and clamp it based on remaining_GPU_CGAs. A load balance session can be limited to one GPU_GPC_CGA at a time.
Phase 2:

For a GPC CGA, the CWD 420 performs a query+launch process until there are no more remaining GPC CGAs, where "query" constitutes a speculative launch and "launch" constitutes the actual launch. In one embodiment, the "query" is completed for all CTAs in the CGA structure before any CTAs are launched. For example, in the case of a GPU CGA with multiple GPC CGAs, the CWD 420 will launch the GPU CGA only if all of its constituent GPC CGAs are guaranteed to receive free slots across the GPU. In order to ascertain that, each constituent GPC CGA (of the GPU CGA) is speculatively launched and checked (but not actually launched to SMs) before any CTA is launched.

In one embodiment, each GPU CGA may be processed in two passes: speculative launch and actual launch.
Speculative CGA Launch Pass I: Speculative Launch to "Check if all constituent GPC CGAs will find a home"

Say the number of GPC CGAs in a GPU CGA is "N". To ascertain the above, the CWD 420 speculatively launches N GPC CGAs.

Referring to FIG. 15B, GPU2GPC WD 420*a* sends query commands to all GPC2SM WDs 420*b*. Each individual GPC2SM performs speculative scheduling for all CTAs of a GPC CGA assigned to it and generates a speedy and valid response for the query. In an example embodiment, the speculative launch test will be repeated for each GPC CGA within a GPU CGA, each GPC2SM includes a free slot register and a launch slot register per SM to store its prior responses. In implementations that have a single free slot and launch slot register per SM, the free slot value per SM used in an iteration after the first speculative scheduling of a GPC CGA may be "free slot value"–"current launch slot value" to account for already speculatively scheduled CGAs.

GPU2GPC WD collects the responses from the GPC2SM WDs, counts the number of "valids" and accumulates to a counter. This completes a first query iteration. The GPU2GPC WD continues to query all GPC2SM WDs again until the counter reaches the number of GPC CGAs per GPU CGA. If the GPU2GPC WD fails to collect enough "valids", the GPU2GPC WD will terminate the session because there are not enough free slots to guarantee all CTAs in all GPC CGAs in the GPU CGA can be launched together (FIG. 15C-2, "no" exit to decision block 510).

In some embodiments, different GPCs can have different numbers of SMs. In one embodiment, CWD 420 may also implement a counter per GPC to track the number of GPC CGAs that can simultaneously execute on a given GPC. Each counter is initialized based on the number of SMs in a corresponding GPC (e.g., for a given chip number). CWD 420 decrements the appropriate GPC counter whenever a new GPC CGA is launched, and increments the appropriate counter whenever a cga_complete packet arrives from a given GPC.

Example CGA Load Balancing

In example embodiments, CWD 420 may distribute CTAs in a GPC_CGA to SMs/cores within GPCs using different hardware-based modes such as:

LOAD_BALANCING—CTAs are sent to the least loaded SMs/cores within a GPC or other hardware domain. This mode allows the CWD 420 to place the CTAs anywhere within the GPC or other relevant hardware domain. For example, this may result in more than one CTA (or even all CTAs for small CTAs) from the same CGA running on the same SM.

MULTI_CAST—the hardware-based scheduler distributes CTAs across SMs/cores within a GPC or other relevant hardware domain with at most one CTA per SM from the same CGA. This mode guarantees that each CTA will run on a different SM—meaning that all the interconnections and resources provided by those plural SMs can be brought to bear on executing the CGA. CTAs are scheduled first onto partitions where both (all) SMs/cores can take a CTA, then onto partitions with only one (less than all) SM(s) available.

MULTI_CAST mode guarantees CTAs are well distributed across SMs/cores (rather than allowing multiple CTAs on the same SM) which provides the maximum interconnect resources for the CGA. MULTI_CAST mode may be used on GPC_CGAs that want to take advantage of the new multicast hardware in the SM and generic network interface controller (GNIC), for example the Tensor Memory Access Unit (TMA) as described in above-identified U.S. patent application Ser. No. 17/691,276 filed Mar. 10, 2022 entitled "Method And Apparatus For Efficient Access To Multidimensional Data Structures And/Or Other Large Data Blocks" (20-SC-0403US01; 6610-91).

More information about these LOAD_BALANCING and MULTI_CAST approaches may be found in above-identified U.S. patent application Ser. No. 17/691,288 filed Mar. 10, 2022 entitled "Programmatically Controlled Data Multicasting Across Multiple Compute Engines" (20-SC-0612US01; 6610-97); and above-identified U.S. patent application Ser. No. 17/691,872 filed Mar. 10, 2022 entitled "Techniques for Scalable Load Balancing of Thread Groups in a Processor" (21-SC-0064; 6610-104).

Actual CGA Launch

Pass II: "Reset. Then, Query+Launch"—Actual Launch of the CGA (FIG. 15C-2, block 512)

If Pass 1 (speculative launch) succeeds, guaranteeing enough free resources for the entire GPU CGA, the CWD 420 begins Pass 2=> which is the actual launch. This involves:

resetting all GPC2SM WDs' launch slot registers;
allocating a GPU CGA sequential number (for reordering);
launching the constituent GPC CGAs (of the GPU CGA) one by one; and
repeat "query" and "launch" for each of the GPC2SM WDs to launch the CTAs in each GPC CGA on the SMs.

Allocating CGA Memory Slots in Linear Memory

In example embodiments, the CWD 420 is also responsible for allocating CGA memory slots in a linear memory pool (see below) and flushing and recycling slots. Assuming CWD determines there are enough resources and phase 2 above is completed or is proceeding, CWD 420 passes information to GPM function circuit blocks which reside within the GPCs. Each GPM allocates a barrier slot, and also allocates the CGA_id and tracks when all CTAs in a GPC CGA complete. The MPC (M-Pipe Controller) circuit within each SM meanwhile tracks slots per CTA, and participates in launching the CTA onto its associated SM to actually do the work. When the work is done, the SM reports CTA complete status to GPM. When the GPM circuit receives status information that all the CTAs in the CGA have completed (FIG. 15C-2, block 514) and all memory allocations to the CGA have been flushed (FIG. 15C-2, block 516), the GPM circuit can signal the CWD 420 to free the CGA memory slot in the pool so it can be allocated to another CGA (FIG. 15C-2, block 518).

CGA Shared Memory

In example embodiments, new support and provisions are made to enable sharing of memory allocations between CTAs of a CGA. Now that CTAs of a CGA can run on different SMs, example embodiments provide hardware support for sharing memory across SMs—and thus across CGAs.

Embodiments provide different types of such shared memory such as:

Distributed shared memory (DSMEM)

Linear shared global memory.

Such shared memory is in addition to and/or improves upon memory within and/or local to an SM that is shared between the threads of a CTA running on the SM.

For example, in example embodiments, each CTA in a GPC_CGA may reference shared memory (e.g., in L1 cache) for all other CTAs that are part of its CGA—even those executing on different SMs. The hardware also supports direct SM-to-SM communication for loads/stores/atomics within the shared memory of the entire GPC_CGA.

Figure 16A:
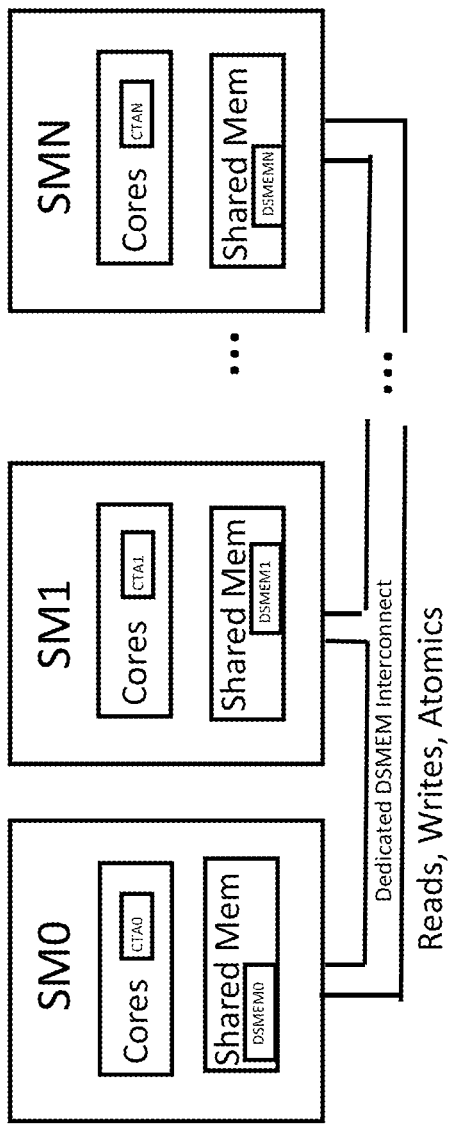
FIG. 16A shows example distributed shared memory allocations.
Figure 16B:
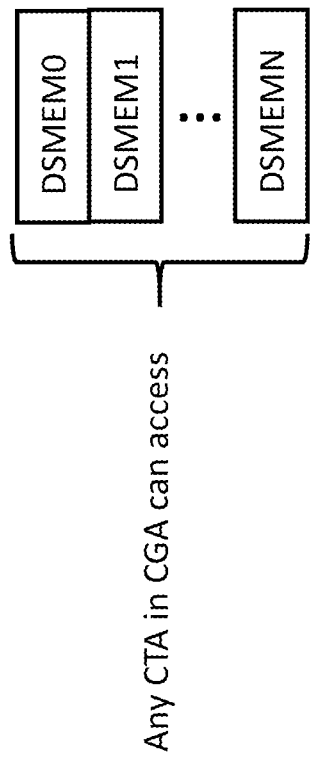
FIG. 16B shows example distributed shared memory access.

As described in detail below and as shown in FIGS. 16A & 16B, distributed shared memory DSMEM is made up of at least a portion of memory local to/within each SM, and hardware interconnections and other functionality that allow SMs to access each others' local memory. This DSMEM enables each CTA to expose its part of memory as a contiguous segment with holes in the address space between the segments for each CTA. Such shared memory provides increased ability to exploit data localization and data re-use. To reduce data exchange latency, example technology herein also provides faster data exchanges via the CGA shared memory. Such data exchanges are many times faster than data exchange via global memory, based on improved hardware based synchronization. See e.g., above-identified U.S. patent application Ser. No. 17/691,296 filed Mar. 10, 2022 entitled "Hardware Accelerated Synchronization With Asynchronous Transaction Support" (20-SH-0601US01; 6610-98).

CTAs within a CGA may also exchange through global memory based on conventional protocols (e.g., the producer stores the data to global memory then executes a MEM-BAR.GPU command to make the memory location visible across the GPU or other hardware partition, and sets a write flag; the consumer polls on the flag, invalidates its own L1 cache values and loads the data from global memory). In example embodiments, hardware improvements support a linear shared global memory that all CTAs within a CGA may also share.

Figures 17A, 17B:
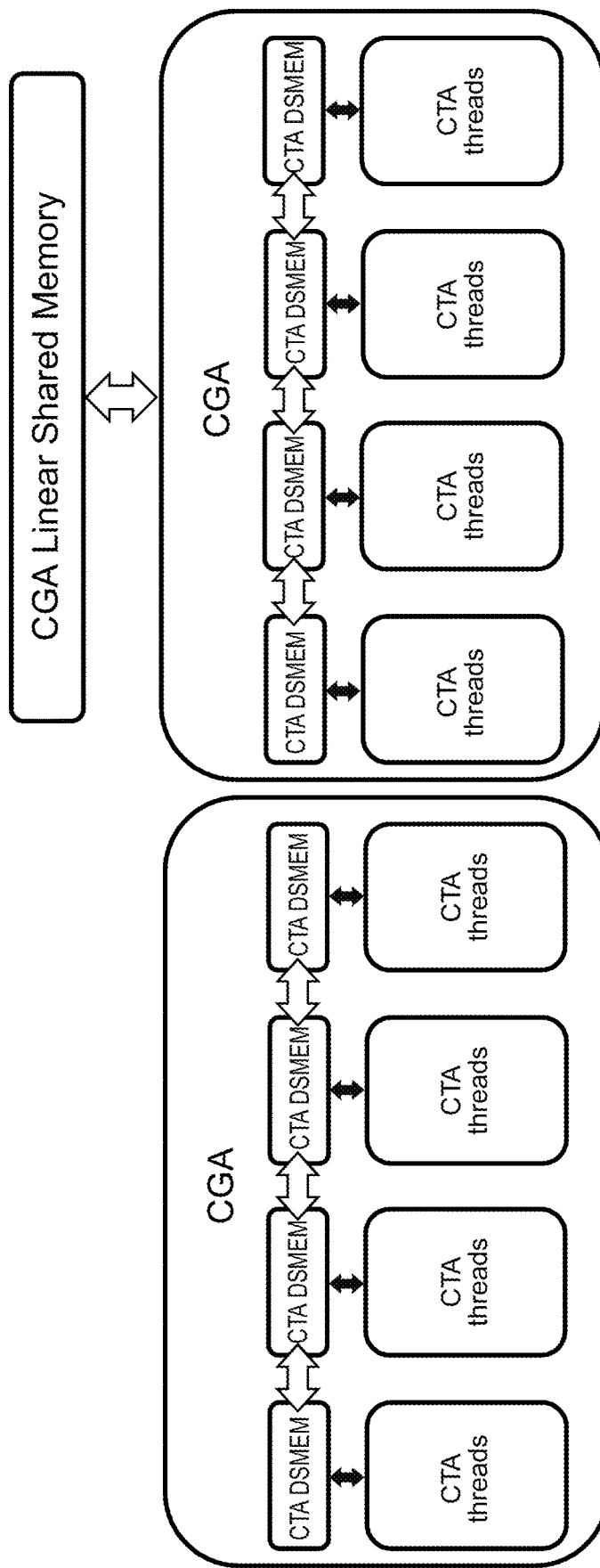
FIGS. 17A, 17B, 17C show example memory shared between CTAs of a CGA.

FIGS. 17A and 17B illustrate example CGA scenarios in which a CGA executes on any number of (in this case four or more) SMs. In example embodiments, all CTA threads within a CGA may reference two different types of commonly-accessible shared memory: distributed shared memory (DSMEM) and CGA linear shared memory. For DSMEM, hardware support in the GPU allows the different CTAs in a CGA to read and write each other's shared memory. Thus, load, store and atomic memory accesses by a first CTA can target shared memory of a second CTA, where the first and second CTAs are within the same CGA.

CTA Linear Shared Memory

In example embodiments, the CTAs in a GPC_CGA may also or alternatively allocate memory from a common data pool in global memory. In some embodiments, this data pool is completely under software control with certain strategic hardware support (e.g., memory slot allocation with throttling). The pool can be sized so that memory requested by all the executing GPC_CGAs always fits in near memory such as an L2 cache for decreased latency, or it can be sized to provide much larger shared memory structure than could ever fit in an L1 or L2 cache. As shown in FIG. 17B, such a common "CGA linear shared memory" data pool may be used for data that has no additional hierarchy or does not fit in other types of CGA shared memory. Such CGA linear shared memory is allocated to a CGA and is equally accessible by all threads of the CTAs in the CGA to provide uniform access shared memory, thereby simplifying the programming model.

In one embodiment, this CGA linear shared memory is linearly addressed. Because the CGA linear shared memory is in global memory, it may be based on (cached) DRAM in a particular hardware domain the CGA specifies, with hardware assisting in allocating a "CGA memory slot" of such linear shared global memory to each CGA provided at CGA launch. The CGA linear shared memory offers ease of programming by providing across-CGA memory that is similar in context to CTA shared memory accessible by all threads within a CTA offered by previous GPU generations. The memory pool may be allocated for a context (different contexts may use different pools) and software may control such parameters as organization, total size, size per CGA, sharing across CGAs, etc.

Figure 17C:
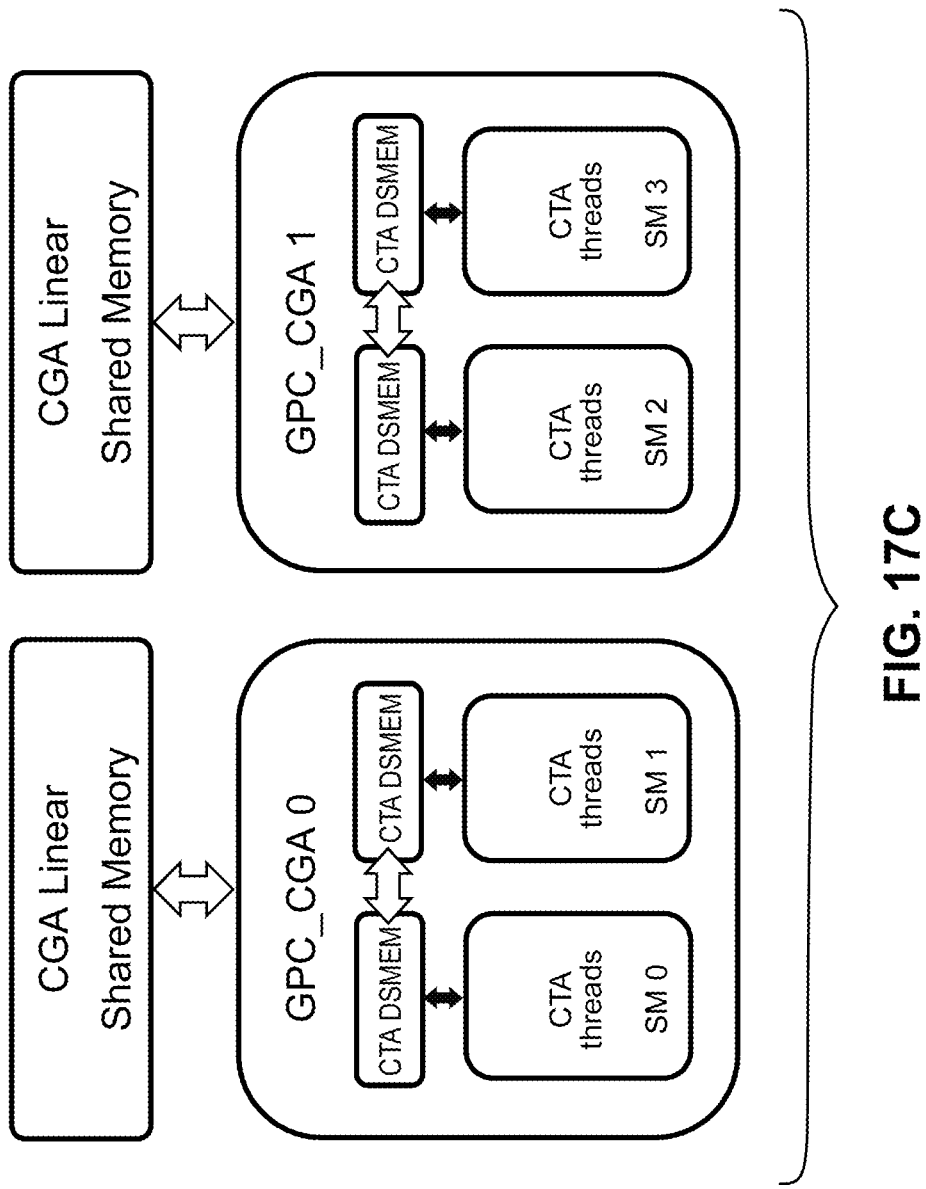

FIG. 17C illustrates example new GPC_CGA capabilities providing linear shared global memory that is partitioned based on hardware domain specified by CGA and also provides CTA DSMEM that is shared across a CGA. In this case, each of the two GPC_CGAs shown is made up CTAs executing on two SMs. Thus, a first GPC_CGA(0) executes on a GPC comprising SM0, SM1; and a second GPC_CGA (1) executes on a further GPC comprising SM2, SM3. Within each GPC, all CTA threads may also reference the CGA linear shared global memory and the DSMEM. However, the first GPC_CGA cannot see the second GPC_CGA's CGA linear shared global memory or DSMEM and vice versa. Those resources are visible to only one GPC_CGA at a time. This example thus illustrates that in some non-limiting examples, the hardware resources can provide CGA linear shared global memory and DSMEM across the particular hardware domain the CGA specifies, but does not permit sharing outside of that particular hardware domain. Thus, the hardware supports shared memory that shares data across all thread groups of a CGA but does not share data to additional thread groups that are not part of the CGA. Such sharing arrangements and associated limitations can be useful for example in multi-user contexts where different users or different applications run on different GPU hardware partitions.

Linear Shared Global Memory Allocation and Control

An example linear shared global memory implementation is based on having a global CGA_linear_memory_slot index which is allocated and recycled by hardware. See FIGS. 13 & 14A. Most of the memory management may then be done by software based on the unique CGA_linear_memory_slot supplied to each running CGA that requires CGA linear shared global memory. The linear shared global memory may be regular global memory that can be cached in the L2 cache and backed by physical addresses in DRAM such that no special logic is required in the memory management unit (MMU) or the L2 cache.

Figure 14A:
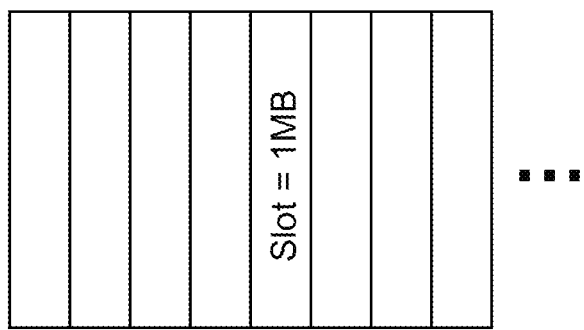
FIG. 14A shows an example CGA shared linear memory pool with slots.
Figure 14B:
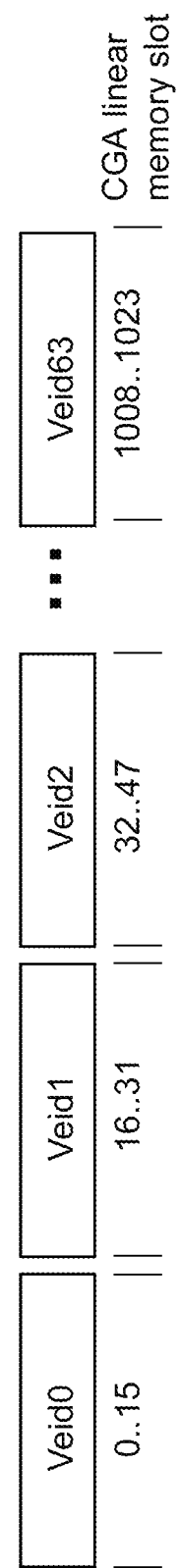
FIG. 14B shows how software can divide up the linear shared memory pool for allocation to CGAs.

In one example embodiment, the hardware provides a unique global CGA linear memory slot index per GPC-sized CGA identifying which of the buffers in the pool the CGA is using, and uses this slot index to prevent CGA launch until a memory slot is available in the range the grid specifies. In such implementations, the hardware-provided CGA_linear_memory_slot index is unique across all running CGAs. This allows different grids from different virtual engines (which may compete for resources) to run on the hardware at the same time, as shown in FIG. 14B. CGAs specifying the same range as other CGAs can thus prevent those other CGA from launching due in one embodiment to the number of slot indices being limited.

Furthermore, the API may be expanded to include the following related parameters:
  CgaLinearSlotLowerLimit
  CgaLinearSlotUpperLimit
  CgaLinearSlotLimitEnable (flag).

The CGA_linear_memory_slot index is in the range of CgaLinearMemorySlotLimitLower to CgaLinearMemorySlotLimitUpper, where both values are configured by software at Grid launch. Hardware thus provides an allocator that guarantees the CGA_linear_memory_slot is in the range CgaLinearMemorySlotLimitLower to CgaLinearMemorySlotLimitUpper. As mentioned above, hardware prevents the launch of GPC CGAs that cannot allocate a CGA_linear_memory_slot in the required range. Such runtime throttling prevents the CGA from launching if no slot is available in the required range. In example embodiments, such hardware throttling is used to minimize the total memory footprint.

As discussed above, the hardware may expose the CGA slot via an S2R register to the shader code so that software can set up whatever slot partitioning the developer desires. In one embodiment, hardware tracks only the CGA memory slot number and leaves other allocation control to software, thus providing flexibility.

The virtual address of the CGA linear shared memory buffer in one embodiment is called the CGA_linear_mem_base. The buffer size in bytes (S) is called the CGA_linear_mem_size. These values are both used by the shader code to calculate the virtual address of its shared memory region when executing. These values may be passed to the shader using constants, or compiled directly into the shader code. Here is an example equation the shader code could implement:
Linear_mem_base_for_this_CGA=CGA_linear_mem_base+(CGA_linear_memory_size*CGA_slot).

Software is expected to allocate a buffer in video (global) memory per any arbitrary group of grids to serve as the CGA linear shared memory region for a given context. Conceptually this buffer is broken into N equal sized segments of S bytes as FIG. 14A shows. Each CGA that executes is given access to one of the N segments based on its CGA_Jinear_memory_slot. S may be set based on the size of the shared memory a GPC-sized CGA needs, and N may be set based on the number of GPC-sized CGAs that are allowed to concurrently execute on the hardware domain. The total buffer size would then be N*S bytes. As mentioned above, software can have multiple pools per context Assume that to run, each CGA in one example requires a 1-MB buffer in CGA linear memory. If the grid has 10,000 CGAs, then to run the entire grid would require 10,000 1-MB buffers. However, most platforms will not be able to run 10,000 CGAs all at the same time. Example embodiments take advantage of this to reduce memory footprint, by providing a pool of CGA linear shared memory, and having the CGAs declare how many can run at the same time. For example, if the CGAs in the grid declare that a maximum of N CGAs (N<10,000) can run on the platform at the same time, then a maximum of only N 1-MB buffers (not 10,000) need to be allocated. The hardware throttling tracks how many buffers have been allocated, and prevents the N+1 CGA from launching until a previously-launched CGA completes and frees its allocated buffer. In this way, software can limit the total number of CGAs that can execute concurrently and thereby limit the size of the overall shared memory buffer.

Distributed Shared Memory

Aspects of the technology herein also relate to hardware-based support mechanisms that enable CTAs that are concurrently running on SMs to read from, write to, and do atomic accesses to memory allocated to other CTAs running on other SMs within the same relevant hardware domain—such as within the same GPC. Programmatic multicast techniques as described in above-identified U.S. patent application Ser. No. 17/691,288 filed Mar. 10, 2022 entitled Programmatically Controlled Data Multicasting Across Multiple Compute Engines (20-SC-0612US01; 6610-97) and improvements into communications between SMs as described in above-identified U.S. patent application Ser. No. 17/691,303 filed Mar. 10, 2022 entitled Fast Data Synchronization In Processors And Memory (20-WE-0607US01; 6610-99) may be supported by the same or similar hardware-based support mechanisms, but the DSMEM capability is separate, distinct, and highly advantageous.

In addition, since it is not necessary that all CTAs launch on the same cycle, one embodiment of the present technology uses improved barrier techniques implemented by GPM (a component of GPC) as described for example in U.S. patent application Ser. No. 17/691,296 filed Mar. 10, 2022 entitled Hardware Accelerated Synchronization With Asynchronous Transaction Support (20-SH-0601US01; 6610-98). In particular, the CGA hierarchy and associated hardware support guarantees that all CTAs of a CGA will run concurrently but does not necessarily guarantee they will all launch at precisely the same instant or complete at precisely the same instant. A CGA BAR capability is used in some embodiments to ensure that all CTAs in a CGA are ready for inter-SM communication. Such a hardware barrier or other mechanism can be used by CTAs that need to interact with other CTAs to ensure those other CTAs are in fact all present and/or upon completion and/or upon preemption.

Example embodiments further provide ISA improvements that permit threads running on one SM to access shared distributed memory within or associated with a different SM. Such ISA improvements may for example comprise load (LD), store (ST) and "atomics" (ATOM) that are designed to access generic memory and in one embodiment use improved hardware to access DSMEM shared memory addresses. Previous CUDA versions supported shared memory operations by using special shared memory instructions such as LDS, STS and ATOMS that allowed threads executing on an SM to access memory of that SM that was allocated to be shared between threads executing on the SM. In one embodiment, such prior instructions are still valid but remain limited to accessing SMEM and not DSMEM (although they could be augmented to access DSMEM if desired). Meanwhile, the load, store and atom memory access instructions (as well as other instructions such as the TMA instruction and the SYNC instruction) are in one embodiment used to access generic memory space into which is mapped memory local to each of plural SMs—thus enabling distributed shared local memory wherein each of plural SMs can access the local memory of the other SM(s) on an atomic level (essentially as if the other SM's memory were local to the SM performing the shared memory access.

Figure 18:
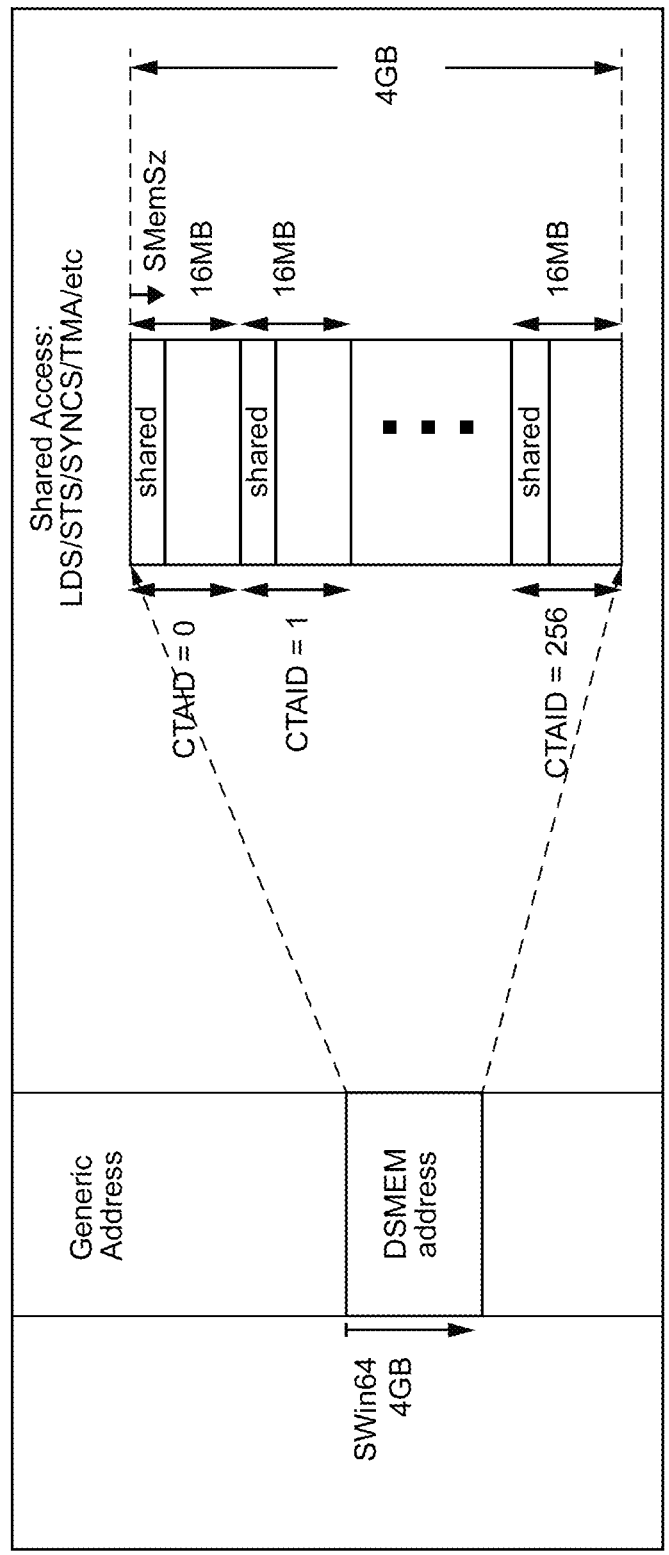
FIG. 18 shows an example global memory map including distributed shared memory.

Example Overall Memory Map of "Generic" Memory Including Private, Shared & Global Memory FIG. 18 is a memory map of "generic" memory of one example embodiment. This memory map in one embodiment defines the memory address space of an SM and includes both virtual and physical addresses. In this example, the generic memory map thus defines a "generic" memory address space that includes global memory (including the CGA shared linear memory described above) and has a window into which local (DSMEM) memory is mapped. Some of this local memory is private to an SM or to a task running on an SM, but other local memory in embodiments herein is shared or shareable with other tasks running on other SMs—namely other CTAs within the same CGA.

In one embodiment, most of generic address space that is not shared memory is mapped to global memory. Such generic address space is thus made up of global memory and DSMEM in one embodiment. Other embodiments may include other special regions for other memory spaces such as thread-private stack memory for example. In this example, global memory is DRAM that is backed by an L2 cache. This global memory is thus the "main memory" of the system that an SM can access through the GPU's main memory management unit (MMU) to read and write data. Global memory may include for example frame buffer memory used to display images; program storage; data storage; texture storage; ray tracing BVH storage; and many other kinds of data including CGA linear shared memory.

The FIG. 18 memory map further shows a DSMEM address memory block which is broken out on the right-hand side to show discontinuous blocks of shared distributed memory. In prior architectures, this DSMEM memory block was much smaller (e.g., 16 MB) and was mapped to "shared memory" that was logically part of each SM and could be shared between all threads executing on the SM but could not be shared by other processes running on a different SM. In other words, this "shared memory" was private to an SM and enabled an SM to access its own local memory and was termed "shared memory" because different threads or thread groups executing on the SM were able to share the memory and use it to exchange data. No capability was provided to enable one SM to share or access the shared memory of another SM. Different SMs would each see the same e.g., 16 KB of "shared memory" but that mapping enabled the particular SM to access only its own local shared memory that was shared between thread groups or CTAs running on that particular SM.

In example embodiments herein, this "shared memory" window has now been expanded to include a mapping for other (and in one embodiment, every) CTA in a GPC-CGA. In other words, the local memory window of "shared memory" has been expanded to allow access to portions of the local memories of all other SMs running (or in some embodiments, which could run) thread groups or CTAs within the CGA. In one non-limiting example shown in FIG. 18, 256 such mappings can be activated to accommodate up to 32, 64, 128, 256 or any other number of CTAs in a GPC-CTA. Of course, particular hardware platforms may support fewer, more, or different numbers of CTAs per GPC-CTA as needed or desired.

In one embodiment, the number of such regions the hardware allocates at any time is dependent on the actual number of CTAs in a CGA. Thus, if a CGA comprises 32 CTAs, then the hardware will allocate and enable 32 shared memory windows—one for each activated CTA in the CGA. Similarly, if a CGA includes only 23 CTAs, then the hardware will allocate and enable 23 such shared memory windows. The hardware could dynamically allocate/deallocate such shared memory windows as additional CTA launch/complete consistent with the concurrent execution guarantee discussed above.

The load, store, and atomic instructions an SM executes can be indexed by the CTA as certain bits in the address to select the shared memory region, and additional (e.g., lower order) address bits that specific a particular location within that particular CTA's shared memory region. An example shared memory address could thus look like the following for LDS and STS instructions accessing shared memory:

| CTA ID within CGA | SMEM Offset |
| --- | --- |

Such an addressing arrangement can provide backwards compatibility to CGA-unaware code by setting the "CTA ID within CGA" to zero (the CTA can read an S-to-R hardware register to determine which CTA ID is assigned to it) to thereby allow a CTA running on an SM to address the CTA's own shared memory local to that particular SM. The legacy usage is thus supported and is expanded to permit CTAs to access distributed shared memory of other CTAs within the CGA they are all grouped within.

Meanwhile, the following format may be used to permit an SM to issue LD, ST, and atomic instructions to access shared memory:

| 0 | DSMEM/SMEM Aperture | CTA ID within CGA | SMEM Offset |
| --- | --- | --- | --- |

The CTA can determine the Aperture value by reading a hardware register that specifies the aperture address of the shared memory window shown in FIG. 18. The above address format is used to access the shared memory window in generic memory that now spans an array of CTA shared memories, each of a certain size.

The size of the DSMEM distributed shared memory region to be allocated per CTA can in one embodiment be adjusted programmatically by software. For example, the allocation could be 8 KB per CTA, 16 KB per CTA, 32 KB per CTA, etc. up to a preset limit that may depend on the hardware platform and available resources. As mentioned above, in one embodiment, this accessible region of the generic memory address space shown in FIG. 18 is limited to the shared memory that is actually allocated. In other words, while new hardware support will in general permit any SM to access the local memory of any other SM via inter-SM communications, additional support is provided to check whether accesses are legal/permitted—with one example constraint being that the particular location(s) targeted for access are allocated to a CTA within the same CGA the accessing thread is grouped within.

In one embodiment, some atomic operations supported by generic memory may or may not be supported by DSMEM. In particular, some of these atomic operations can instruct certain types of read-modify-write operations that require hardware support to perform certain calculations. In some embodiments, DSMEM support may provide a more limited hardware calculation support for some types of atomic instructions than are provided for example by global memory. In other embodiments, the same or greater hardware calculation support may be provided for atomic access to DSMEM. Thus, the set of atomic instructions able to access DSMEM may include more, less or different instructions than the set of atomic instructions able to access other parts of generic memory.

SM2SM packets on the network

In one embodiment, the packets exchanged between SMs in one embodiment comprise read/write/atomics/write ACKs/read data/write data, read responses (which contain the read data), write data packets (which contain the write data), and read errors. Packet encoding optimizations support different traffic types (e.g., small masked payload sizes and large unmasked payload sizes) to maximize performance and on-chip real estate. The table below shows example packets communicated between SMs to provide access to DSMEM:

combined with the current contents but no response other than an ack is sent back or at least required. Both atomics and reductions do a read-operate-modify/write that cannot be interrupted so the result in target memory is arrived at "atomically". Hardware in various embodiments can support all such direct SM-to-SM communication functionality or any desired subset.

The following is an example packet encoding for the short write command in the table above:

```
struct xx2shmem_byte_wr_cmd_pd {
    mem_datum_t wdat [4]; //payload
    U016 we_ ; //write enable mask
    U004 mask ; //specifies which part of the cache line is addressed
    U001 upper_half ; //specifies which half of the masked part is addressed
    sm2sm_sm_gpc_id_fields dst_sm ; //used by network to route to correct destination SM
    sm2sm_sm_gpc_id_fields src_sm ; //used by destination SM to send write ACKs back to the source SM
    U008 gpc_local_cga_id ; // CAM lookup on target SM
    U005 cta_id_in_cga ; // CAM lookup on target SM
    U011 cgamem_offset ; //Address offset within the shared memory of the destination SM that is allocated to a given CTA in this CGA
    U001 phase_id ;
    U015 barrier_addr ;
    U001 barrier_addr_valid ;
}
    Gpc_local_cga_id
```

The packet format above includes a U008 field "gpc_local_cga_id". As discussed above, each GPC has its own pool of CGA IDs, and GPM allocates one of those numbers to a CGA upon launch of that CGA. This assigned number then serves as a pointer into the DSMEM distributed memory segments that are being used by the various CTAs in the CGA. In one embodiment, the "gpc_local_cga_id" also serves as the id for tracking barrier state for each GPC_CGA.

| SM2SM Operations tex2gnic interface | Packet Name | VC |
|---|---|---|
| Read Command | xx2shmem_rd_cmd_pd | REQUEST (aka BLOCKING VC) |
| Byte (Short) Write Command | xx2shmem_byte_wr_cmd_pd | REQUEST |
| Full (Long) Write Command | xx2shmem_full_wr_cmd_pd xx2shmem_wr_data_pd | REQUEST (multiple packets) |
| Reduction (read-modify-write) | xx2shmem_red_cmd_pd xx2shmem_wr_data_pd | REQUEST (multiple packets) |
| Concatenate (Short) Reduction (read-modify-write) | xxx2shmem_concat_red_cmd_pd | REQUEST |
| Atomic (Long) | xx2shmem_atom_cmd_pd xx2shmem_wr_data_pd | REQUEST (multiple packets) |
| Concatenate (Short) Atomic | xx2shmem_concat_atom_cmd_pd | REQUEST |
| Write ACK/ Read error | xx2shmem_ack_pd | RESPONSE (aka NON-BLOCKING on gnic2tex) |
| Read Response | xx2shmem_rd_data_pd | RESPONSE (one or multiple packets) (aka NON-BLOCKING on gnic2tex) |

Figure 13:
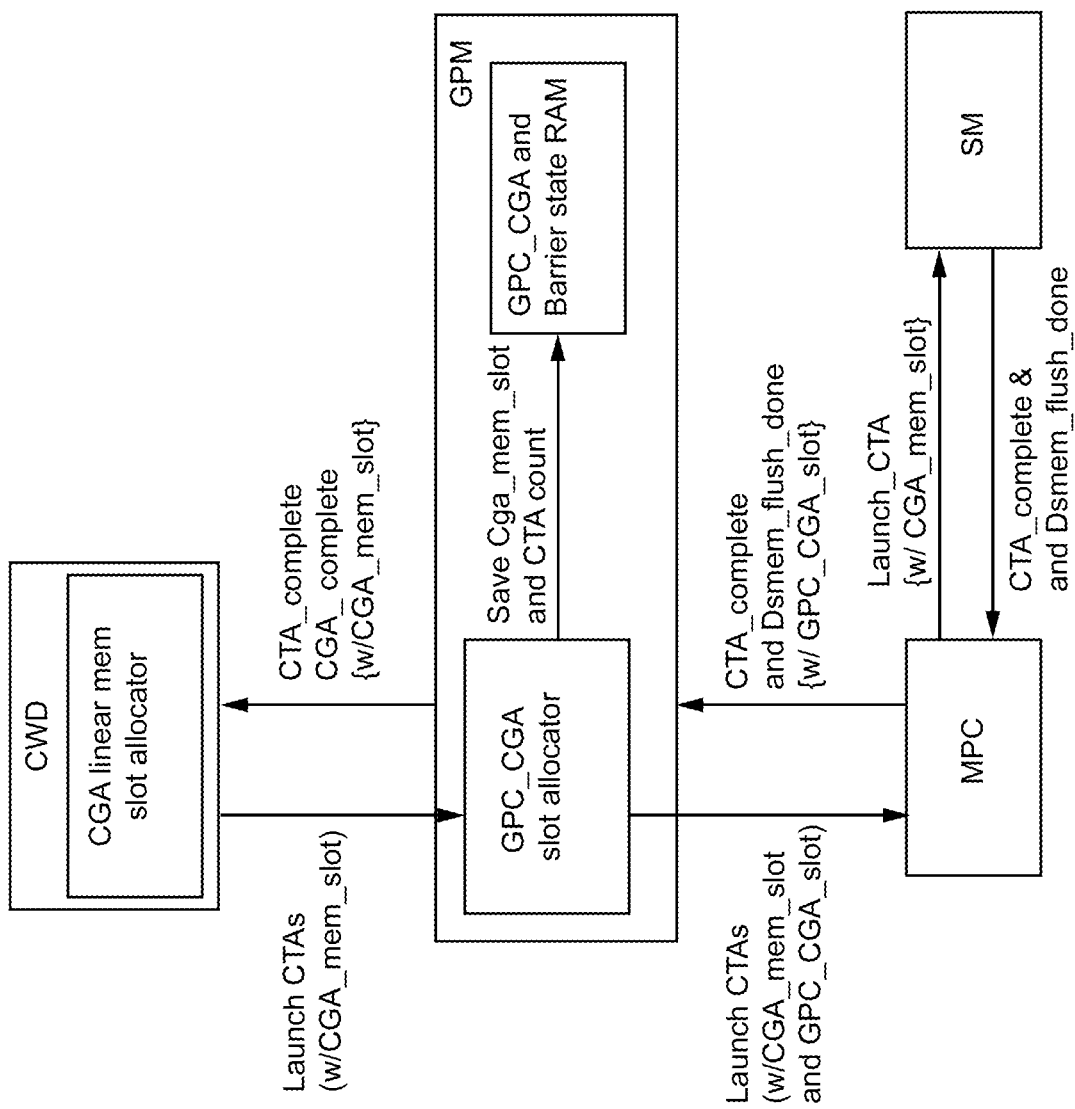
FIG. 13 shows an example circuit arrangement for allocating and deallocating linear memory slots of a linear shared memory pool to/from CGAs.

Note that reduction operations and atomic operations in the table above are closely related. Atomics are reduction operations that also return a value to the requester. Reductions are "one-way" in that data is sent to memory and atomically CGA Tracking In one embodiment as shown in FIG. 13, GPM tracks the total number of active CTAs in the CGA. For example, when the CGA launches, GPM sets a count to the total number of CTAs in the CGA that have launched. When MPC indicates that a CTA has exited, GPM decrements the count. When the count has decremented to zero (meaning that no more CTAs in the CGA are active), GPM determines the CGA has completed. But in example embodiments, GPM does not yet release the CGA ID to the pool for reuse. This is because even though all CTAs in the CGA have completed, it is still possible that some outstanding DSMEM access requests may exist. Accordingly, the example embodiments provide protocols to make sure the CTAs in a CGA have completed all their DSMEM memory accesses (and other accesses) prior to releasing a CGA ID associated with those CTAs. In one embodiment, the GPC does not release the CGA ID until every CTA in the CGA has exited and all of their memory instructions/accesses have completed.

This is done to prevent a new CGA from reading or writing (or receive a read or write from) a defunct CGA that previously used the same CGA ID. In one embodiment, the gpc_local_cga_id provides protection against this because there can be no DSMEM accesses in flight from a non-current user of the CGA ID when a new CGA launches.

As discussed above, when a CGA finishes executing, the hardware based scheduler (GPM) releases the resources (e.g., shared memory, warp slots needed to run on an SM, etc.) formerly used by the CGA so they can be used for new tasks such as new CGAs. Similarly, when a CTA finishes executing, the hardware based scheduler (GPM) releases the resources (e.g., shared memory, warp slots needed to run on an SM, etc.) formerly used by the CTA. Once a CTA finishes, a protocol is used to fault any DSMEM memory accesses to that CTA's shared memory. In one embodiment, when the all of the CTAs in a CGA finish executing, the hardware based scheduler retains the CGA ID and sends a DSMEM memory flush (FIG. 15C-2, block 516) to each of the SMs that was running a CTA in that CGA and then waits for a response. Once all of the SMs that were running CTAs in the CGA confirm the memory flush of shared memory formerly allocated to the CGA, GPM finally can release the CGA ID to a reuse pool.

On the launch side, each CTA in a CGA needs to know where all the other CTAs in the CGA are executing so the CTA can send transactions to those other CTAs. This mapping information is programmed during launch.

DSMEM Mapping Tables

Figure 19:
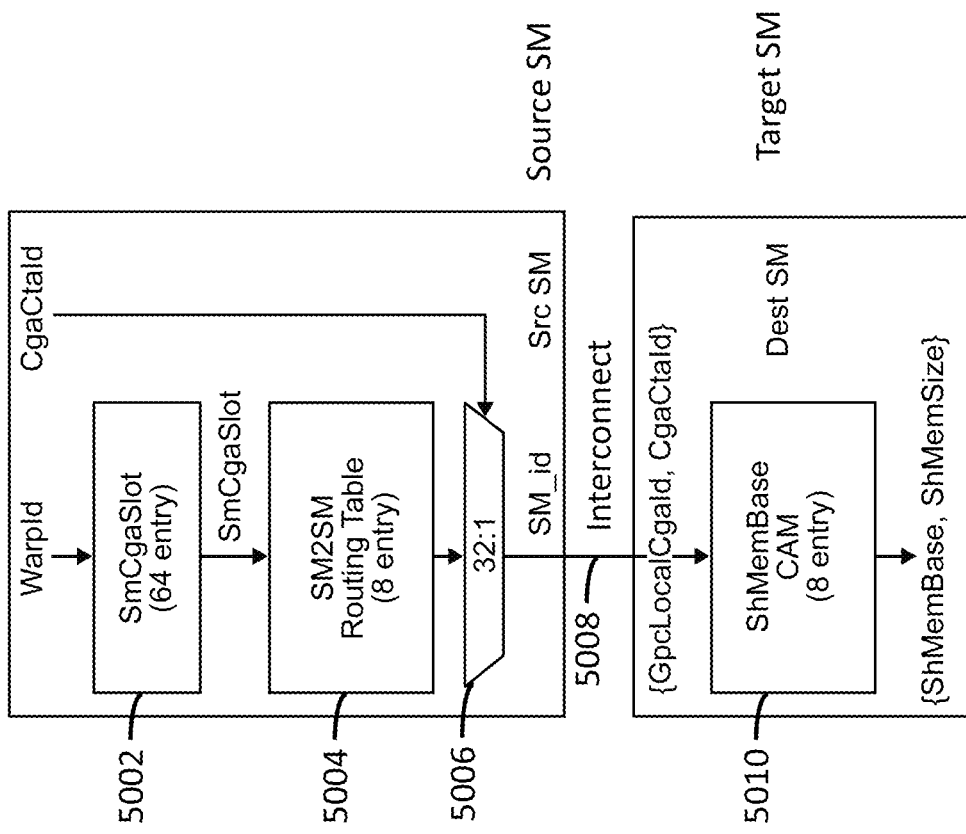
FIG. 19 shows example distributed shared memory routing tables.

FIG. 19 shows an example DSMEM mapping table arrangement maintained by each SM. In one embodiment, the SM determines the target based on the segmented address and then choses the correct packet type to let the interconnect know this is a SM2SM transaction, and provides the physical SM id based on lookup in the routing table as shown in FIG. 19. In one embodiment, the SM maps the logical CTA ID within the GPC_CGA to the physical SM on which the CTA is running, and that CTA's physical shared memory on the SM. Each time a CTA launches, all of the SMs on the GPC may need to know about it because any one of those SMs might be executing a CTA that is part of the same CGA. In one embodiment, MPC informs (broadcasts a message to) all of the SMs each time a new CTA is launched. In response, each SM updates the mapping table it maintains. In one embodiment, a CAM structure is used for this mapping to allow DSMEM addressing from remote (other) SMs. As FIG. 19 shows, the CAM structure is stored in RAM as an SM-to-SM mapping table 5004 that is indexed by a SMCGAslot value. Mapping table 5004 identifies to the SM which other SMs the other CTAs in the CGA are executing on. Pseudocode defining the 5004 example table is shown below:

```
CTA_ID -> CGA_ID, SM_ID, and TPC_ID
// Directory to find SM ID in GPC from CTA ID in CGA
// Source SM looks up this directory to find destination SM
struct {
    U008 gpc_local_cga_id;              // GPC local CGA id
    struct {
        U004 tpc_id;
        U001 sm_id_in_tpc;
    } sm_id_of_cta_in_cga [j];          // at most j CTAs per CGA
} cga_cta2sm_dir [k];                    // at most k CGAs per SM
```

In this example, gpc_local_cga_id is thus used as a local CGA ID that all of the SMs in the CGA can refer to. The table allows each SM to look up the tpc_id and the sm_id_in_tpc, which is effectively the address of another SM. The index to this structure is the (logical) CTA ID in the CGA (this ID is local to each CGA). Thus, given the slot ID indicating which CGA (of all the CGAs that might be running) and a logical CTA ID, the SM can look up the SM_id of that other SM that is running that CTA so it can communicate across the interconnect with that other SM for a transaction involving for example the DSMEM segment allocated to that CTA on that other SM.

The table 5004 continues to be updated as additional CTAs are launched and complete, with each SM maintaining its own mapping table 5004 over time. Meanwhile, hardware (MPC and GPM in cooperation with the SMs) prevents a CGA synchronization barrier from being active until all CTAs in a CGA have launched and all SM's have received broadcast information to construct their mapping tables 5004 in order to prevent any CTAs in the CGA from being left out of the barrier synchronization regime.

In one embodiment, a second table 5002 as shown in FIG. 19 is maintained by each SM to map warps to CGA slots. In particular, the SMs own internal warp scheduler schedules execution slots in terms of warps (for example some number such as 64 warps may be running on any given SM at the same time). The SM maintains mapping information to map the warp number to the CGA_slot information. Thus for example, a warp on one SM can issue an LD instruction that is mapped into DSMEM of another SM that is executing other warps (CTA(s)) of the same CGA. It first identifies a CGA_slot using table 5002, and then uses the table 5004 to determine which SM to pass the instruction to. In summary, in the source SM, when a CTA (SM's physical warp ID=X) accesses shared memory of another CTA (addressed by logical cta_id=A in the same CGA), the CTA first looks up bl_table to obtain sm_cga_slot, then looks up cga_cga2sm_dir to obtain gpc_local_cga_id and sm_id of the destination SM (a tuple of tpc_id and sm_id_in_tpc), per the following pseudocode:
gpc_local_cga_id=cga_cta2sm_dir[bl_table[X].sm_cga_slot].gpc_local_cga_id;
destination_sm_id=cga_cta2sm_dir[bl_table[X].sm_cga_slot].sm_id_of_cta_in_cga[A];

The source SM then uses gpc_local_cga_id and sm_id per the instruction format above to direct an instruction across the interconnect 5008 to a location within the target SM's DSMEM.

FIG. 19 also shows the request as received by the target SM across the interconnect 5008. When the target SM receives the request, it can perform a lookup using table 5010 as described in the pseudocode below to find the DSMEM base and size:

- Incoming to SM, CAM match [gpc-local CGA_ID and

```
        CTA_ID in the CTA] to find shared memory base and size
//Table in remote (destination) SM
//CAM to look up shared memory base from gpc_local_cga_id
and cta_id_in_cga
struct {
    struct {
        U008 gpc_local_cga_id;
        U005 cta_id_in_cga;
        U001 is_valid;
    } look_up_tag;          // tag of CAM look up
    U011 shared_memory_base;
    U018 shared_memory_size;
} shmem_base_CAM[k];       // at most k CGA enabled CTAs
                           per SM
```

The target SM matches on the gpc_local_cga_id and the cta_id_in_cga (note: the cta_id_in_cga is included because there can be more than one CTA of a CGA running on a given SM). If there is a match, a valid lookup tag is generated (if there is no match, this may mean the CTA is no longer running on the SM and the receiving SM accordingly generates an error notification which it sends to the originating SM). Assuming a valid lookup tag, the table is then used to look up the DSMEM base and size in the physical storage that holds shared memory (DSMEM allocations are relocatable and so could be anywhere in the physical store). As noted above, the table 5010 (which may be a content addressable memory or CAM in some embodiments) can be replicated in hardware to provide multiple concurrent lookups. The target SM will then check the offset that came with the instruction, ensure it is within range, and then perform the read, write, atomic operation or other requested action on the specified DSMEM memory offset. If the instruction specifies an offset that is out of range, the error is detected and the source SM is notified of the error.

DSMEM coalesced write acknowledgements and optimized memory barrier handling

As discussed above, GPM continually tracks the number of CTAs in a CGA that continue to execute. In one embodiment, this count is also used to enable GPM to support barriers. Barriers are useful for example to synchronize all of the CTAs in a CGA for any reason. For example, CTAs can execute instructions indicating they wish to wait on results produced by one or more other CTAs. Such data dependency is common in concurrently-executing threads. However, example embodiments using DSMEM provide a special use case for barriers.

Figure 20:
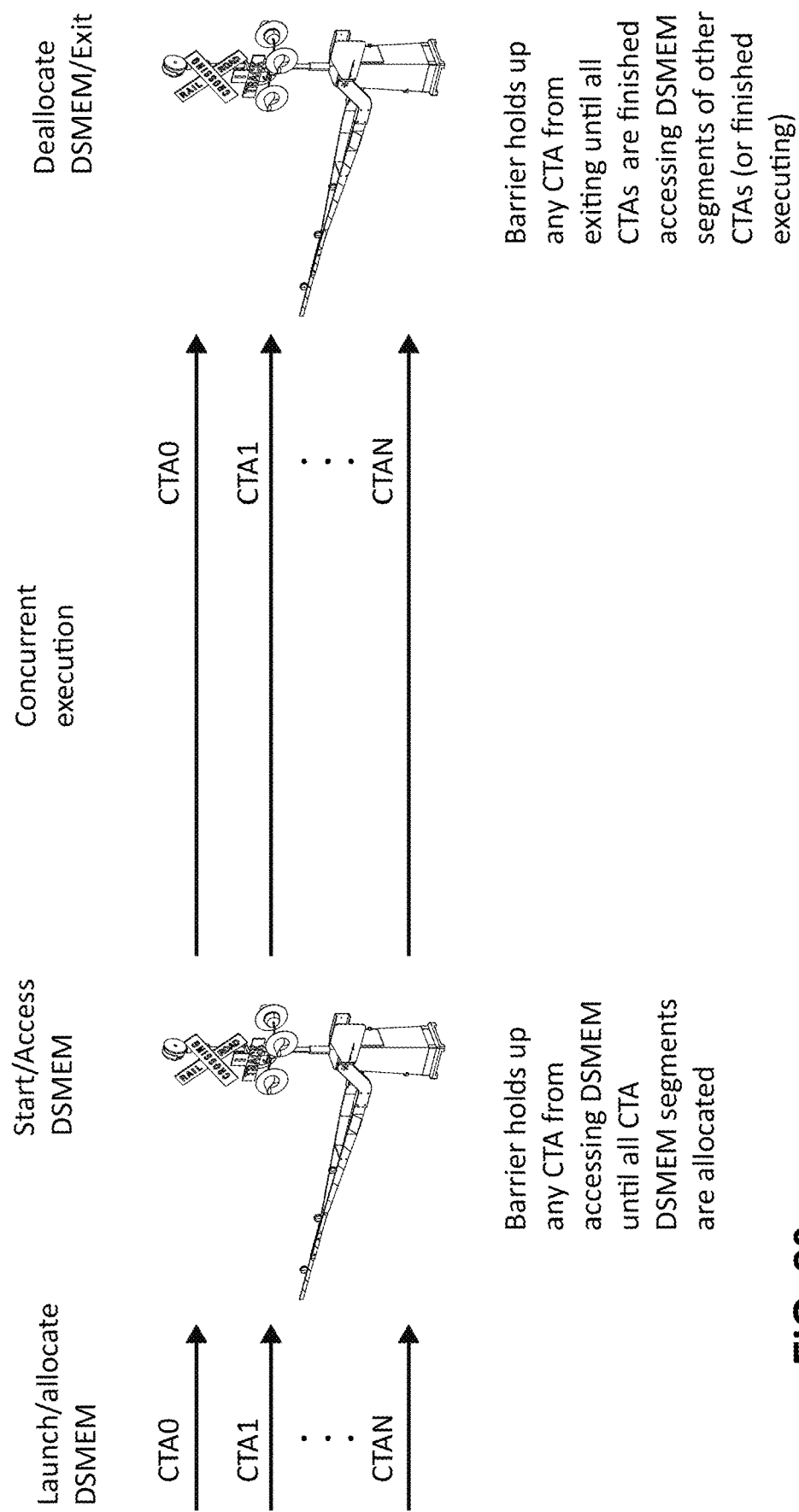
FIG. 20 shows example non-limiting MEMBAR shared memory barriers.

Even though all CTAs of a CGA are guaranteed to execute concurrently, this does not mean that all CTAs will launch instantaneously at precisely the same time. Rather, it takes some amount of time for GPM to launch all of the CTAs. Just as undergraduates in a college take some time at the beginning of term to move into their respective dorm rooms and get ready to go to their first classes, the various CTAs take some time to get assigned to SMs and have DSMEM allocated to them. But unlike the dorm room situation where no classes begin until Monday morning at 8 am, the first-to-launch CTAs start trying to do their work as soon as they can, which may include accessing DSMEM segments of other CTAs that are not quite ready and don't have any DSMEM segment yet allocated to them. Therefore, during this launch time window, one embodiment requires every CTA to gate on the barrier before any CTA is allowed to access any DSMEM shared memory of any other CTA. See FIG. 20. This hardware barrier instance (illustrated as the left-hand railroad crossing gate of FIG. 20) indicates when all CTAs have successfully launched such that the DSMEM segment for each (every) CTA in the CGA is now available for access by any other CTA in the SGA.

At the other end of the execution process, some of the CTAs might complete execution before others—but if they were allowed to exit completely, then the DSMEM segments allocated to them would be deallocated and would therefore no longer be available to other CTAs still doing work that may be dependent on data those DSMEM segments contain. This is like the undergraduate students at the end of the term who want to leave immediately after their last exam but still haven't turned in their contribution to a group assignment. In such cases, one embodiment makes another hardware barrier instance (illustrated as the right-hand railroad crossing gate of FIG. 20) available to gate CTA exit so that no CTA is able to actually exit (so they remain alive to maintain their DSMEM segment allocation and service any additional requests to same) until all of the CTAs are ready to exit.

One example embodiment provides an enhancement to the ISA providing two new barrier instructions that are similar to legacy sync thread instructions but which provide access to a new CGA barrier that can be used for gating access and release of DSMEM instructions as discussed above. These two new instructions are:

CGABAR.ARRIVE//signal reached the barrier, but don't block

CGABAR.WAIT//now block until barrier clears.

In one embodiment, these instructions do not specify a particular barrier; the hardware assigns a hardware barrier to the CGA when the instructions execute.

Executing the arrive barrier instruction first synchronizes, using software, all the threads in the warp, then triggers a warp level arrive message to MPC. It also sets Warp[WarpID].CgaBarWait=1.

The arrive barrier instruction will be stalled from issuing if CgaBarWait is already=1.

Each CTA in the CGA to execute the arrive barrier instruction will perform the same steps described above.

Executing the wait on barrier instruction is where blocking actually occurs, and each CTA will block on the barrier until all of the CTAs arrive and MPC clears the barrier.

Thus, in example embodiments, memory barrier (MEMBAR) instructions are used to ensure that memory operations have completed. All reads and writes that precede the MEMBAR instruction have completed or at least have a result that is visible prior to execution of reads and writes after the MEMBAR instruction. See e.g., U.S. Pat. Nos. 9,223,578; 8,997,103; 9,324,175. For example, the memoryBarrierNV( ) OpenGL Shading Language (GLSL) operation—along with the "MEMBAR" assembly operation, provides explicit synchronization that ensures a proper ordering of read and write operations within a shader thread. Memory operations scheduled for execution prior to the memory barrier command are all guaranteed to have completed to a point of coherence when the memory barrier command completes in execution. In one embodiment, reads and writes can be executed out of order, and MEMBAR is used to put them in order when it matters—i.e., when subsequent read or write commands need to rely on the prior reads and writes all having completed. MEMBAR may also be used for Compute Preemption (CILP) to ensure all CTAs in CGA have completed all DSMEM accesses before the SM state is saved for a context switch, and all DSMEM has been restored by a context restore before new DSMEM accesses are allowed.

In the past, MEMBAR was implemented by sending a message to every destination in memory and received an acknowledgement from each one of those destinations. This for example could impose on a memory domain such as an L2 cache a discipline that any operation that follows the MEMBAR acknowledge will occur after every operation that came before. However, in one embodiment, a different MEMBAR implementation is used for DSMEM.

In one embodiment, every outstanding request to DSMEM is tracked. When a source SM sends a request to a target SM, it keeps track that it is expecting a response from the target SM. If the request is a LD (load) command, the source SM is waiting for a certain number of read responses, i.e., the source SM is waiting for all of the data it is expecting from the target SM. If the source SM sent a ST (store) command, the target SM will send an acknowledgement specifically for allowing the source SM to keep track of the ST commands that were outstanding. In one embodiment, an SM will even internally acknowledge ST commands sent by one CTA to another CTA running on the same SM. Thus, loads are tracked until all response data is received and stores are tracked until an acknowledge is received.

To provide such tracking, each SM maintains outstanding transaction counters. In one embodiment, the outstanding transaction counters are consolidated, meaning that each source SM simply counts the total number of outstanding transactions for all other target SMs (e.g., instead of tracking the number of outstanding transactions for each target SM). But other implementations are possible.

When the source SM sends a request, it increments the count of its outstanding transaction counter. When the source SM receives an acknowledge (for ST command) or returned data (for LD commands), it decrements the count. Other implementations might use two different outstanding transaction counters, one for ST commands and one for LD commands.

To minimize bus bandwidth, acknowledges are coalesced instead of being sent individually across the communications bus. In one embodiment, each SM acting as a target for ST commands keeps track of the number of acknowledges it owes a source SM. In this case, the target SM may maintain a separate counter for each source SM sending it ST commands. The acknowledge commands can be sent in a consolidated fashion for example when the count reaches a certain value or when the bus is idle. When the acknowledge is sent, it includes a count of accumulated acknowledges to the particular source SM—and the source SM upon receiving the accumulated count can decrement its outstanding transaction counter by the amount of the accumulated count received in the accumulated acknowledgement message.

In one embodiment, GPM maintains an expected_cta_arrival_count that tracks how many CTAs should arrive at the barrier before GPM releases the barrier. GPM in one embodiment sets the expected_cta_arrival_count to the number of CTAs that are still running.

When a MEMBAR is encountered, the system must wait until all of the outstanding transaction counters of all of the SMs go to zero to ensure that all outstanding DSMEM access requests have completed. This involves stalling all new (after issuance of the MEMBAR command) DSMEM memory access commands for the CGA until the outstanding transaction counters indicate that all outstanding memory access requests have completed. However, in the general case, each SM may be executing CTAs from various different CGAs—not just CTAs for the CGA for which a MEMBAR command has issued. Instead of stalling all memory accesses (e.g., including memory accesses from CTAs in different CGAs) until the outstanding transaction counters go to zero, each SM maintains a set of two (plural) outstanding transaction counters—for example, a phase 0 counter and a phase 1 counter. Upon encountering a MEMBAR, the SMs flip the phase to track outstanding requests using a different outstanding transaction counter (so they start using a phase 1 counter if they previously used a phase 0 counter, or they start using a phase 0 counter if they previously used a phase 1 counter). The SM hardware thus maintains two outstanding transaction count states—one from before the phase flip and another from after the phase flip. This also implies that every memory transaction that is sent and every corresponding acknowledgement or data response identifies a phase (phase 0 or phase 1) so corresponding acknowledgements can update the correct phase outstanding request counter. Thus, in one embodiment, all the outstanding request accounting is per phase.

When the outstanding request accounting for a particular phase finally goes to zero, all the ST commands that were issued before the MEMBAR have completed and all the LD commands that were issued before the MEMBAR have also completed. While waiting for the old phase count to go to zero, if one or more new MEMBARs come in in the meantime, the new MEMBAR request(s) are stalled and consolidated until the old phase counts go to zero. Once the old phase counts reach zero, the hardware flips the phase again to repeat the process for any stalled MEMBARs. This process can repeat indefinitely, with the phase flipping back and forth as new MEMBARs come in.

In one embodiment, these outstanding transaction accounts are also used upon a CTA exiting, in order (e.g., for MPC) to determine when all outstanding DSMEM transactions associated with the CTA have completed.

The above processes are used to implemented SYNC type accesses. As described in above-identified U.S. patent application Ser. No. 17/691,296 filed Mar. 10, 2022 entitled Hardware Accelerated Synchronization With Asynchronous Transaction Support (20-SH-0601US01; 6610-98), the above is replicated to provide additional functionality for ASYNC type accesses. Note that mechanisms other than hardware synchronization barriers could be used to ensure that CTAs do not begin accessing DSMEM that has not yet been allocated or do not continue to access DSMEM after it has been deallocated. For example, memory barriers or any other communication mechanism that provide inter-CTA communication could be used.

CGA/CTA Exit and Error Handling Protocols with DSMEM

In one embodiment, certain kinds of errors are not attributable to the program counter (PC). Normally, embodiments would retain a FIFO of past PCs and can associate any memory error with a given warp, thread and PC. The PC can fall off the end of the FIFO when it is determined that there are no errors attributable to that PC. However, with DSMEM transactions, some types of errors are detected or detectable at a target SM but are not detected or detectable by the source SM and thus cannot be associated with the PC of the source SM. Such errors for example may include "CGA/CTA not found" at the target or in particular the target SM detecting gpc_local_cga_id and cta_id_in_cga is not in the shmem_base CAM (usually because the CTA has already exited), or the target SM detects out of bound addresses such as Address Offset>shmem_base+shmem_size (e.g., due to early release by the target SM of part of its DSMEM shared memory allocation to the CGA). To handle such errors, one embodiment does not report errors to the target or destination SM but instead makes the target SM responsible for reporting such errors to the source SM using error messaging similar to the acknowledgement messaging. Upon receipt of an error packet, the source SM posts the error and attributes it to the CGA but does not necessarily attribute it to a particular warp and/or PC because this information may no longer be available. At the source SM, a trap handler can read gpc_local_cga_id and cta_id_in cga of the bad warp using the SR registers. If the CGA has already exited (which is possible for stores and atomics), the error may be ignored/dropped since it is now moot.

Other types of errors detectable on the source SM side can provide a valid warpID and PC, for example:
Cta_id_in_cga>max number of CTAs in a CGA
Cta_id_in_cga has an invalid SM_id in the SM2SM table
Address offset>maximum shared memory size possible
CGA Exiting In one embodiment, a CGA exiting is a multi-step process. First, the SM running a CTA detects that a warp has sent a Warp_exit command. This means the CTA wants to exit, but as discussed above, DSMEM SM-to-SM writes and CGA writes to L2 linear memory may still be inflight. Accordingly, the CTA does not actually exit but instead MPC is notified and the CTA waits for MPC to grant permission to exit. When all warps in a CTA complete, MPC sends an inval_cta_entry to the SM to invalidate the CGA shared memory sm_cga_cta_slot CAM entry shown in FIG. 19. MPC then sends a cta_complete to GPM and CWD and marks the CTA as needing a memory flush. When all CTAs in the CGA complete, MPC deallocates CGA resources including sm_cga_slot, and issues a DSMEM flush to the SM. After receiving an acknowledgement that the flush is complete, MPC sends a dsmem_flush_done. In response, GPM recycles gpc_local_cga_id after dsmem_flush_done is received from all CTAs in the CGA, and sends cga_complete to CWD.

Example Full Functional Pipeline

Figure 21A:
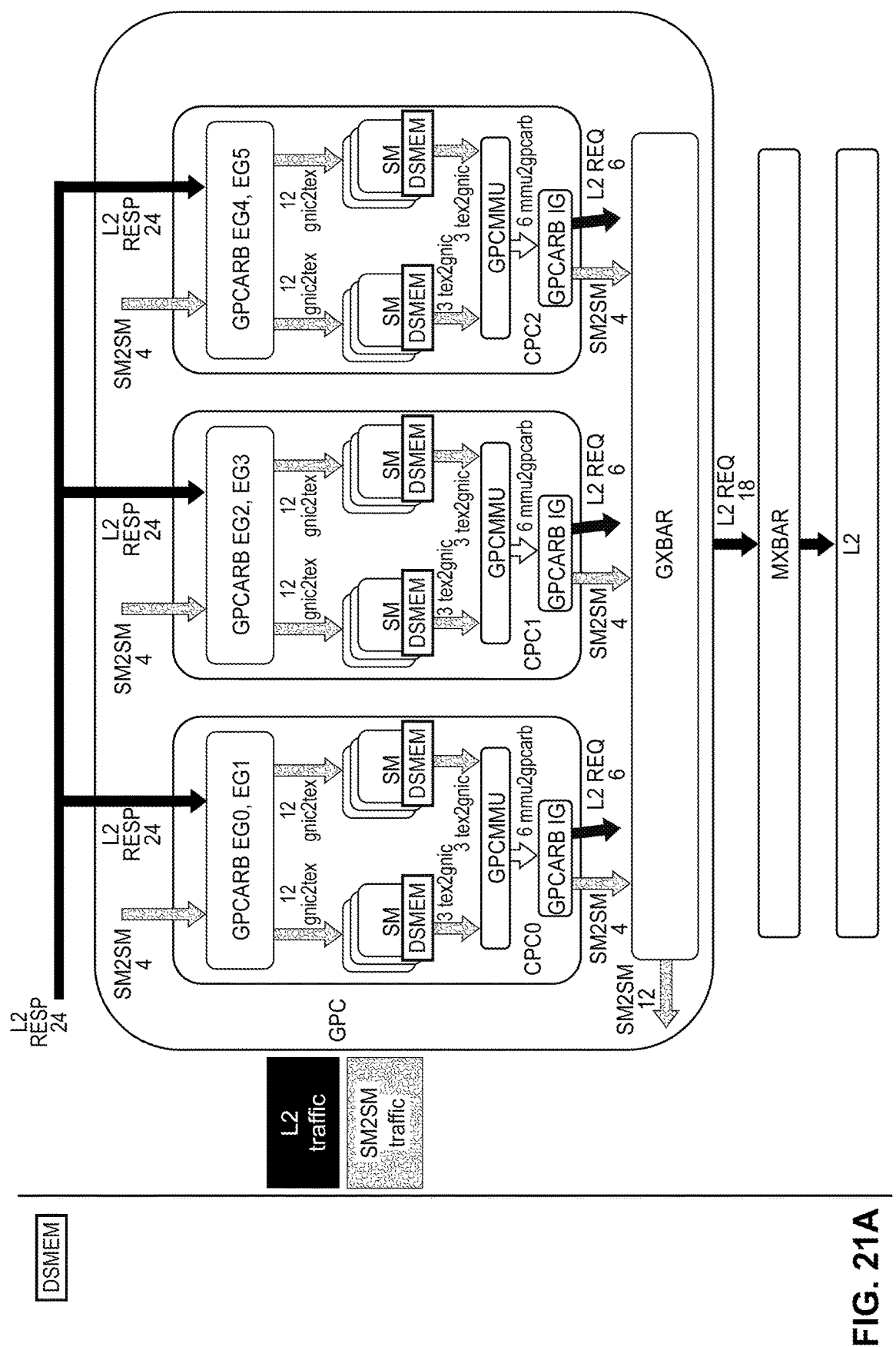
FIG. 21A shows a block diagram of an overall example system including a distributed shared memory interconnect.
Figures 1, 21A:
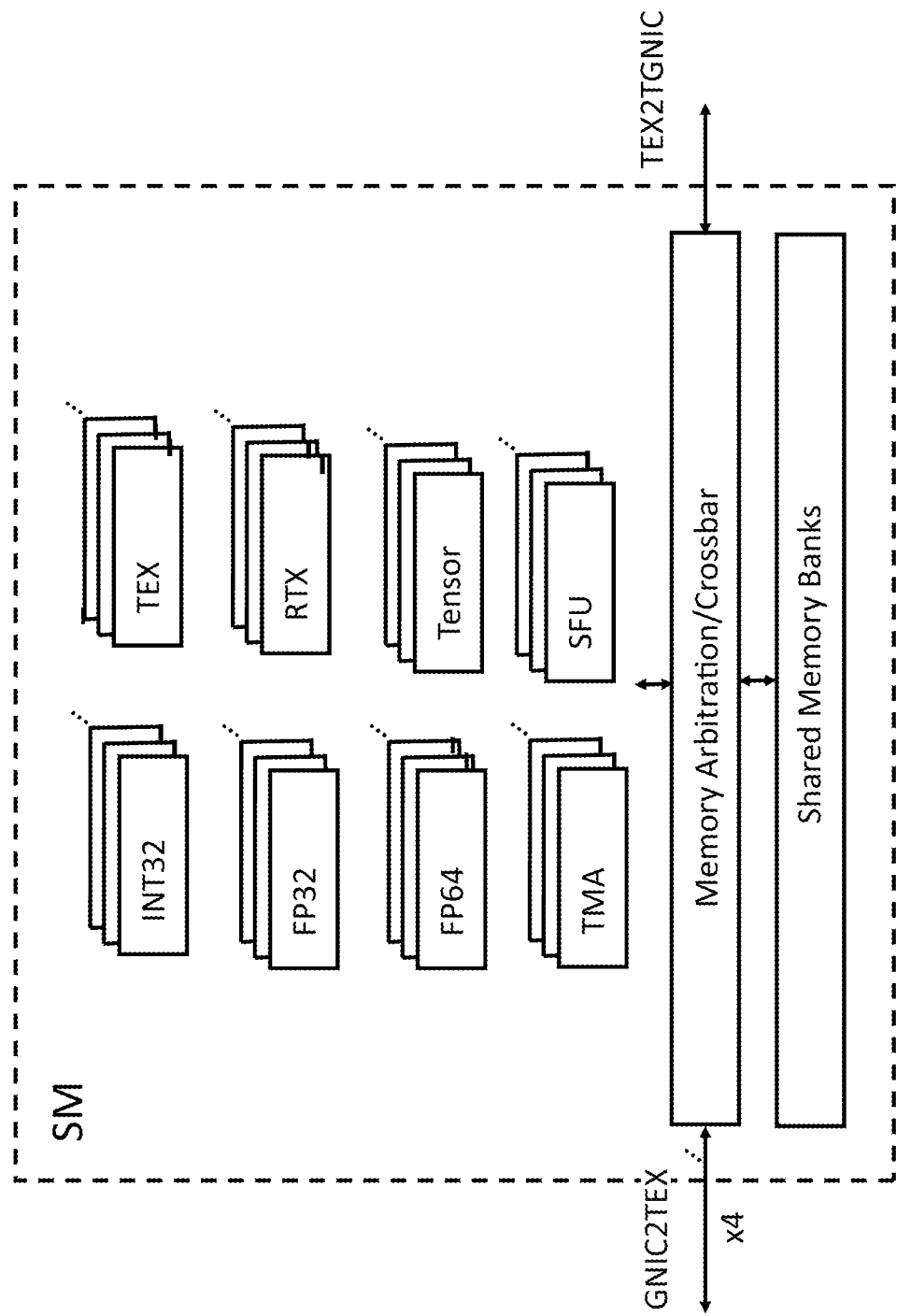

FIG. 21A shows an example full functional pipeline defining a GPC comprising multiple SMs. FIG. 21A shows plural CPCs (CPC0, CPC1, CPC2, . . . CPCN) each of which organize/include multiple SMs each of which provides an internal DSMEM memory segment that can be accessed by any other SM in the GPC. The SMs within the CPC are each connected to a respective bus ("tex2gnic") that connects the SM to a GPCMMU memory management unit. The GPCMMU translates virtual memory addresses on each SM bus into external memory hierarchy (e.g., L2 cache) physical memory addresses and sends the requests with physical address to GPCARB (in one embodiment, the buses into GPCARB remain separate and distinct for each SM. GPCARB arbitrates the requests from the various SMs to send over bus "L2 REQ" (black data paths) for accessing the L2 cache memory. Such requests are passed along through MXBAR to the L2 cache and the platform external memory hierarchy.

In the example shown, a new hierarchical GXBAR network/switch internal to the GPC is dedicated to providing an alternative "SM2SM" output path (stippled data paths) that allows any SM in the GPC to communicate with any other SM in the GPC. The GXBAR switch thus enables a CTA running in one SM to cooperate with another CTA running in another SM by accessing shared memory in the other SM.

Each CPC includes an GPCARB operator, which connects the SMs within the CPC to the GXBAR switch. In one embodiment, GPCARB blocks act as routers to route L2 memory access requests to MXBAR (black data paths) and route SM-to-SM requests to GXBAR (stippled data paths). Furthermore, in this example, all SMs within a CPC communicate with a common GPCARB, and all SMs within all CPCs within a GPC communicate with a common GXBAR switch. Thus, a CPC in this example is a collection of TPCs that share a common switch (GPCARB) and GPCMMU.

In one embodiment, SM-to-SM connectivity is localized to the GPC hierarchy. This localization achieves low latency which helps minimize sync overhead. In one embodiment, the bandwidth available for SMs to communicate with one another via GXBAR is different from the bandwidth available for an SM to communicate with the L2 cache via MXBAR. Furthermore, SM-to-SM traffic within a GPC does not, in this example arrangement, use any MXBAR bandwidth—which may need to be shared with other GPCs. The L2 cache is thus isolated from the SM-to-SM communications within a GPC, minimizing the potential of SM-to-SM communications interfering with L2 cache accesses or vice versa (e.g., one GPC may be conducting low latency SM-to-SM communications while another GPC may be saturating the L2 cache).

As shown in FIG. 21A, the output of GXBAR ("SM2SM12") is distributed in this example to different input ports of the SMs in the GPC (in this embodiment, each of three "SM2SM4" paths respectively communicated to CPC groups of SMs . . . but any desired bus widths could be used) via GPCARB "EG" (egress) blocks (e.g., EG0, EG1; EG2, EG3; EG4, EG5). These SM2SM4 paths (stippled) are in one embodiment different from the "L2RESP" paths (shown in black) used to communicate responses from the L2 cache to these same CPC groups of SMs. In one embodiment, each SM has respective different ports for SM-to-SM communications and for L2RESP communications. Of course, in other implementations, the same SM ports could be used for mixed SM-to-SM and L2 traffic.

This interconnect network can include one or more crossbars including read crossbar and/or write crossbar. The interconnect network may support multiple parallel read and write operations, and may support access to data stored in the shared data memory using direct addressing and access to data stored in the L1 data memory using tag lookup. The interconnect network can support a number of simultaneous reads and writes corresponding to the number of banks in the shared memory, L1 cache, and/or registers. In one example, the interconnect network can support a number of simultaneous read and writes that equals the number of memory banks in local shared memory. See e.g., US20210124582.

FIG. 21A-1 shows an example SM internal architecture within the context of the FIG. 21A system. In one embodiment, local shared memory of an SM is closely associated with and tied to the processing cores of the SM. For example, the SM may comprise a plurality of processing cores that are able to access a physically local or closely connected semiconductor memory via address and data buses. Typically a memory arbitration circuit that is part of the SM is used to arbitrate (and in some cases buffer or queue) local shared memory accesses. The local memory itself may be physically located on a portion of a semiconductor substrate that is in close proximity to the cores of the SM—that is, areas of the semiconductor substrate are designated "SM" and each include processing cores, a memory arbitration circuit and a block of semiconductor memory. The block of local semiconductor memory may in some examples comprise a plurality of memory banks, and the memory arbitration circuit may include a crossbar circuit to allow any processing core to access any location within any memory bank of the local memory. In example embodiments, the memory arbitration circuit is expanded to allow read, write, and read-modify-write (i.e., atomic) access to the local shared memory based on command, address and data information contained in packets that are supplied externally from the SM—i.e., by other SMs. But in other embodiments, the physical memory used to implement DSMEM could be located other than in the same location as the processing cores, with interconnects (wires) provided to reduce or minimize latency.

Figure 21B:
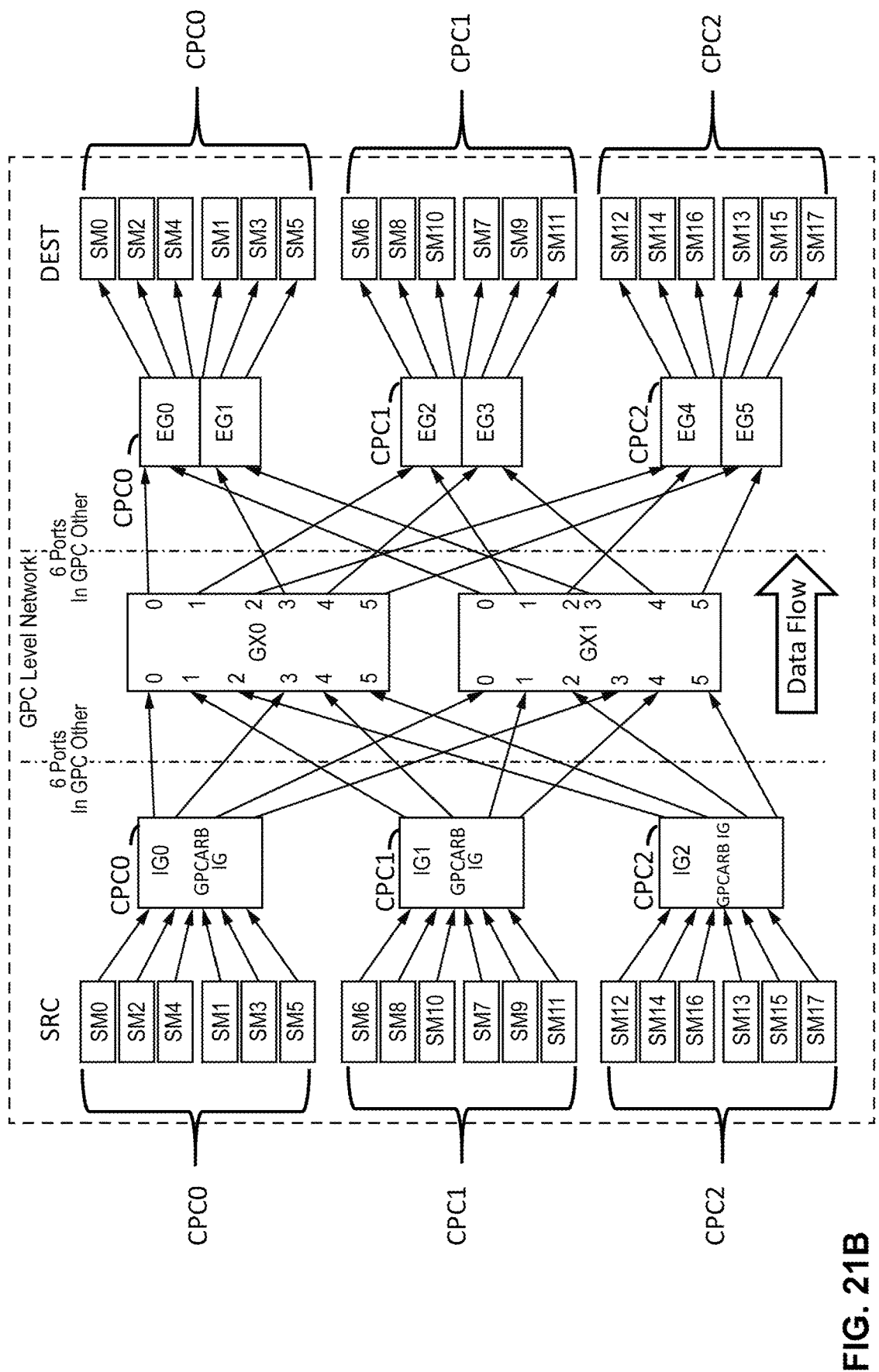
FIG. 21B shows an example non-limiting additional view of the distributed shared memory interconnect.

FIG. 21B shows another view of GXBAR, which provides address based routing for inter-SM traffic. Note that in FIG. 21B, the SMs shown on the left as source ("SRC") SMs and the SMs shown on the right as destination ("DEST") SMs are the same SMs. FIG. 21B shows that GXBAR is implemented by plural k×k switches to avoid protocol deadlocks (e.g., where a first SM is waiting on a first response from a second SM, and the second SM is concurrently waiting on a second response from the first SM). In the example shown k=6 to provide a fully connected 12×12 switch but any desired dimensionality is possible.

In the example shown, the three ingress blocks "IG0", "IG1", "IG2" (IG stands for "ingress") correspond to the three "GPCARB IG" blocks for CPC0, CPC1, CPC2, respectively as shown in FIG. 21A. Similarly, egress blocks EG0, EG1, EG2, EG3, EG4, EG5 (as noted above, EG stands for "egress") in FIG. 21B correspond to GPCARB EG0, EG1; GPCARB EG2, EG3; and GPCARB EG4, EG5 shown in FIG. 21A. FIG. 21B thus shows that an SM-to-SM request originated by a source SM passes through a corresponding GPCARB IG block to the GXBAR switch, which then routes the request based on address through a corresponding EG block to a destination or target SM. In this address based routing, a given address determines a unique path through GXBAR from the source SM to the target SM. However, there are multiple paths from any source SM to any target SM. In one embodiment, the GPCMMU blocks of FIG. 21A implement uTLB (microtranslation-lookaside-buffer) hardware that implements an address hash instead of a virtual-to-physical address translation In order to spread the requests evenly across the multiple paths in the GXBAR network to maximize network utilization and avoid camping scenarios.

The FIG. 21B architecture provides robustness in that since wires may run a long distance (due to the number of interconnected SMs and the physical size of the GPC on silicon), bus encoding schemes are used to cap toggle rate for power integrity and programmable (e.g., by firmware) "knobs" use some portion less than all of the network bandwidth (e.g., half bandwidth by shutting down GX0 or GX1) if there are any silicon issues found on the network. Network bandwidth controls may also be provided to restrict maximum bandwidth per SM (e.g., the amount of data an SM can transfer over the network per clock) to a certain limit (e.g., to provide predictable performance) and/or to permit the SMs to opportunistically operate at peak available network bandwidths. This architecture also supports floor-sweeping of TPCs/CPCs by shutting off a defective TPC or CPC.

Figure 21C:
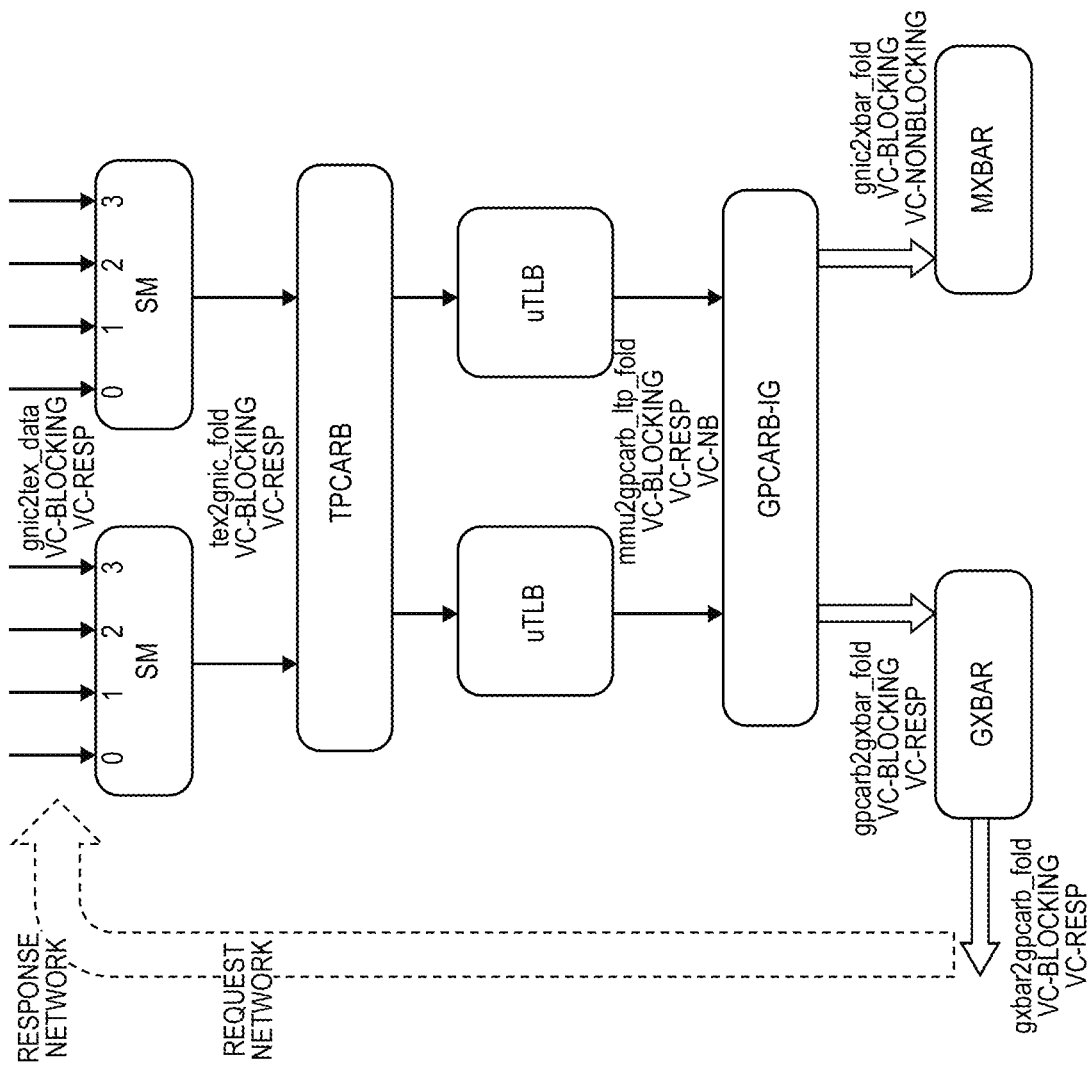
FIG. 21C shows another view of SM processing of SM-to-SM communications.

FIG. 21C shows another view of the routing discussed above, detailing the path from a source SM to GXBAR and MXBAR. As can be seen, part of the DSMEM path is in one embodiment common to the path to the L2 cache (i.e., part of the path is shared between SM-to-SM transactions and transactions to global memory). The common path defines or comprises the following:

SM→TPCARB→GPCMMU uTLB→GPCARB-IG

The branch point for the two different kinds of traffic is GPCARB IG at the bottom of the figure, which routes global memory traffic to MXBAR and routes SM-to-SM communications to GXBAR. Use of a common path saves area and reuses wires/logic. However, other implementations that use completely distinct paths are also possible.

Figure 21D:
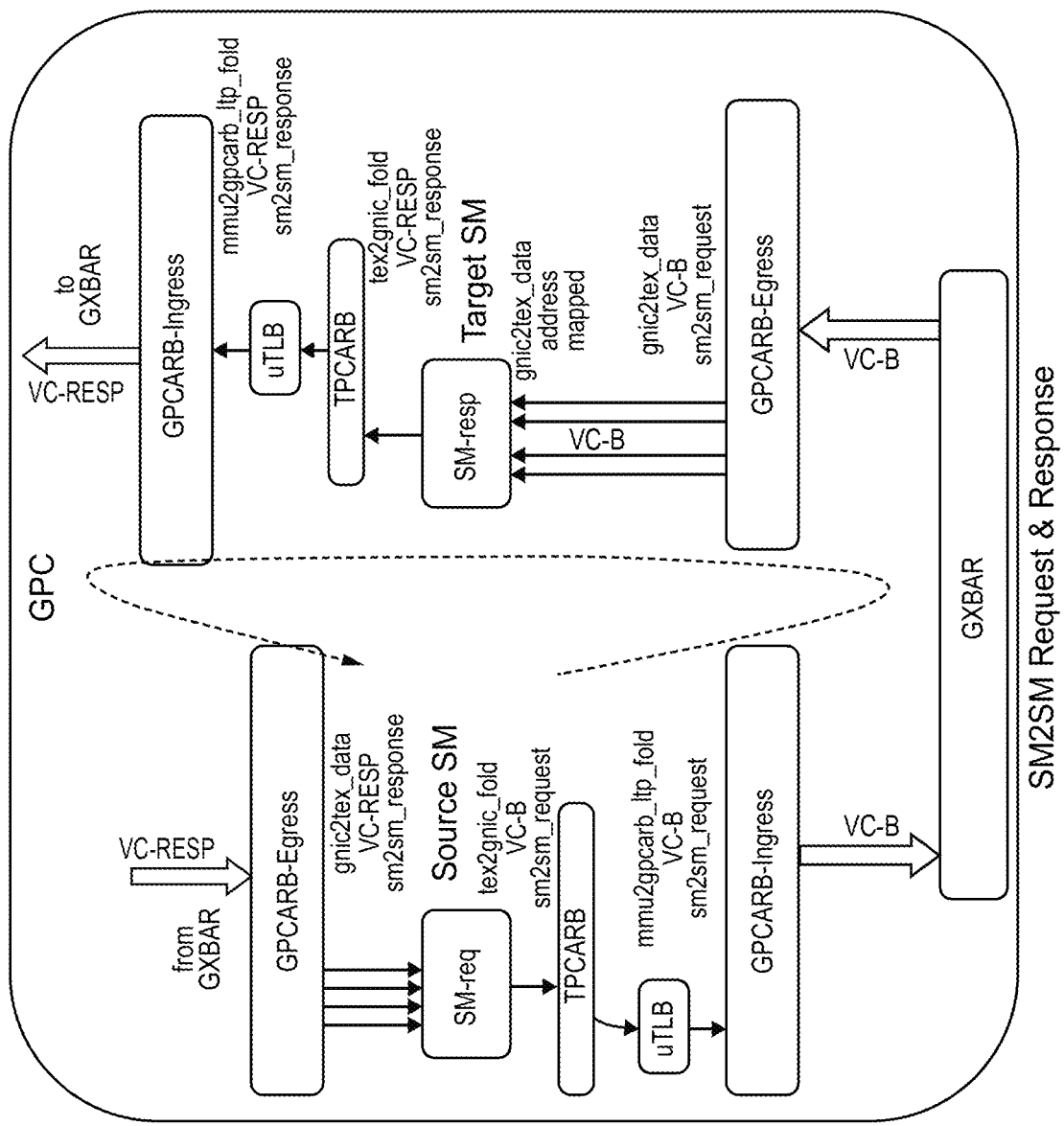
FIG. 21D shows a further view of SM-to-SM request and response processing.

FIG. 21D shows yet another view of the example routing of SM-to-SM traffic. The left-hand side of the diagram shows the request coming in from the requesting SM. The request passes through a TPCARB which arbitrates across multiple SMs in the same TPC. As discussed above, the uTLB does not translate between virtual and physical addresses but is instead used to hash the address to increase network utilization and prevent camping. The GPCARB arbitrates between different SMs within the same GPC. The arbitrator then sends the request over to GXBAR which, as discussed above, provides an interconnect by which the source SM can communicate with any target SM running a CTA within the same CGA. As shown in the right-hand side of the Figure, GXBAR communicates the request to the correct GPCARB EG(ress). The GPCARB EG is shared in this embodiment between the SM-to-SM response network and the global memory (GNIC) response network. FIG. 21D further shows the response from the target SM to the source SM taking a path that is very similar to the path the source SM used communicate the original request to the target SM (the request and response can in one embodiment take different routing paths through GCBAR).

Figure 22:
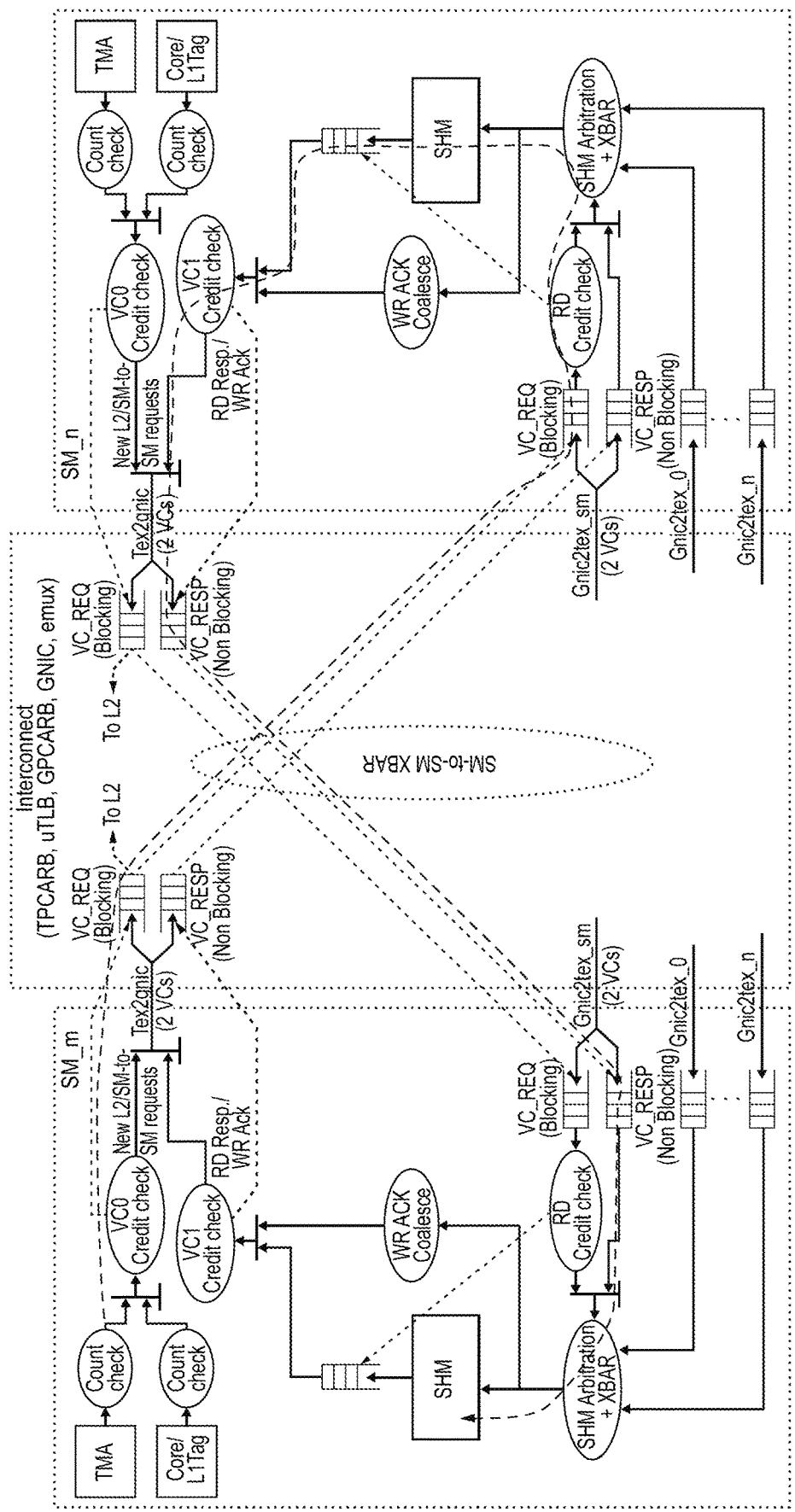
FIG. 22 shows flow of shared memory requests and responses across an example GPU architecture.
Figure 23A:
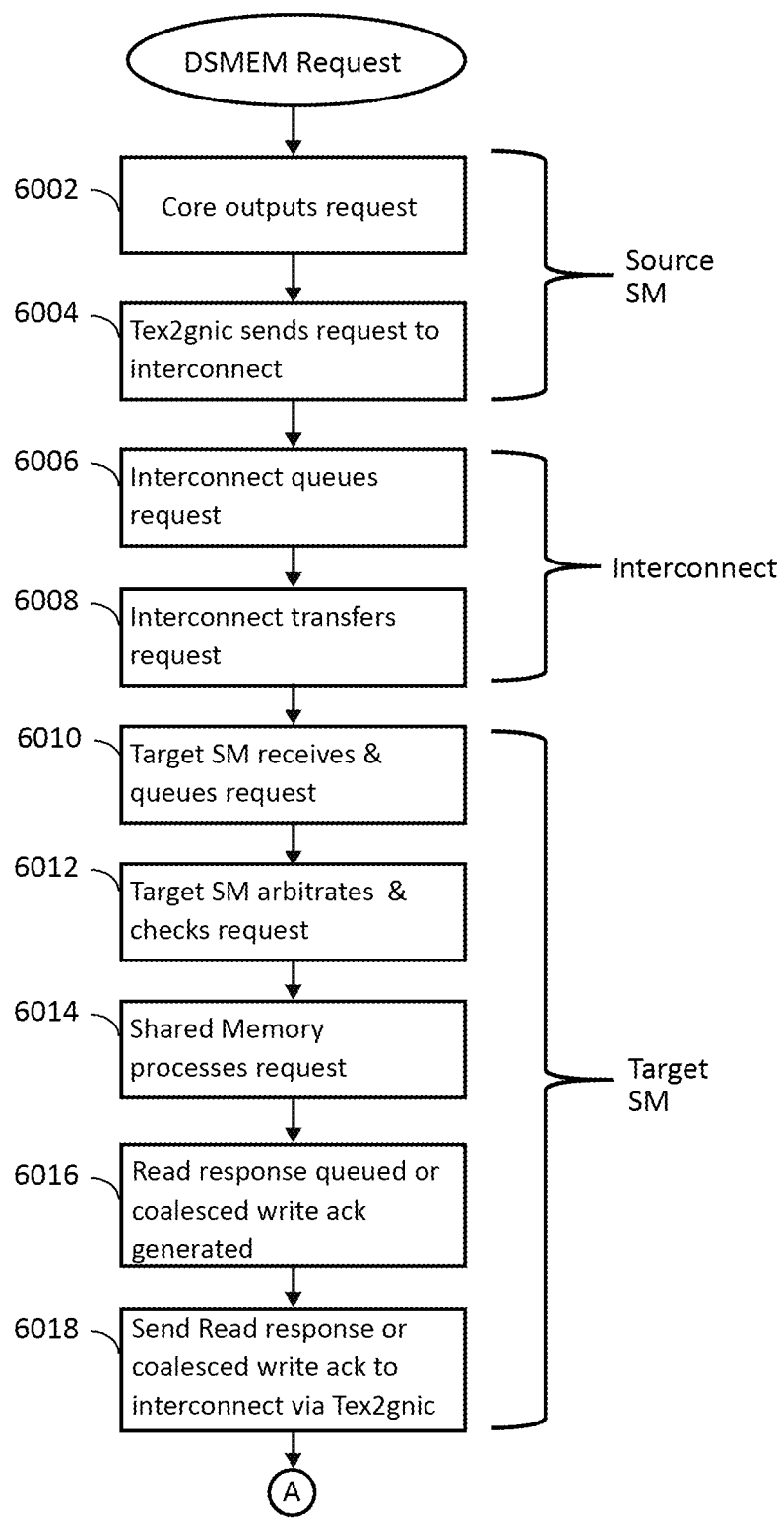
FIGS. 23A and 23B how example operations the FIG. 22 architecture performs.
Figure 23B:
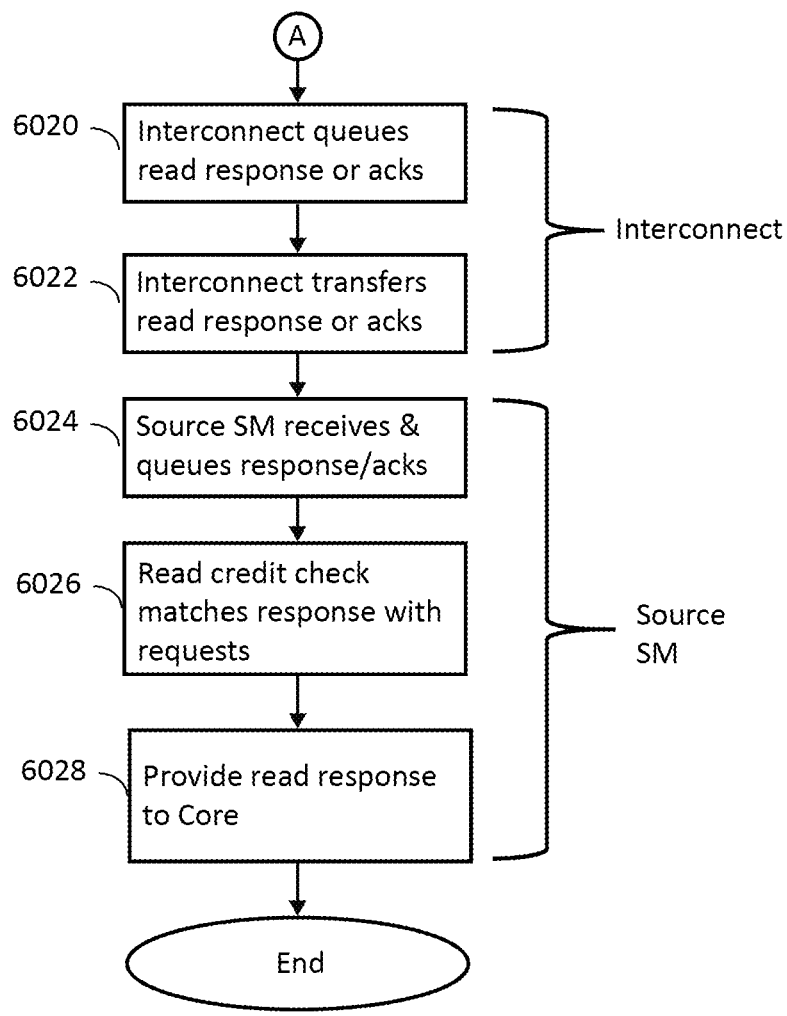

FIG. 22 shows another view of shared memory request/response processing, and FIGS. 23A-23B is a flowchart of operations the FIG. 22 example architecture performs. As can be seen in these diagrams, a source SM core produces a DSMEM access request including an address/memory slot (gpc_local_cga_id and sm_id) for the target SM's shared memory (determined using lookup tables as described above) and sends it to the interconnect (FIG. 23A, blocks 6002, 6004). The interconnect queues and transfers the request to the target SM (FIG. 23A, blocks 6006, 6008). The target SM receives, queues, arbitrates and checks the request to find the DSMEM base and size as described above (FIG. 23A, blocks 6010, 6012). The shared memory ("SHM") of the target SM processes (subject to barrier blocking as described above) the request (FIG. 23, block 6014). Upon completion of the shared memory operation at the target SM, the target SM hardware queues the shared memory output corresponding read data (if a read request) or the target SM hardware generates a acknowledge message (if e.g., a write request) (FIG. 23A, block 6016). The target SM hardware sends the read response or coalesced write acknowledge messages to interconnect via Tex2gnic (FIG. 23A, block 6018). The interconnect queues and transfers the read response or coalesced acks to the source SM (FIG. 23B, block 6020, 6022). The source SM receives and queues the message(s) (FIG. 23B, block 6024), and performs a credit check to match up the received response with the request using tracking and transaction counters as described above (FIG. 23B, block 6026). As explained above, a trap handler and other mechanisms handle error conditions that are not based on the program counter of the source SM. If applicable, the source SM hardware presents the data from the read response to the core in response to the core's read request (FIG. 23B, block 6028).

Thus, in one embodiment, SM-to-SM DSMEM shared memory access is supported/provided/enabled by many different parts of the GPU working together; for example, a source SM core/local memory/hardware, an interconnect, a target SM core/local memory/hardware. In one example, the interconnect, network or router/switch can route DSMEM access messages between SMs, but functionality within the SMs themselves can enable one SM to address another SM's shared memory over the interconnect, and other hardware or software mechanisms can provide additional support to enable proper or efficient SM-to-SM DSMEM access, error handling and the like. As an example, in one embodiment, a source SM determines the target SM and memory slot based on a segmented address and provides the physical SM id based on lookup in a (CAM) routing table the SM maintains, and then choses the correct packet type to let the interconnect know this is a SM-to-SM transaction. Meanwhile, the target SM may perform address boundary/validity checking, perform requested operations on its shared memory, and coalesce write acknowledgements to reduce traffic over the interconnect. Still additional hardware or software support within a CGA CPC may support CGA concurrent launch (to ensure DSMEM distributed across the SMs executing the CGA is available), CGA_id allocation and recycling protocols, orderly CGA breakdown and DSMEM flush, and other functionality. Different embodiments can distribute these distributed functions differently between the interconnect, the SMs or parts of the SM, other hardware support mechanisms, other software support mechanisms, other components of the system, etc.

While the shared memory arrangements described herein are enabled by the concurrency guarantees provided by the CGA hierarchy and associated hardware support, they are not so limited. In particular, any other arrangement, protocol or hardware support could be used to guarantee execution concurrency of a group of execution threads or thread groups executing on a collection of processing cores of any type (not limited to "streaming multiprocessors") each of which has associated local memory, providing a distributed array of local memory allocations that can be shared among the group of execution threads or thread groups. See for example Breshears, The Art of Concurrency: A Thread Monkey's Guide to Writing Parallel Applications (O'Reilly 2009) and Rajwar et al, "Speculative lock elision: enabling highly concurrent multithreaded execution," Proceedings of the 34th ACM/IEEE International Symposium on Microarchitecture MICRO-34 (1-5 Dec. 2001) for different ways to provide concurrency guarantees. As the literature makes clear, such groups of processing cores within a processing arrangement such as a graphics processing unit can be referred to by various names such as execution units, compute units, Streaming Multiprocessors or other terminology. These groups of processing cores may be multi-threaded, i.e. support multiple concurrent threads or thread groups consisting e.g., of multiple kernels or shader instances. The processing cores in the group may have different technological capabilities based for example on the same or different ALU (arithmetic logic unit) hardware comprising the same or different calculation logic (e.g. some processing cores in the group may include ALU hardware to perform integer-based calculations, other processing cores in the group may include ALU hardware to perform floating point calculations, still other processing cores in the group may include ALU hardware to perform tensor or matrix calculations, etc.) with the same or different precision(s). The processing cores in the group may execute thread instructions based on a SIMT (single instruction multiple thread) execution model and/or a SIMD (single instruction, multiple data) execution model. The processing cores in the group may each have direct access to at least some of the same resources such as execution stream, directly-addressable local memory, cache memory, register sets, addresses, data flow paths, etc. They may together form a single unit or ensemble of concurrent processing sharing a common instruction cache and a common instruction decoder which retrieves and decodes instructions using a common program counter, while for example having the same or different stack pointers allowing the processing cores to execute/calculate using the same or different data.

Thus, while the CGA construct is useful for guaranteeing concurrency across SMs, other techniques for guaranteeing concurrency could be used instead or in combination to support DSMEM. For example, some embodiments might use a software arrangement such as Cooperative Groups API to arrange for concurrency, or still other techniques could be used to provide or guarantee concurrency within the same relevant hardware domain or partition of the GPU hardware (e.g., all the threads that make use of the distributed shared memory are not just running concurrently, but can be launched and found on SMs all of which are within a particular hardware domain such as a sub-portion of a GPU referred to as a GPC (for example, as individual threads could test for by querying which GPC the threads have been launched on). While such other techniques are possible so that DSMEM is not limited to a CGA-specific implementation, the CGA hierarchy provides certain advantages in terms of efficiency and certainty that well support DSMEM. Furthermore, DSMEM can be used to support concurrent thread blocks no matter how concurrency is provided to allow concurrent thread blocks to access blocks of high speed semiconductor memory that may be distributed or scattered across a GPU to provide a unified logical memory shared between any number of different collections or groupings of processing cores. Such distributed shared memory provides very low latency memory access for processing cores located in proximity to the memory blocks, and also provides a way for more distant processing cores to also access the memory blocks in a manner and using interconnects that do not interfere with the processing cores' access to main or global memory such as backed by an L2 cache.

All patents, patent applications and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A processing system comprising:
    a first semiconductor memory block co-located with at least one associated first processing core executing a first cooperative thread array (CTA) of a cooperative group array (CGA);
    a second semiconductor memory block co-located with at least one associated second processing core executing a second CTA of the CGA; and
    an interconnect operatively connecting the first processing core with the second processing core,
    wherein the first CTA is enabled to access the second semiconductor memory block via the second processing core.

2. The processing system of claim 1 wherein the processing system conditions access of the second semiconductor memory block by the first CTA on allocation of the second semiconductor memory block to the second CTA.

3. The processing system of claim 1 wherein the processing system is configured to guarantee that the first and second CTAs run concurrently.

4. The processing system of claim 1 wherein the first and second processing cores each comprise streaming multiprocessors, the first semiconductor memory block is part of a first streaming multiprocessor, the second semiconductor memory block is part of a second streaming multiprocessor, and the interconnect provides intercommunications between the first streaming multiprocessor and the second streaming multiprocessor.

5. The processing system of claim 1 wherein the processing system is configured to enable the first CTA to issue read, write, and atomic commands to access the second semiconductor memory block.

6. The processing system of claim 1 wherein the interconnect comprises a switch or a network.

7. The processing system of claim 1 wherein the interconnect enables direct communication between processing cores to all shared memory allocated to CTAs that are part of the same CGA.

8. The processing system of claim 1 wherein the processing system is configured to provide segmented addressing of distributed shared memory blocks based on a unique identifier per executing CGA.

9. The processing system of claim 1 wherein the processing system is configured to support hardware resident CGA identifier allocation and recycling protocols.

10. The processing system of claim 1 wherein the first and second processing cores each store an associating structure to enable distributed shared memory addressing from processing cores remote thereto.

11. The processing system of claim 1 wherein the interconnect comprises a low-latency processor-to-processor communication network.

12. The processing system of claim 1 wherein the processing system coalesces write acknowledgements for communications across the interconnect.

13. The processing system of claim 1 wherein the processing system includes hardware barriers to synchronize usage of the first semiconductor memory block and the second semiconductor memory block at CGA creation and during CGA context switching.

14. The processing system of claim 13 wherein the hardware barriers ensure the first semiconductor memory block and the second semiconductor memory block are available in all CTAs of a CGA before any CTA references the memory blocks over the interconnect.

15. The processing system of claim 13 wherein the hardware barriers ensure all CTAs in a CGA have completed all accesses before state save, and all distributed shared memory has been restored during state restore.

16. The processing system of claim 1 wherein the processing system is further configured to provide CGA/CTA exit and error handling protocols with distributed shared memory.

17. A method of operating a processing system comprising:
launching a first thread block on a first processing core;
allocating to the first thread block a first semiconductor memory block local to the first processing core;
launching a second thread block on a second processing core;
allocating to the second thread block a second semiconductor memory block local to the second processing core;
launching a third thread block on a third processing core;
allocating to the third thread block a third semiconductor memory block local to the third processing core; and
enabling the first thread block to access each of the allocated second and third semiconductor memory blocks via the second and third processing cores, respectively; enabling the second thread block to access each of the allocated first and third semiconductor memory blocks via the first and third processing cores, respectively; and enabling the third thread block to access each of the first and second semiconductor memory blocks via the first and second processing cores, respectively.

18. The method of claim 17 wherein the processing system is disposed on a substrate, and the first, second and third memory blocks are disposed on different portions of the substrate and are separated from one another.

19. The method of claim 17 further including using a hardware barrier to ensure that the first, second and third semiconductor memory blocks are allocated before permitting access by any of the first, second and third thread blocks.

20. The method of claim 17 wherein the enabling comprises providing communications between the first, second and third processing cores.

21. A processing system comprising:
a hardware work distributor circuit that launches a collection of thread groups concurrently on plural processors; and
a communications interface between the plural processors that enables each thread group to access memory allocated to any other thread group in the collection,
wherein the communications interface comprises communication links between the plural processors and inter-processor messaging functions performed by the plural processors, and each thread group is enabled to access memory allocated to other thread groups via respective processor(s) executing the other thread groups to which memory to be accessed is allocated.

22. The processing system of claim 21 wherein the communications interface prohibits thread groups not in the collection from accessing memory portions allocated to any other thread group in the collection.

23. The processing system of claim 21 wherein the plural processors comprise streaming multiprocessors.

24. The processing system of claim 21 wherein the plural processors each comprise a group of processing cores and memory local to and directly addressable by each of the processing cores in the group.

* * * * *